United States Patent
Rea et al.

(10) Patent No.: US 8,860,311 B2
(45) Date of Patent: Oct. 14, 2014

(54) LIGHTING APPARATUS

(71) Applicant: Stray Light Optical Technologies, Scottsburg, IN (US)

(72) Inventors: Gerald W. Rea, Scottsburg, IN (US); Robert A. Drake, Nashville, IN (US)

(73) Assignee: Stray Light Optical Technologies, Scottsburg, IN (US)

( * ) Notice: Subject to any disclaimer, the term of this patent is extended or adjusted under 35 U.S.C. 154(b) by 101 days.

(21) Appl. No.: 13/730,947

(22) Filed: Dec. 29, 2012

(65) Prior Publication Data

US 2013/0134880 A1 May 30, 2013

Related U.S. Application Data

(63) Continuation of application No. PCT/US2011/050461, filed on Sep. 3, 2011.

(60) Provisional application No. 61/379,969, filed on Sep. 3, 2010, provisional application No. 61/412,327, filed on Nov. 10, 2010.

(51) Int. Cl.
| | |
|---|---|
| *H01J 7/46* | (2006.01) |
| *H01J 19/80* | (2006.01) |
| *F21V 21/008* | (2006.01) |
| *H01J 61/52* | (2006.01) |
| *F21V 29/00* | (2006.01) |
| *H01J 65/04* | (2006.01) |
| *F21S 8/08* | (2006.01) |
| *F21V 21/14* | (2006.01) |
| *H05B 41/28* | (2006.01) |
| *A01G 7/04* | (2006.01) |

(52) U.S. Cl.
CPC ............... *F21V 21/008* (2013.01); *Y02B 20/22* (2013.01); *H01J 61/523* (2013.01); *F21V 29/22* (2013.01); *H01J 65/042* (2013.01); *F21S 8/085* (2013.01); *F21V 21/14* (2013.01); *H05B 41/2806* (2013.01); *A01G 7/045* (2013.01)
USPC ............................. 315/39; 315/112; 315/248

(58) Field of Classification Search
None
See application file for complete search history.

(56) References Cited

U.S. PATENT DOCUMENTS

| | | | |
|---|---|---|---|
| 4,167,783 | A | 9/1979 | Mitchell |
| 4,220,981 | A | 9/1980 | Koether |
| 4,392,187 | A | 7/1983 | Bornhorst |
| 4,712,167 | A | 12/1987 | Gordin et al. |
| 5,207,747 | A | 5/1993 | Gordin et al. |
| 5,225,765 | A | 7/1993 | Callahan et al. |
| 5,265,362 | A | 11/1993 | Yamaguchi |
| D378,143 | S | 2/1997 | Kollins |
| 6,065,849 | A | 5/2000 | Chen |

(Continued)

OTHER PUBLICATIONS

International Preliminary Report on Patentability in PCT/US2011/050461, Mar. 14, 2013, 8 pgs., Stray Light Optical Technologies.

(Continued)

*Primary Examiner* — Anh Tran
(74) *Attorney, Agent, or Firm* — Faegre Baker Daniels LLP

(57) ABSTRACT

A lighting apparatus includes an emitter having a plasma bulb and a driver which provides an RF signal to the emitter to drive the plasma bulb. The lighting apparatus may be used for various applications including illuminating plants and organisms in an aquatic environment, growing plants, facility lighting, and other applications.

28 Claims, 51 Drawing Sheets

(56) References Cited

U.S. PATENT DOCUMENTS

| | | | |
|---|---|---|---|
| 6,137,237 A * | 10/2000 | MacLennan et al. | 315/248 |
| 6,737,809 B2 | 5/2004 | Espiau et al. | |
| 6,922,021 B2 | 7/2005 | Espiau et al. | |
| 7,348,732 B2 | 3/2008 | Espiau et al. | |
| 7,358,678 B2 | 4/2008 | Espiau et al. | |
| 7,362,054 B2 | 4/2008 | Espiau et al. | |
| 7,362,055 B2 | 4/2008 | Espiau et al. | |
| 7,362,056 B2 | 4/2008 | Espiau et al. | |
| 7,372,209 B2 | 5/2008 | Espiau et al. | |
| 7,391,158 B2 | 6/2008 | Espiau et al. | |
| 7,429,818 B2 | 9/2008 | Chang et al. | |
| 7,498,747 B2 | 3/2009 | Espiau et al. | |
| 7,518,315 B2 | 4/2009 | Espiau et al. | |
| 7,525,253 B2 | 4/2009 | Espiau et al. | |
| 7,629,570 B2 | 12/2009 | Mondloch et al. | |
| 7,638,951 B2 | 12/2009 | DeVincentis et al. | |
| D607,593 S | 1/2010 | Yoo | |
| D610,286 S | 2/2010 | Kimura | |
| 7,701,143 B2 | 4/2010 | DeVincentis | |
| 7,719,195 B2 | 5/2010 | DeVincentis et al. | |
| 7,722,227 B2 | 5/2010 | Zhang et al. | |
| D619,748 S | 7/2010 | Jong | |
| D619,749 S | 7/2010 | Jong | |
| 7,791,278 B2 | 9/2010 | DeVincentis et al. | |
| 7,791,280 B2 | 9/2010 | DeVincentis et al. | |
| D627,093 S | 11/2010 | Shiau | |
| D631,179 S | 1/2011 | Kim | |
| D631,590 S | 1/2011 | Areh | |
| D631,998 S | 2/2011 | Little | |
| D632,000 S | 2/2011 | Little | |
| D644,776 S | 9/2011 | Rea et al. | |
| D674,962 S | 1/2013 | Drake et al. | |
| 8,342,714 B1 | 1/2013 | Rea et al. | |
| D683,059 S | 5/2013 | Rea et al. | |
| 2005/0134188 A1 | 6/2005 | Lindqvist | |
| 2006/0087257 A1 * | 4/2006 | Choi et al. | 315/248 |
| 2006/0250090 A9 | 11/2006 | Guthrie et al. | |
| 2007/0211990 A1 | 9/2007 | Espiau et al. | |
| 2007/0211991 A1 | 9/2007 | Espiau et al. | |
| 2007/0217732 A1 | 9/2007 | Chang et al. | |
| 2007/0236119 A1 | 10/2007 | Espiau | |
| 2007/0241688 A1 | 10/2007 | DeVincentis et al. | |
| 2008/0054813 A1 | 3/2008 | Espiau et al. | |
| 2008/0203922 A1 | 8/2008 | Guthrie et al. | |
| 2008/0211971 A1 | 9/2008 | Pradhan | |
| 2008/0258627 A1 | 10/2008 | DeVincentis et al. | |
| 2009/0026911 A1 | 1/2009 | Hafidi et al. | |
| 2009/0026975 A1 | 1/2009 | Ralston et al. | |
| 2009/0073700 A1 | 3/2009 | Cruickshank | |
| 2009/0146543 A1 | 6/2009 | Chang et al. | |
| 2009/0167201 A1 | 7/2009 | Duelli et al. | |
| 2009/0243488 A1 | 10/2009 | Espiau et al. | |
| 2009/0262540 A1 | 10/2009 | Hargreaves et al. | |
| 2009/0284166 A1 | 11/2009 | DeVincentis et al. | |
| 2010/0097808 A1 | 4/2010 | Jurik | |
| 2010/0102724 A1 | 4/2010 | Gilliard et al. | |
| 2010/0123396 A1 | 5/2010 | DeVincentis et al. | |
| 2010/0123407 A1 | 5/2010 | Duelli | |
| 2010/0148669 A1 | 6/2010 | DeVincentis et al. | |
| 2010/0156301 A1 | 6/2010 | Hollingsworth et al. | |
| 2010/0156310 A1 | 6/2010 | Hollingsworth et al. | |
| 2010/0165306 A1 | 7/2010 | McGettigan et al. | |
| 2010/0171436 A1 | 7/2010 | DeVincentis et al. | |
| 2010/0253231 A1 | 10/2010 | DeVincentis et al. | |
| 2012/0112634 A1 | 5/2012 | Hafidi et al. | |

OTHER PUBLICATIONS

Photograph of Light Emitting Plasma Streetlight, Disclosed before Nov. 10, 2009, one page.

* cited by examiner

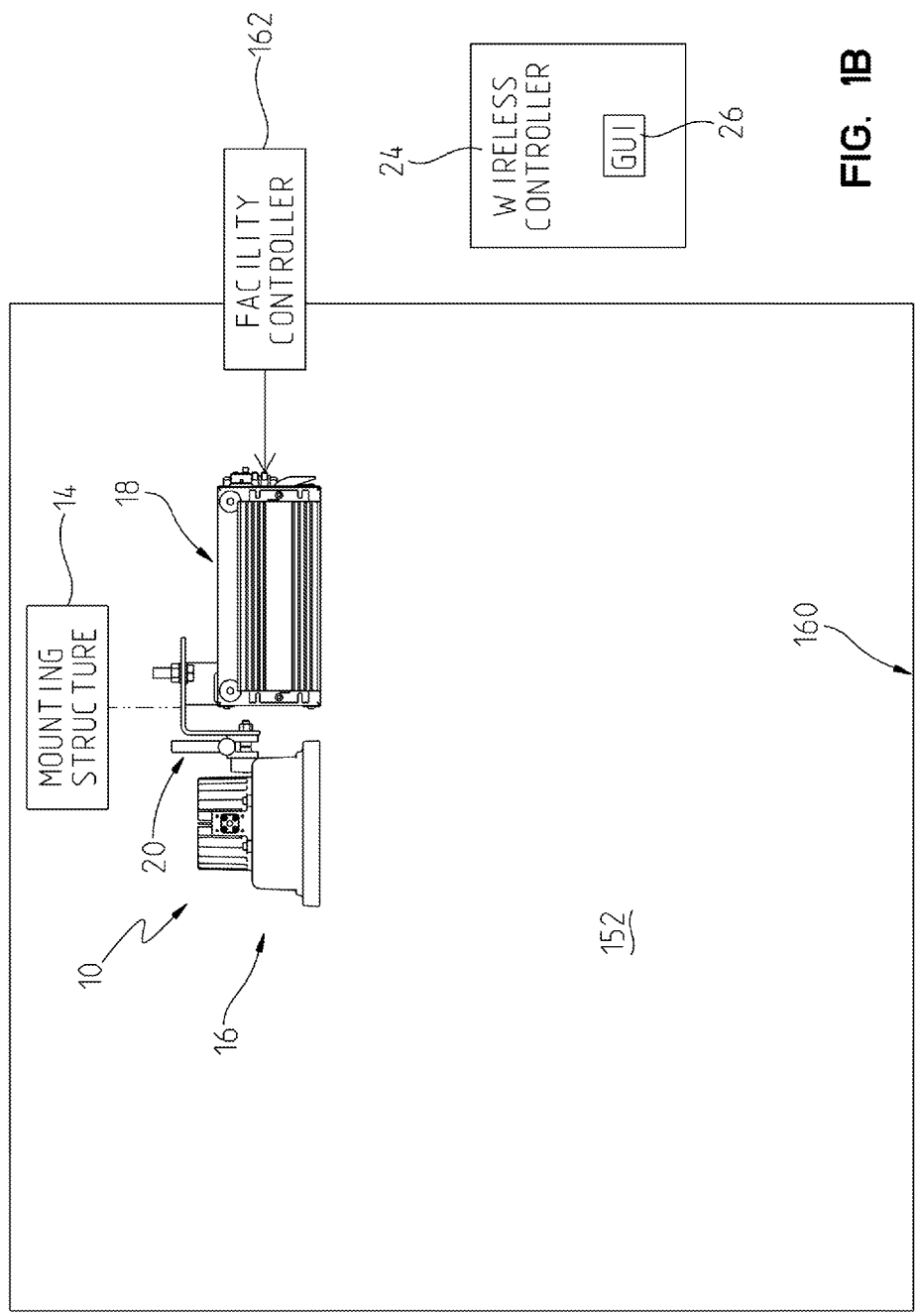

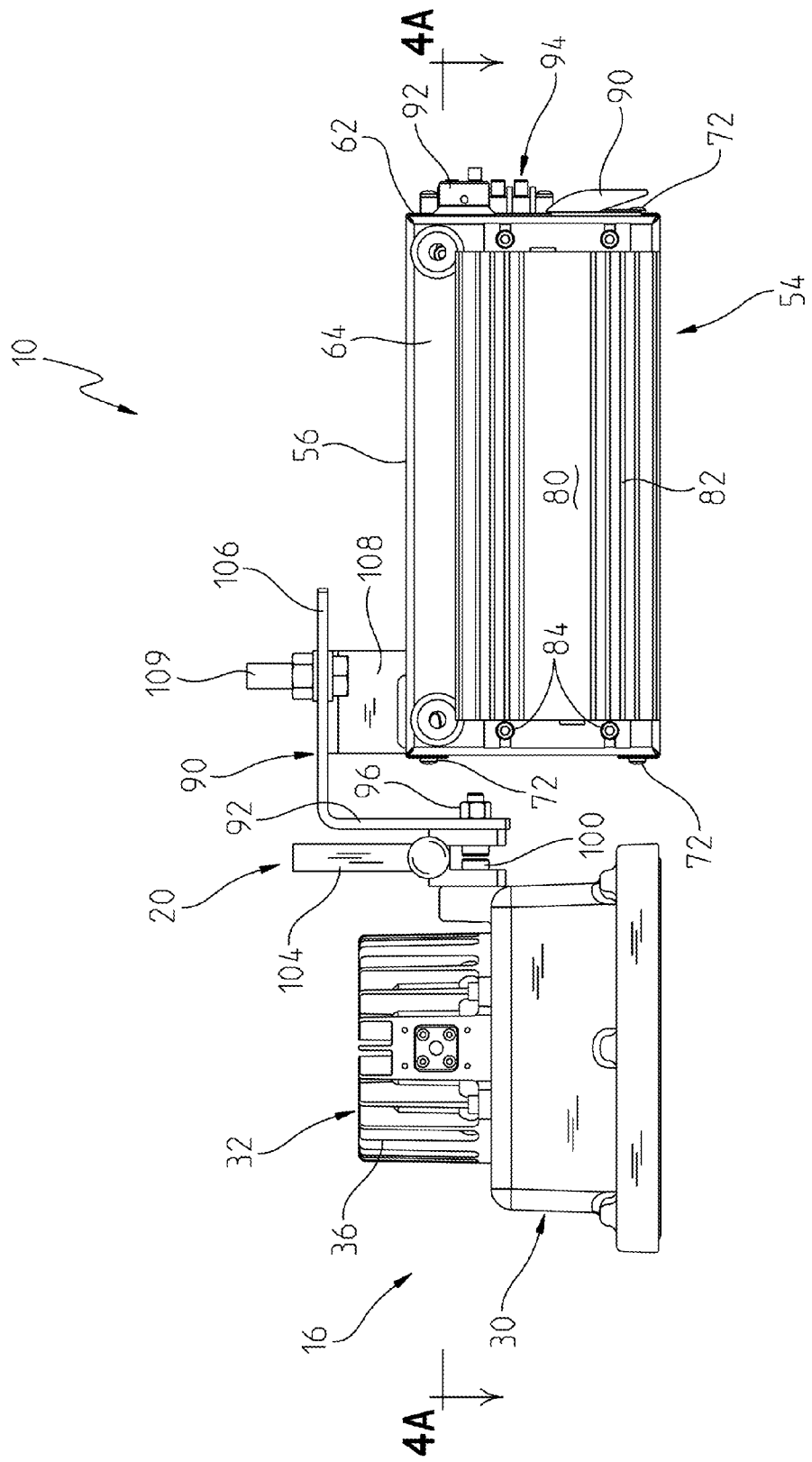

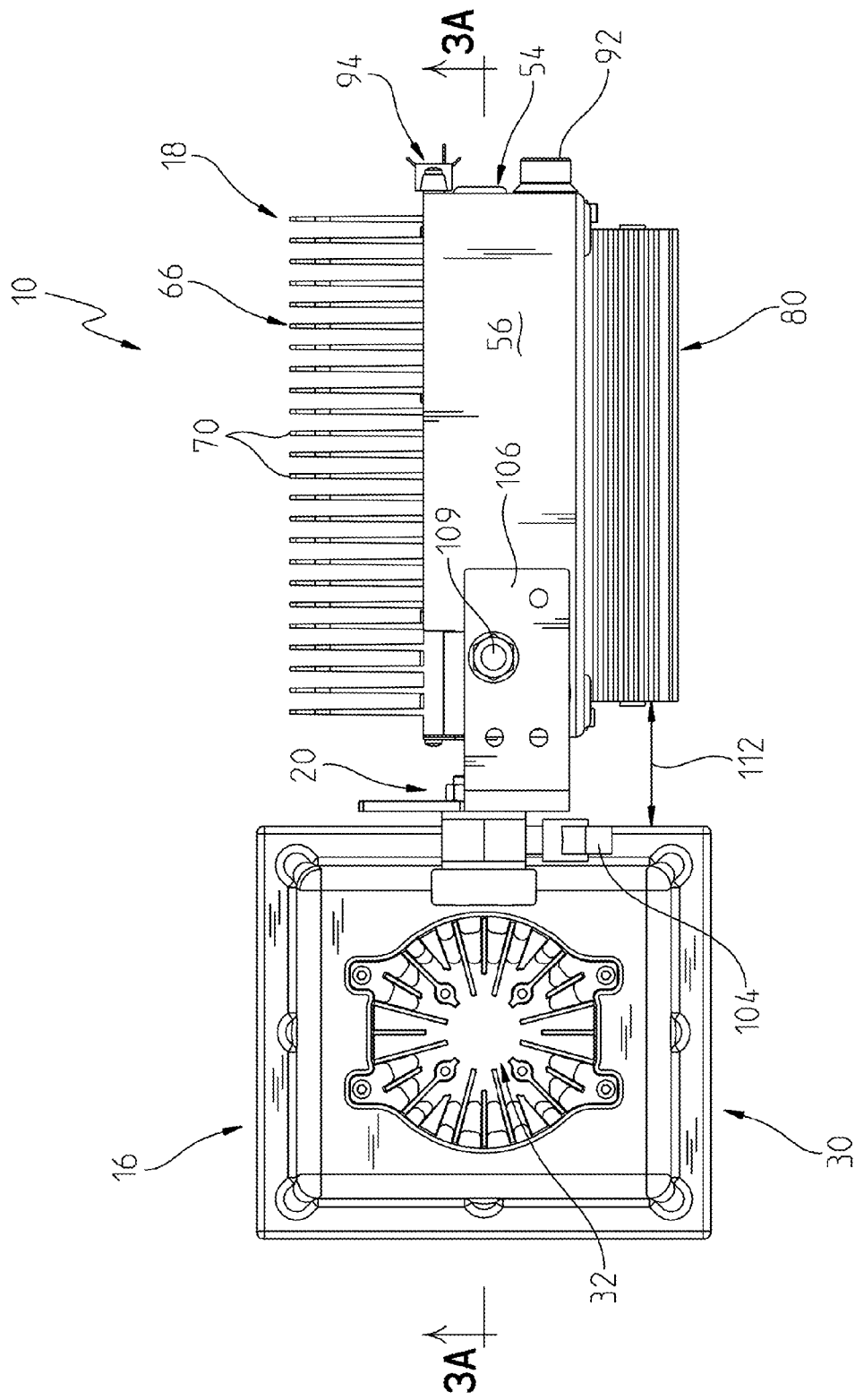

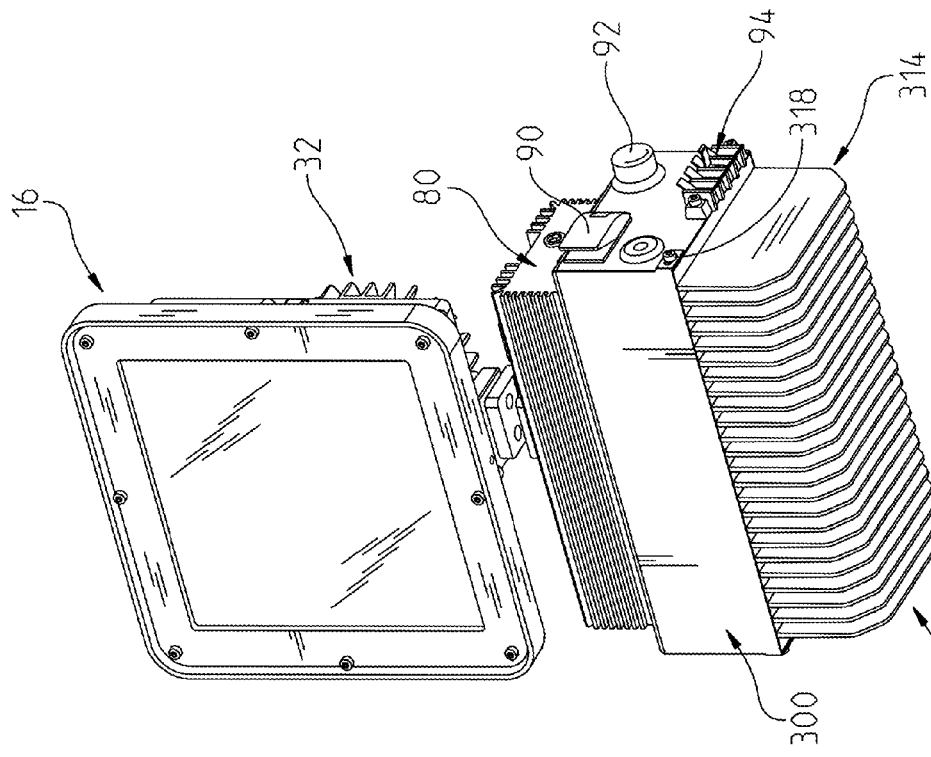
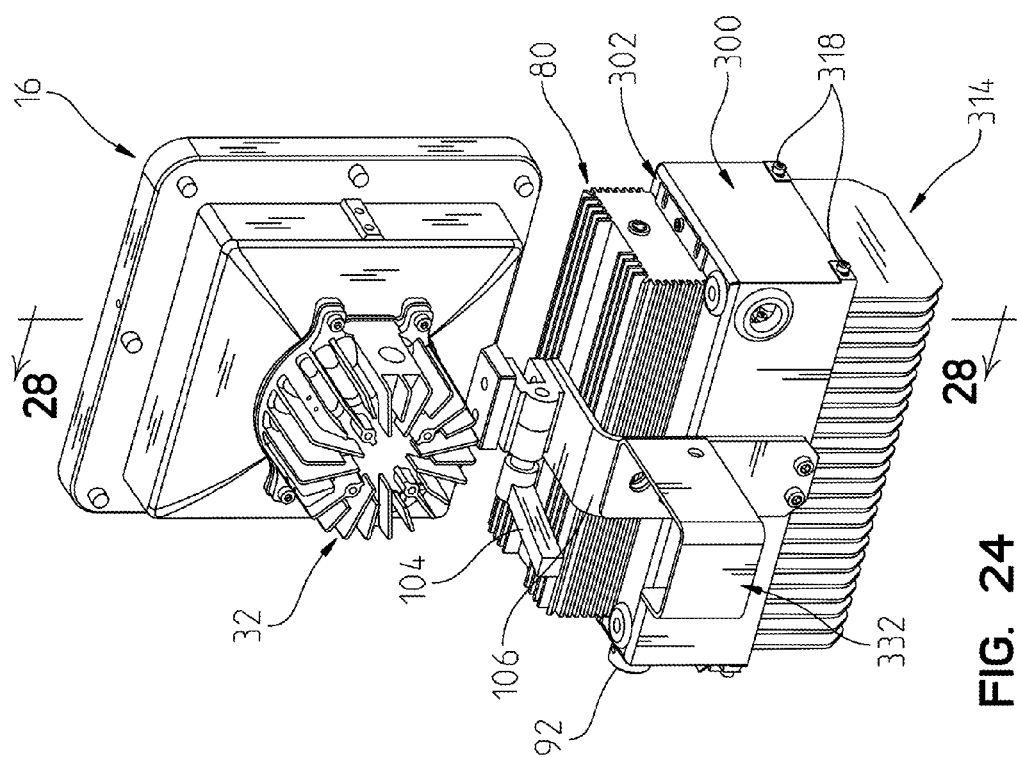

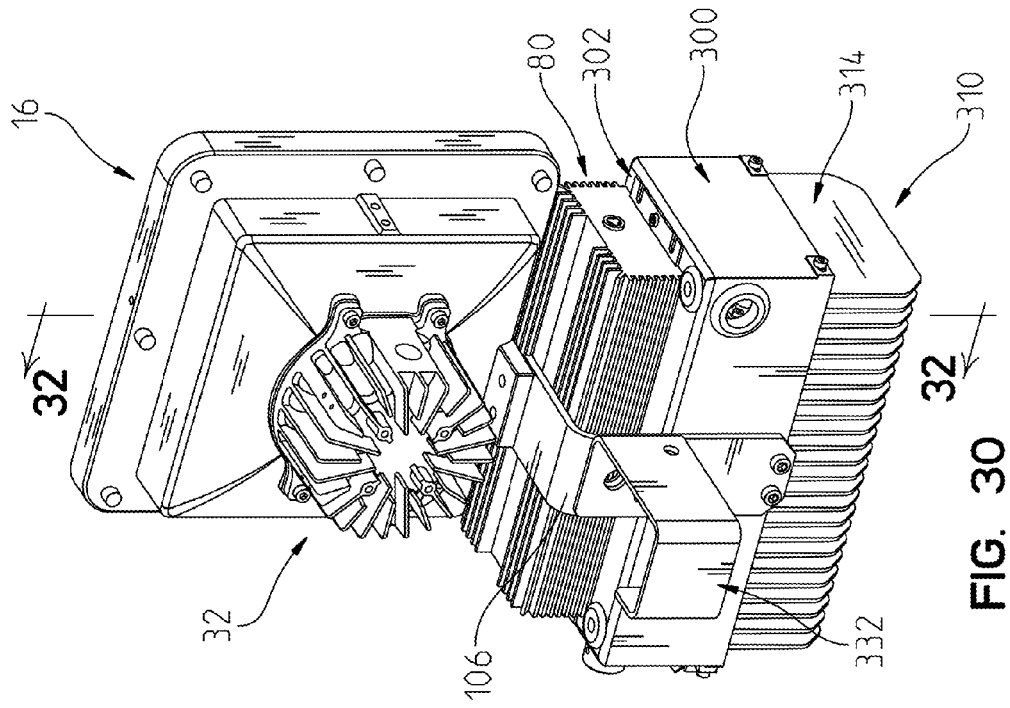
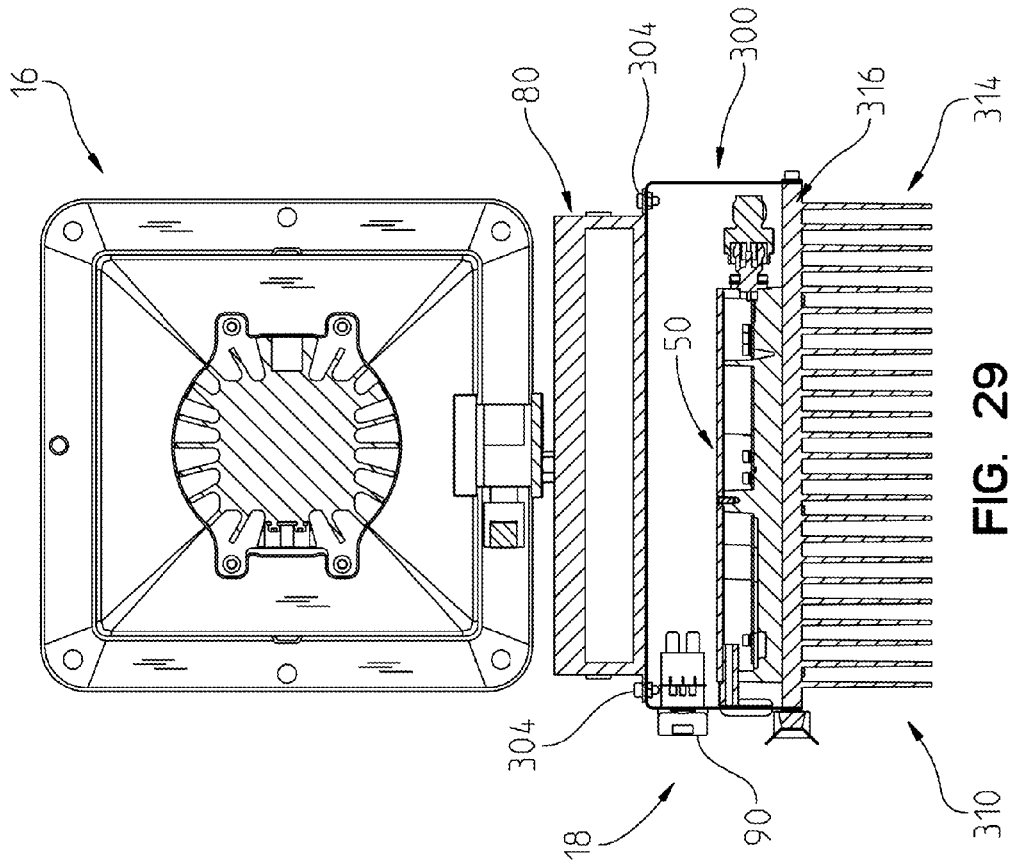

US 8,860,311 B2

LIGHTING APPARATUS

CROSS REFERENCE TO RELATED APPLICATIONS

This application is a continuation of PCT International Application No. PCT/US2011/050461, filed on Sep. 3, 2011, which claims the benefit of U.S. Provisional Application Ser. No. 61/379,969, filed on Sep. 3, 2010, and which claims the benefit of U.S. Provisional Application Ser. No. 61/412,327, filed on Nov. 10, 2010, the disclosures of which are all expressly incorporated by reference herein.

BACKGROUND AND SUMMARY

The present disclosure relates to a lighting apparatus. More particularly, the present disclosure relates to an energy efficient lighting apparatus having a compact design and effective heat management characteristics. An embodiment of the present disclosure is designed for lighting aquariums.

Light is important to the life of an aquarium. Aquatic plants and coral reefs need specific light to survive and flourish. Vibrant colors of marine animals need full spectrum light to optimize viewing. The lighting apparatus of the present disclosure provides light having a high color quality and intensity which is particularly useful for aquariums, other aquatic environments, horticulture applications, facility lighting, and other lighting applications. The lighting apparatus of the present disclosure promotes growth of aquatic plants and organisms compared to other lighting apparatus. The lighting apparatus of the present disclosure provides light promotes the growth of zooplankton.

A lighting apparatus of an illustrated embodiment of the present disclosure includes one or more of the following features:

(1) Higher Photosynthetic Active Radiation (PAR)—Provides 180% higher PAR values than a 10,000 K, 400 W metal halide aquarium light and up to 500% higher PAR than standard metal halide lights.

(2) True Colors—The illustrated lighting apparatus shows the lush colors evident in marine life the way they would appear in sunlight (95 Color Rendering Index).

(3) Controllable—The illustrated lighting apparatus is dimmable over a wide range, for example, 20% to 100%. At power levels below 50%, the light has a pleasant blue hue which is useful for aquariums.

(4) Energy Efficient—The illustrated lighting apparatus uses LiFi plasma technology and which uses only 290 Watts of power, compared to 450 Watts for most metal halide lighting systems of equivalent output.

(5) Cost Effective Over Life—The illustrated lighting apparatus has about a six year life span (assuming 12 hrs/day), compared to metal halide bulbs with recommended replacement cycles of six to nine months.

(6) Cool Lighting—The illustrated lighting apparatus generates less heat and near infrared radiation compared to metal halide bulbs, thereby decreasing cooling costs for the aquariums.

(7) Fast Start-Up—The illustrated lighting apparatus achieves full brightness in about 40 seconds.

In an exemplary embodiment of the present disclosure, a lighting apparatus is provided. The lighting apparatus comprising a power source which provides DC power; a driver unit which receives the DC power and generates a radio frequency (RF) signal; and an emitter unit coupled to the driver unit through a cable, the emitter unit configured to generate light energy with a plasma bulb from the received radio frequency signal, wherein the emitter unit is pivotably coupled to the driver unit. The lighting apparatus may be used to illuminate aquatic environments, plants in a horticulture environment, a facility, and other applications.

In another exemplary embodiment of the present disclosure, a lighting apparatus is provided. The lighting apparatus comprising a first unit and a second unit. The first unit including a power source which provides DC power; a driver unit which receives the DC power and generates a radio frequency (RF) signal; and a first heat sink associated with the driver unit. The second unit including an emitter unit coupled to the driver unit through a cable and a second heat sink associated with the emitter unit. The emitter unit configured to generate light energy with a plasma bulb from the received radio frequency signal. The first unit is spaced apart from the second unit and the first unit is coupled to the second unit.

In a further exemplary embodiment of the present disclosure, a lighting apparatus is provided. The lighting apparatus comprising a driver unit which generates a radio frequency (RF) signal; an emitter unit coupled to the driver unit through a cable, the emitter unit configured to generate light energy with a plasma bulb from the received radio frequency signal; a window positioned below the plasma bulb, light produced by the plasma bulb passing through the window; and a mounting structure which is coupled to the driver unit, the emitter unit, and the window. The driver unit, the emitter unit, and the window are suspended from the mounting structure. In one example, the lighting apparatus further comprising a housing. The driver unit being positioned in an interior of the housing. A lower surface of the housing being below the plasma bulb and an upper surface of the housing being above the plasma bulb. The mounting structure extending above the housing. In a variation thereof, the lighting apparatus further comprising a power supply positioned within the housing, the power supply provides DC power to the driver unit. In another variation thereof, the lighting apparatus is suspended over water in an aquarium. In yet another variation thereof, lighting apparatus is suspended over plants.

In still a further exemplary embodiment of the present disclosure, a method of growing plants is provided. The method comprising the steps of providing an artificial light source which produces light having a micromoles/lumen value of greater than about 2.0; positioning the artificial light source over the plants; and illuminating the plants with light produced by the artificial light source.

In still another exemplary embodiment of the present disclosure, a method of illuminating water of an aquarium I provided. The method comprising the steps of providing an artificial light source which produces light having a coloring rendering index value of about 95; positioning the artificial light source over the water of the aquarium; and illuminating the aquarium with light produced by the artificial light source.

In yet still another exemplary embodiment of the present disclosure, a lighting apparatus is provided. The lighting apparatus comprising a first unit and a second unit. The first unit including a power supply which provides DC power; and a driver unit which receives the DC power and generates a radio frequency (RF) signal. The second unit including an emitter unit coupled to the driver unit through a cable. The emitter unit configured to generate light energy with a plasma bulb from the received radio frequency signal. The first unit is spaced apart from the second unit and the first unit is coupled to the second unit. In one example, the first unit includes a first heat sink associated with the driver unit and the second unit includes a second heat sink associated with the emitter unit. In another example, the second unit is pivotably coupled to the first unit. In a further example, the second unit further comprises a housing having an interior in which the driver unit is positioned. In yet a further example, the lighting apparatus further comprises a pole mounting portion provided within the housing, the housing including an aperture adapted to receive a street pole which is to be coupled to the pole mounting portion. In still a further example, the lighting apparatus further comprises a pole mounting portion coupled to the housing and extending from a first end of the housing, the first unit extending from a second end of the housing opposite the first end, the pole mounting portion adapted to receive a street pole which is to be coupled to the pole mounting portion. In yet another example, the second unit further comprises a housing having an interior in which the driver unit and the power supply are positioned, the housing having a first housing member and a second housing member rotatably coupled to the first housing member. In a variation thereof, the driver unit is coupled to the first housing member and the power supply is coupled to the second housing member and rotates therewith relative to the first housing member. In another variation thereof, the first housing member is cast and includes at least one heat sink associated with the driver unit.

The above and other features of the present disclosure, which alone or in any combination may comprise patentable subject matter, will become apparent from the following description and the attached drawings.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIG. 1B illustrates a facility including a lighting apparatus;

FIG. 3 illustrates a left side view of the lighting apparatus of FIG. 2;

FIG. 4 illustrates a top view of the lighting apparatus of FIG. 2;

FIG. 24 illustrates a top perspective view of another exemplary lighting apparatus of the present disclosure;

FIG. 25 illustrates a front perspective view of the lighting apparatus of FIG. 24;

FIG. 29 illustrates a sectional view of the lighting apparatus of FIG. 24 along the lines 29-29 shown in FIG. 28;

FIG. 30 illustrates a top perspective view of another exemplary lighting apparatus of the present disclosure;

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
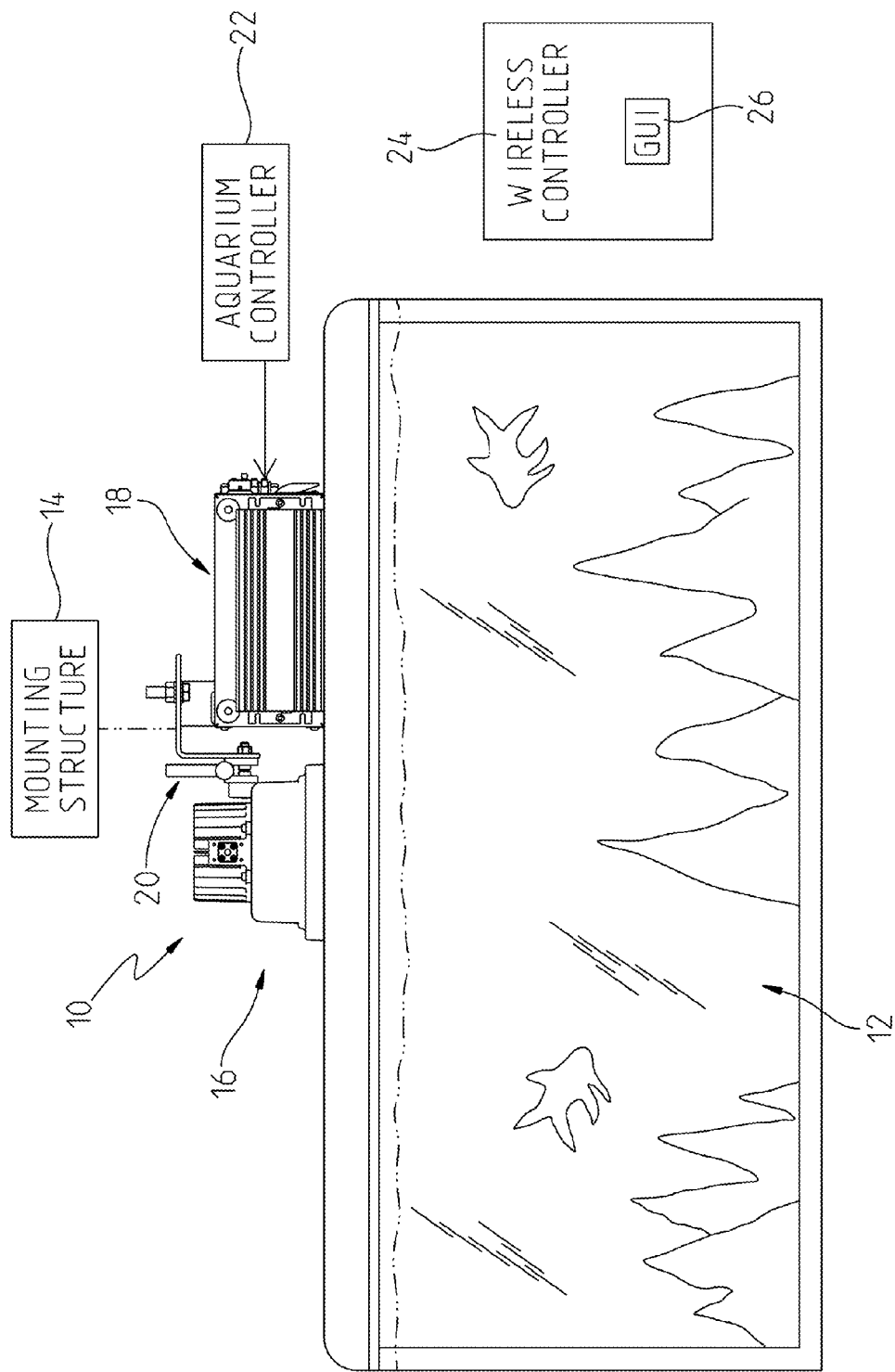
FIG. 1 illustrates an aquarium including a lighting apparatus.

For the purposes of promoting an understanding of the principles of the present disclosure, reference will now be made to the embodiments illustrated in the drawings, which are described below. The embodiments disclosed below are not intended to be exhaustive or limit the present lighting system to the precise form disclosed in the following detailed description. Rather, the embodiments are chosen and described so that others skilled in the art may utilize their teachings. Therefore, no limitation of the scope of the lighting system is intended. The present lighting system includes any alterations and further modifications of the illustrated devices, systems and described methods and further applications of the principles of the present disclosure which would normally occur to one skilled in the art. Corresponding reference characters indicate corresponding parts throughout the several views.

Figure 1A:
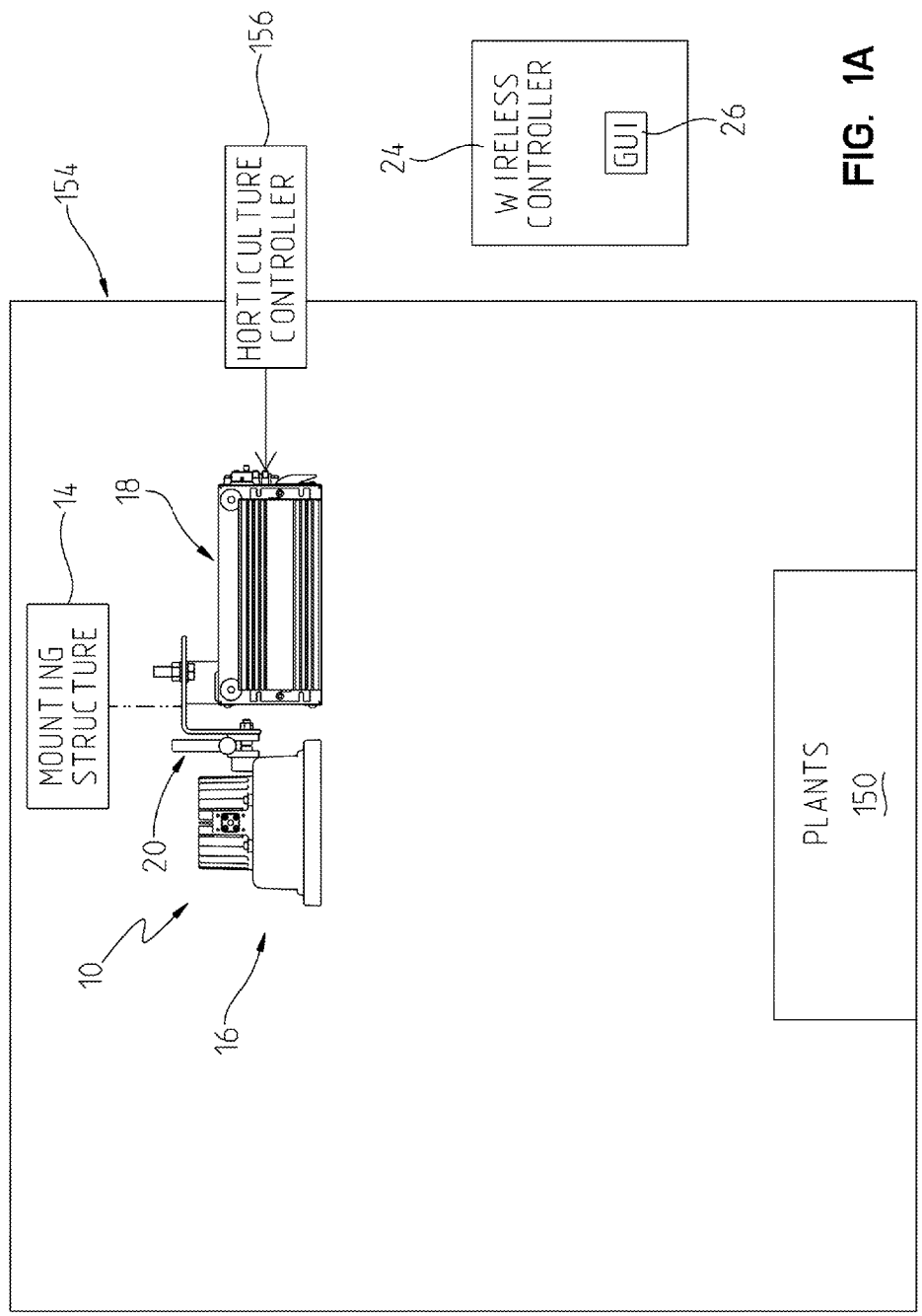
FIG. 1A illustrates a plant growing apparatus including a lighting apparatus.

In an illustrated embodiment of the present disclosure a lighting apparatus 10 shown. Referring to FIG. 1, one or more of lighting apparatus 10 may be used to illuminate an aquarium 12. Referring to FIG. 1A, one or more of lighting apparatus 10 may be used to illuminate one or more plants 150 which are being grown in a horticultural facility. Exemplary horticultural facilities include greenhouses and other plant growth structures. Referring to FIG. 1B, one or more of lighting apparatus 10 may be used to illuminate one or more areas of a facility 152. Exemplary facilities include high bay warehouses, other high bay facilities, office space, retail space, and other suitable facilities.

Figure 2:
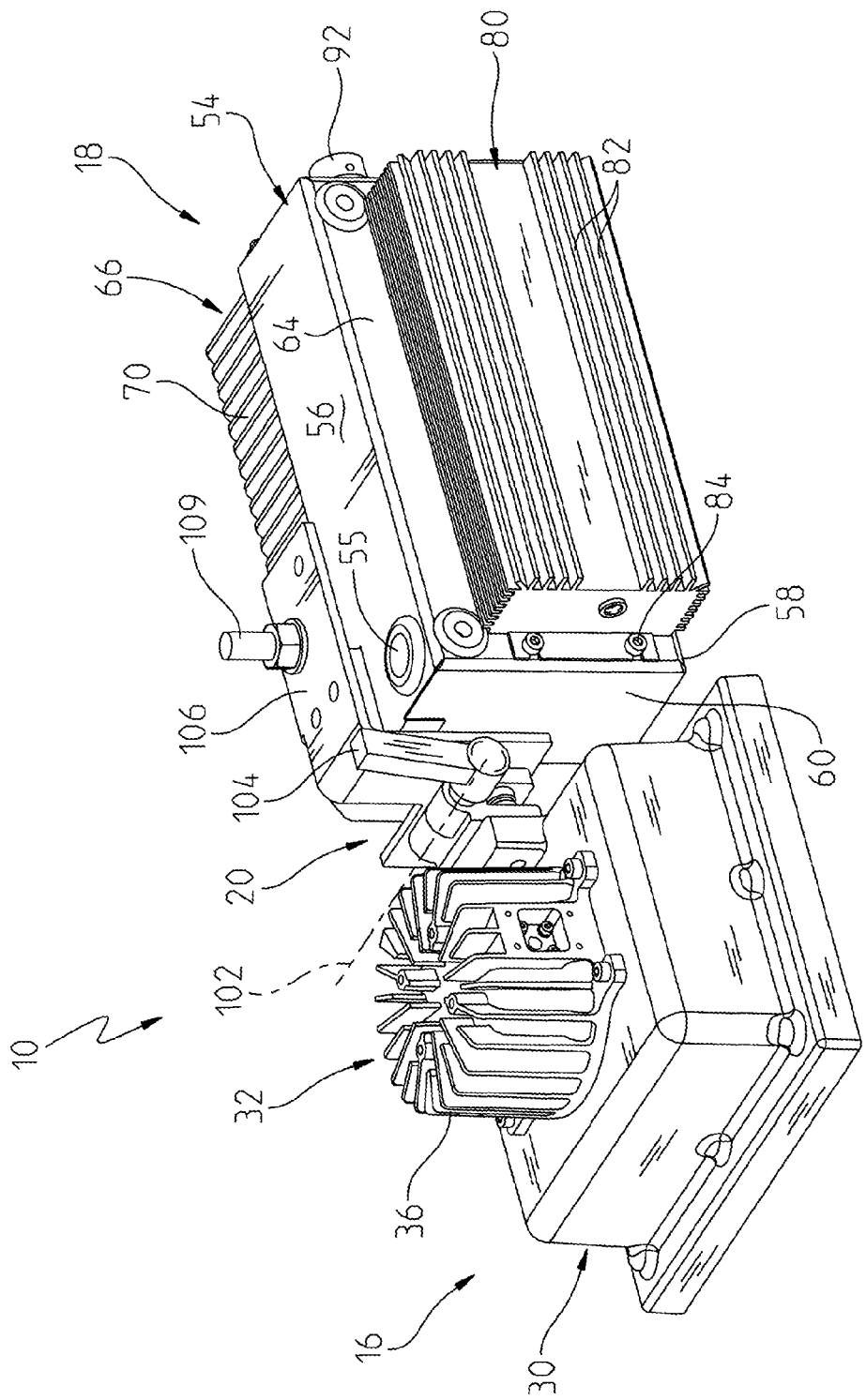
FIG. 2 illustrates a top, perspective view of an exemplary lighting apparatus for use with the systems of FIGS. 1-1B.
Figure 2A:
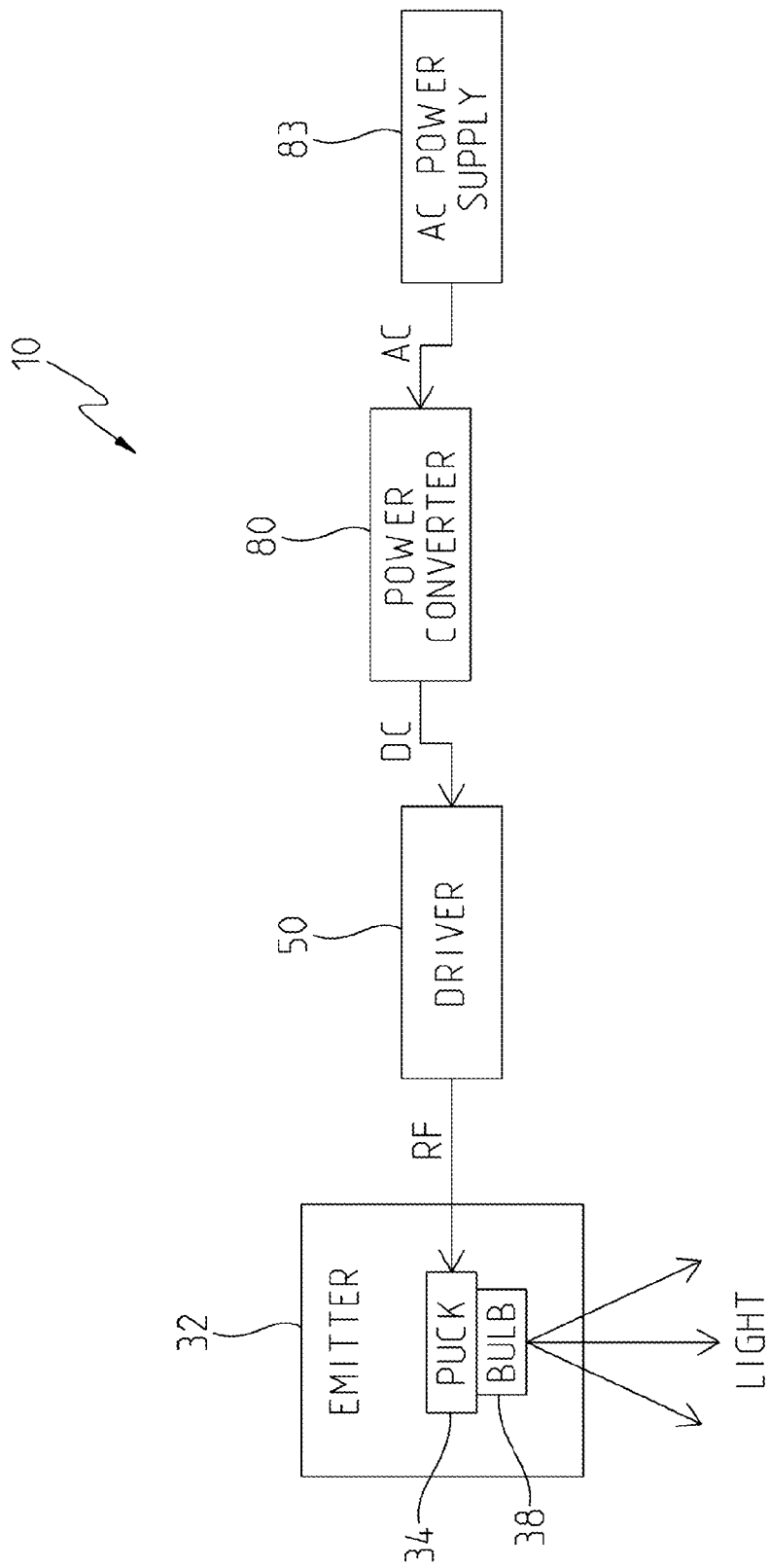
FIG. 2A illustrates an exemplary lighting apparatus.

Referring to FIG. 2A, the lighting apparatus 10 includes an emitter 32 which receives a radio frequency (RF) signal from a power amplifier or driver 50. The RF signal is input into a resonant cavity or puck 34 having a sealed quartz bulb 38. The puck 34 driven by the power amplifier 50 creates a standing wave confined within its walls. The electric field of the standing wave is strongest at the center of the bulb 38 resulting in the ionization of the gasses inside the bulb 38. The ionized gas vaporizes contents of the bulb 38 into a plasma state at the center of bulb 38 to generate an intense source of light. An exemplary emitter is model number STA 41-02 light emitting plasma emitter available from Luxim® located in Sunnyvale, Calif.

Driver 50 receives DC power from a power source or converter 80. Power source 80 receives AC power from an AC power supply 83, such as the grid, and rectifies the AC power to produce a DC power signal for power source 80.

Figure 18:
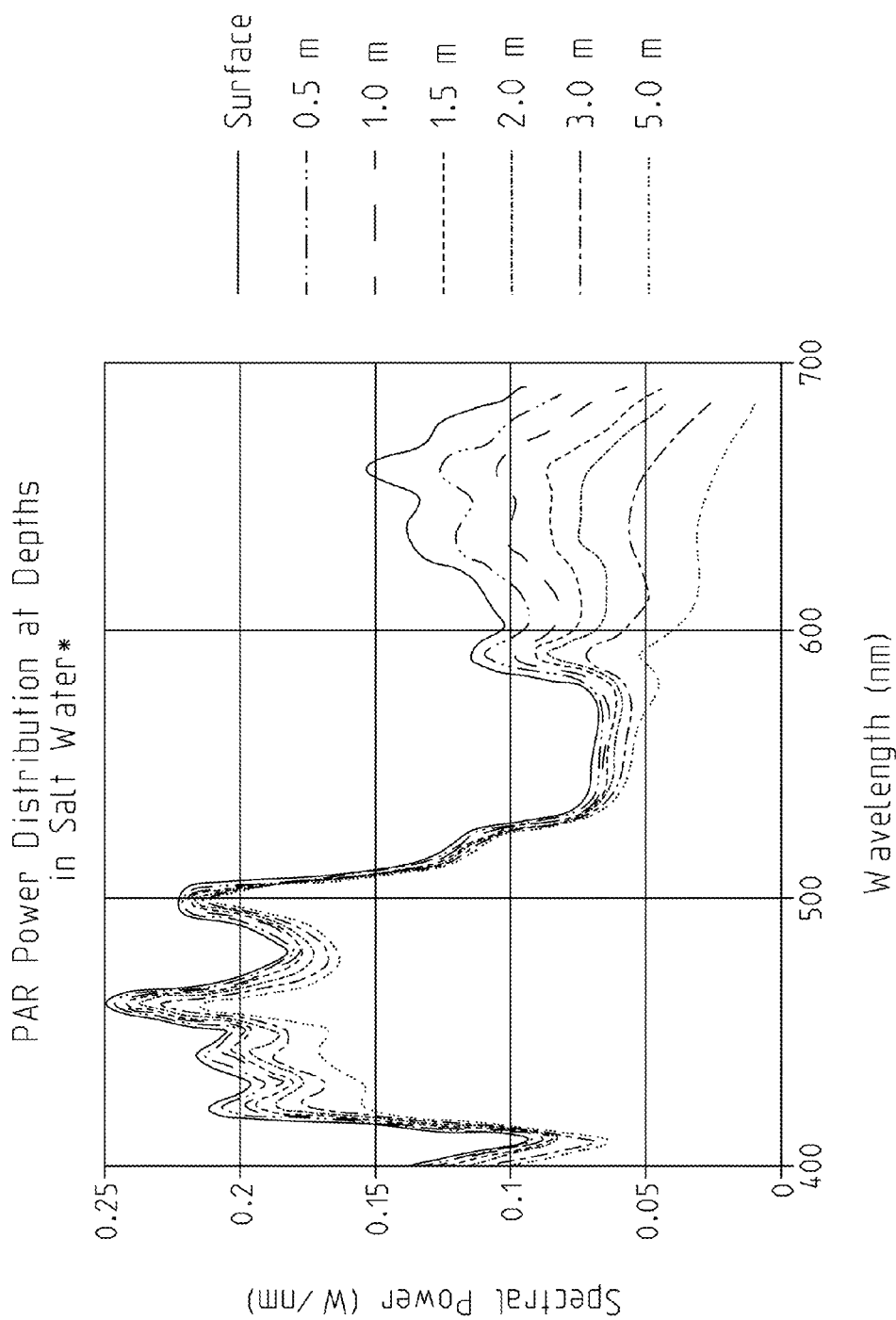
FIG. 18 illustrates a graph illustrating PAR power distribution of the lighting apparatus of the present disclosure taken at different depths within a salt water aquarium.

Returning to FIG. 1, in the illustrated embodiment, the lighting apparatus 10 is suspended over the aquarium 12 with a suitable mounting structure 14. Mounting structure 14 may include, for example, a cable, a mounting bracket, a hood or other suitable structure located over the aquarium 12 for supporting the lighting apparatus 10. In illustrated embodiments, the lighting apparatus 10 is suspended about one foot over the water in an open top aquarium 12. Each lighting apparatus 10 illuminates an area of about 3'×3' to a depth of roughly 3' within the aquarium 12. Of course, as illustrated in FIG. 18, lighting apparatus 10 may illuminate through deeper depths of aquarium water.

The illustrated lighting apparatus 10 includes an emitter assembly 16 pivotably coupled to a driver assembly 18 by a hinge assembly 20. As discussed below, the hinge assembly 20 structurally and thermally separates the emitter assembly 16 from the driver assembly 18 to provide an energy efficient lighting apparatus 10 having a compact design with effective heat management characteristics.

The lighting apparatus 10 may be coupled to a conventional aquarium controller 22, if desired, which controls turning the lighting apparatus 10 on and off and selectively dimming the light emitted by the lighting apparatus 10. Aquarium controller 22 also typically controls heating and cooling of the aquarium, a pump, and/or a wave generator. Alternatively, the lighting apparatus 10 includes manual controls for turning the lighting apparatus 10 on and off and dimming the light as discussed below.

In one embodiment, the lighting apparatus 10 is controlled to simulate environmental characteristics. A first environmental characteristic is sunrise and sunset. An intensity of the lighting apparatus 10 may slowly be raised in the morning to simulate sunrise and in the evening slowly dimmed to simulate a sunset. A second environmental characteristic is the lunar cycles. The intensity output of lighting apparatus 10 may be altered during nighttime hours to simulate different stages of the moon, such as a full moon or crescent moon.

Figure 19:
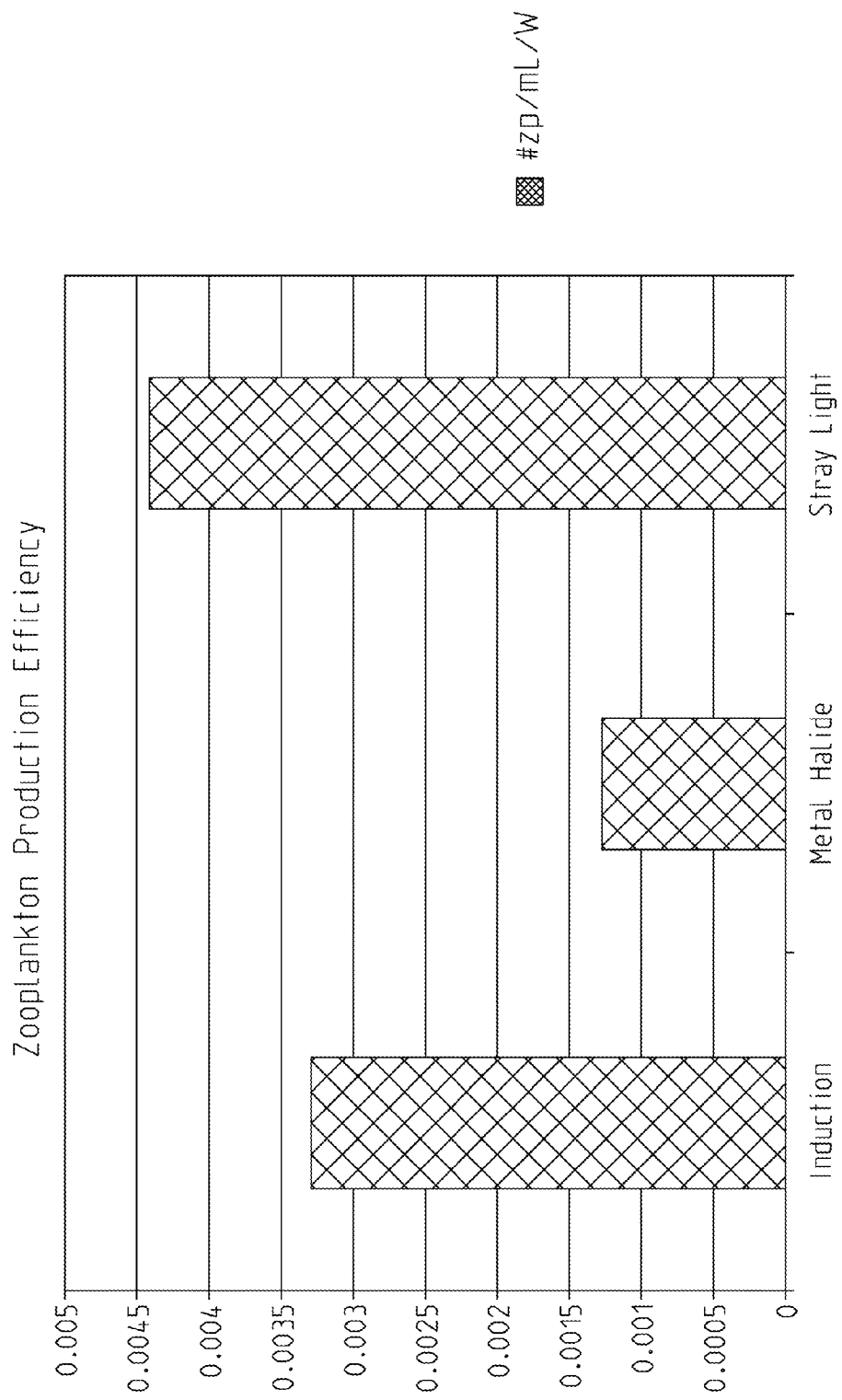
FIG. 19 illustrates a graph comparing a zooplankton production efficiency for different lighting units.
Figure 20:
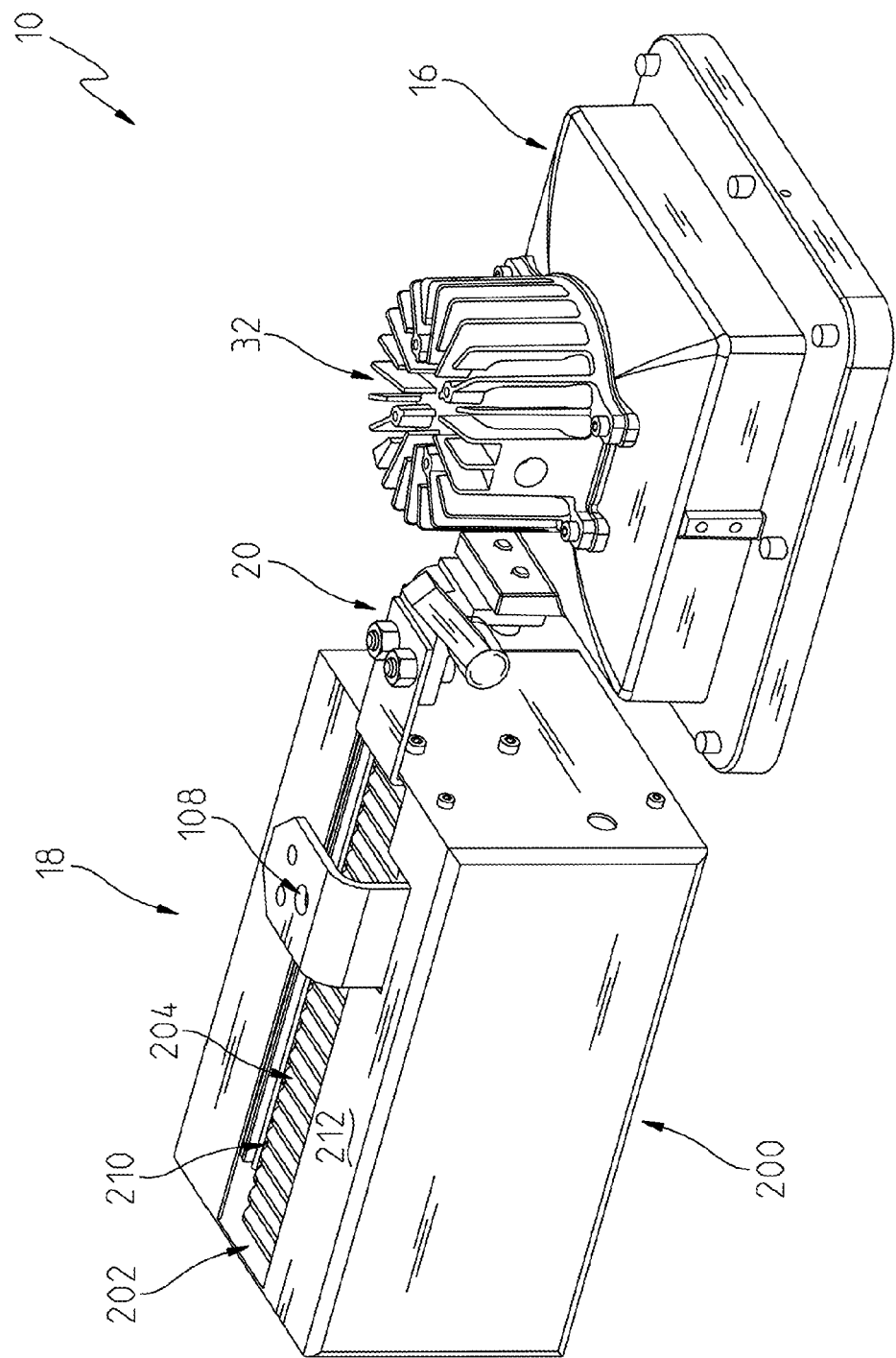
FIG. 20 illustrates a top perspective view of another exemplary lighting apparatus of the present disclosure.

Lighting apparatus provides light for promoting the growth of aquatic plants and organisms. Referring to FIG. 19, a comparison of the production efficiency of zooplankton for different lighting technologies is illustrated. Lighting apparatus 10 is used to grow microorganisms (zooplankton) in food generation tanks. The measure used in FIG. 19 is the number of zooplankton per milliliter per watt (#zp/mL/W). Lighting apparatus 10 produced 34% more #zp/mL/W than induction lighting systems and 240% more #zp/mL/W than metal halide lighting systems. In addition to increased zooplankton production, the aquarium tank illuminated with lighting apparatus 10 had less "pond scum" formation on the top. Pond scum reduces further food formation because it blocks light at the surface. One potential explanation for the reduction in pond scum is that the full spectrum profile of lighting apparatus 10 causes the nutrients to be consumed in a better/ healthier way which reduces the scum formation.

Returning to FIG. 1A, in the illustrated embodiment, the lighting apparatus 10 is suspended over plants 150 with a suitable mounting structure 14. Mounting structure 14 may include, for example, a cable, a mounting bracket, a hood or other suitable structure located over the plants 150 for supporting the lighting apparatus 10. In one embodiment, plants 150 are housed in a greenhouse 154.

The lighting apparatus 10 is used to supplement natural lighting to facilitate the growth of plants 150. In one embodiment, lighting apparatus is the primary source of light for plants 150. As mentioned herein, the illustrated lighting apparatus 10 includes an emitter assembly 16 pivotably coupled to a driver assembly 18 by a hinge assembly 20. As discussed below, the hinge assembly 20 structurally and thermally separates the emitter assembly 16 from the driver assembly 18 to provide an energy efficient lighting apparatus 10 having a compact design with effective heat management characteristics.

The lighting apparatus 10 may be coupled to a horticultural controller 156, if desired, which controls turning the lighting apparatus 10 on and off and selectively dimming the light emitted by the lighting apparatus 10. Horticultural controller 156 also may control heating and cooling of the greenhouse 154, watering of plants 150, and providing fertilizers to the plants 150. Alternatively, the lighting apparatus 10 includes manual controls for turning the lighting apparatus 10 on and off and dimming the light as discussed below.

Figure 35:
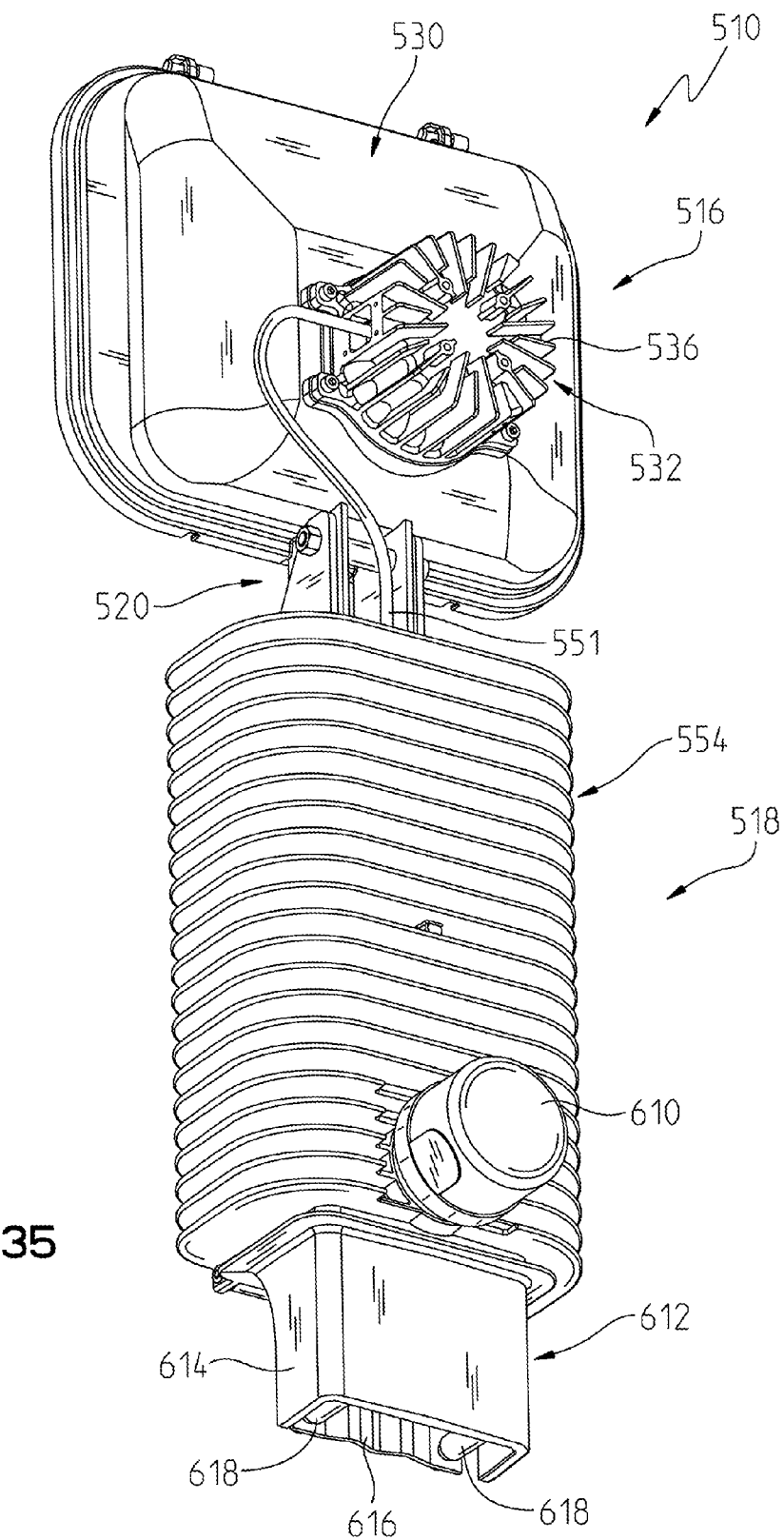
FIG. 35 illustrates a top perspective view of a lighting apparatus of FIG. 34.
Figure 36:
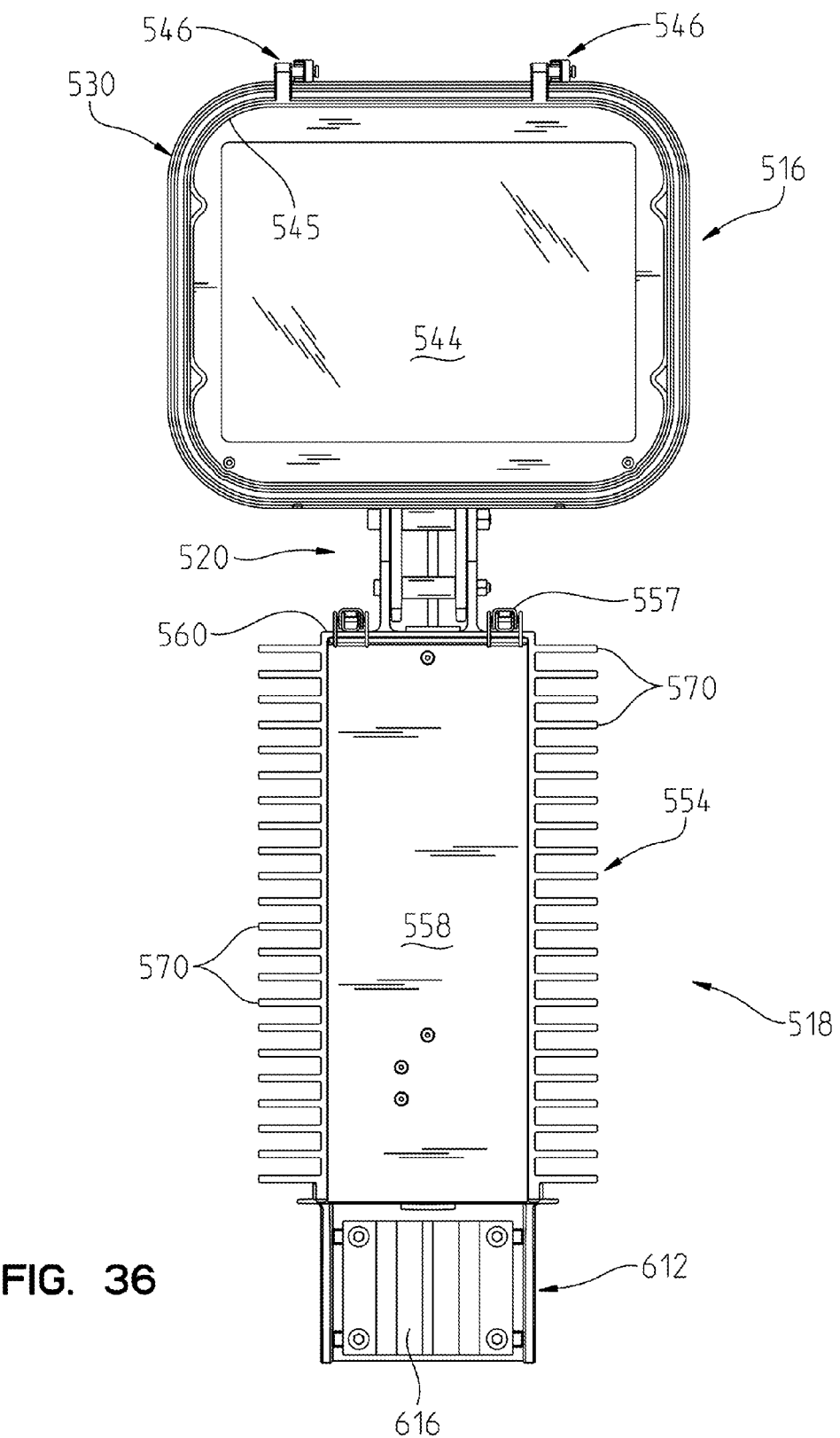
FIG. 36 illustrates a bottom view of the lighting apparatus of FIG. 34.
Figure 37:
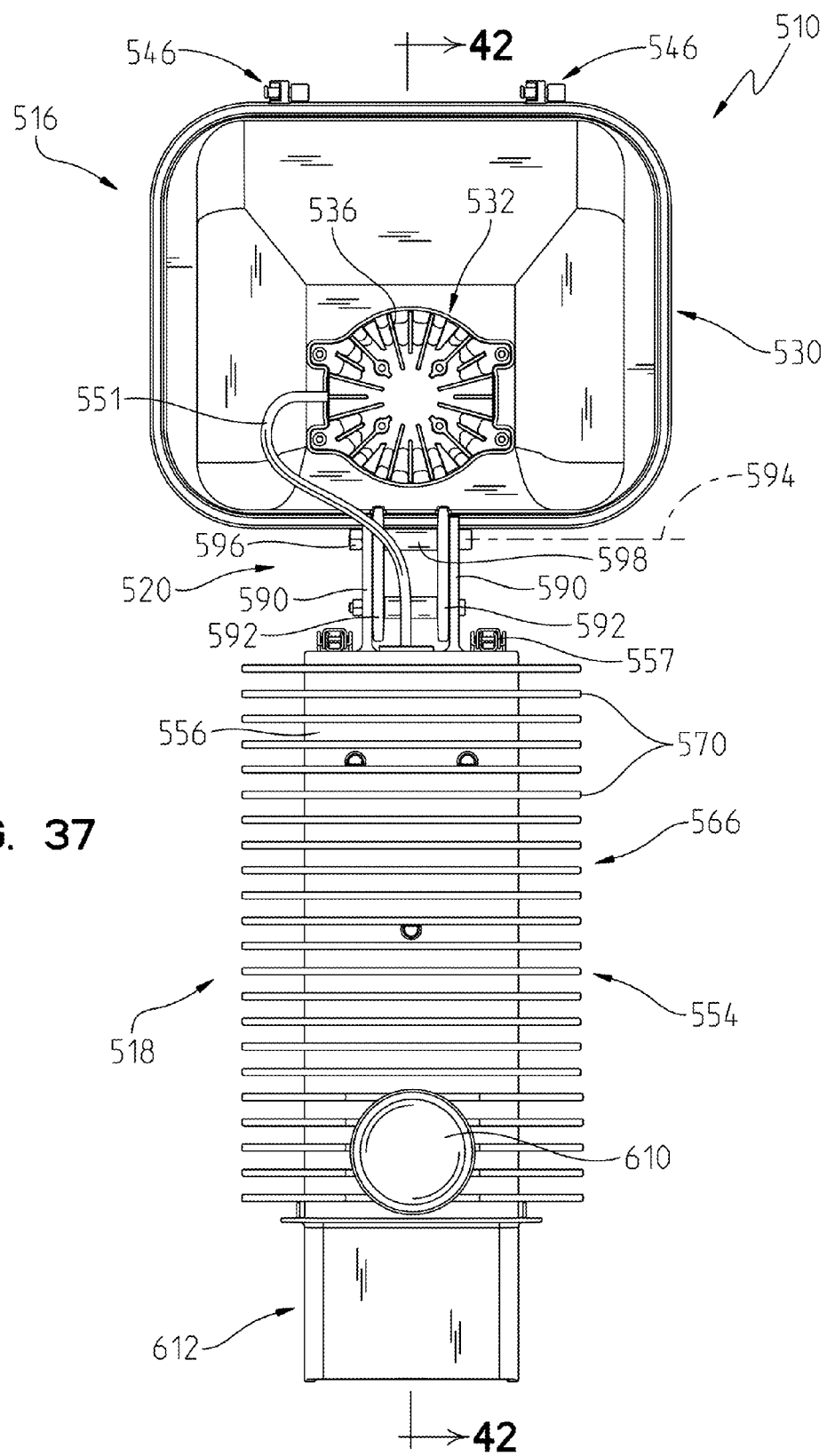
FIG. 37 illustrates a top view of the lighting apparatus of FIG. 34.

In one embodiment, the lighting apparatus 10 is controlled to provide supplemental lighting to plants 150. In one embodiment, lighting apparatus are used to provide supplemental lighting to simulate a longer day. In one example, the lighting apparatus 10 is at a higher power level early in the morning, decreasing as the amount of natural light increases, and then increasing again as the amount of natural light decreases. In one embodiment, lighting apparatus 10 includes a photocell 610 (see FIG. 35) which may provide an input of the level of natural light. Based on the reading from the photocell 610, lighting apparatus 10 or horticultural controller 156 may control the on/off state of lighting apparatus 10 and/or the dim level of lighting apparatus 10.

Lighting apparatus 10 has been used to provide lighting to cucumbers, tomatoes, peppers all of which have shown good production. For example cucumber plants grown indoor for about two weeks using lighting apparatus 10 achieved a dry weight more than 2 times greater than plants grown under fluorescent tubes and more than 1.5 times greater than plants grown under high-pressure sodium lamps.

Lighting apparatus 10 are full spectrum thus offering energy to chlorophyll a, chlorophyll b, and carotenoids. Micromoles is a measure of the number of photons emitted by a light source that are usable to plants. Table 1 provides a comparison the Micromoles/per lumen for various light sources.

TABLE I

| Light Source | Micromoles/lumen |
| --- | --- |
| high pressure sodium (HPS) | 0.13 |
| metal halide | 0.15 |
| sunlight | 0.2 |
| lighting apparatus 10 (plasma) | 0.23 |

Returning to FIG. 1B, in the illustrated embodiment, the lighting apparatus 10 is suspended over a floor 160 of facility 152 with a suitable mounting structure 14. Mounting structure 14 may include, for example, a cable, a mounting bracket, a hood or other suitable structure located over the floor 160 for supporting the lighting apparatus 10.

The lighting apparatus 10 is used to supplement natural lighting of the facility 152. In one embodiment, lighting apparatus is the primary source of light for facility 152. As mentioned herein, the illustrated lighting apparatus 10 includes an emitter assembly 16 pivotably coupled to a driver assembly 18 by a hinge assembly 20. As discussed below, the hinge assembly 20 structurally and thermally separates the emitter assembly 16 from the driver assembly 18 to provide an energy efficient lighting apparatus 10 having a compact design with effective heat management characteristics.

The lighting apparatus 10 may be coupled to a facility controller 162, if desired, which controls turning the lighting apparatus 10 on and off and selectively dimming the light emitted by the lighting apparatus 10.

Lighting apparatus 10 has superior color index rendering (CRI) compared to other light sources. The improved CRI assists workers to see better and provide better quality checks on painting/coatings such as the identification of locations on a part where the coating was thin. Further, lighting apparatus 10 are robust under vibration.

In another embodiment, a wireless controller 24 is used to control the lighting apparatus 10 in one or more of the environments illustrated in FIGS. 1-1B. Illustratively, the wireless controller 24 includes a graphical user interface (GUI) 26 on a remote commuting device such as a laptop computer, phone, PDA or other suitable device. In one illustrated embodiment, a smart phone application is used to control turning the lighting apparatus 10 on and off and selectively dimming the light. In one embodiment, the lighting apparatus 10 includes a receiver to receive command signals from wireless controller 24 and processing sequences executed by a controller to alter the state of lighting apparatus 10. In one embodiment, the respective aquarium controller 22, horticultural controller 156, and facility controller 162 includes a receiver to receive command signals from wireless controller 24 and processing sequences executed to alter the state of lighting apparatus 10.

Additional details of the lighting apparatus 10 are illustrated in FIGS. 2-10. The emitter assembly 16 includes a housing 30 and emitter 32. As best shown, for example, in FIG. 3A, the emitter 32 includes a central puck 34 and a plurality of heat sink fins 36 extending away from the housing 30 to dissipate heat.

Figure 14:
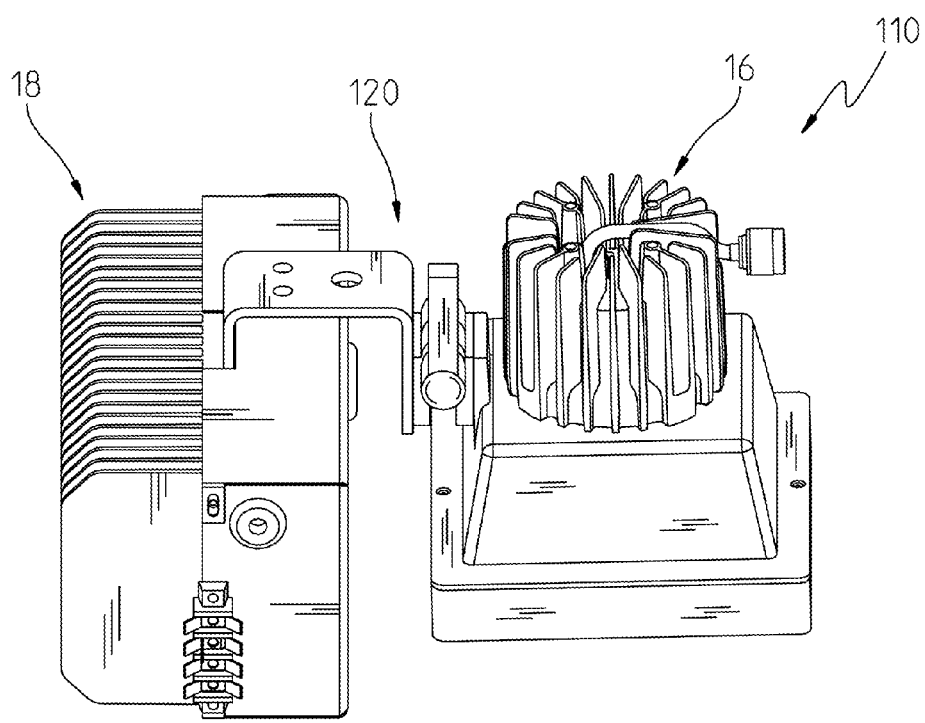
FIG. 14 illustrates a right side perspective view of the lighting apparatus of FIG. 11 having fins on the emitter housing.
Figure 16:
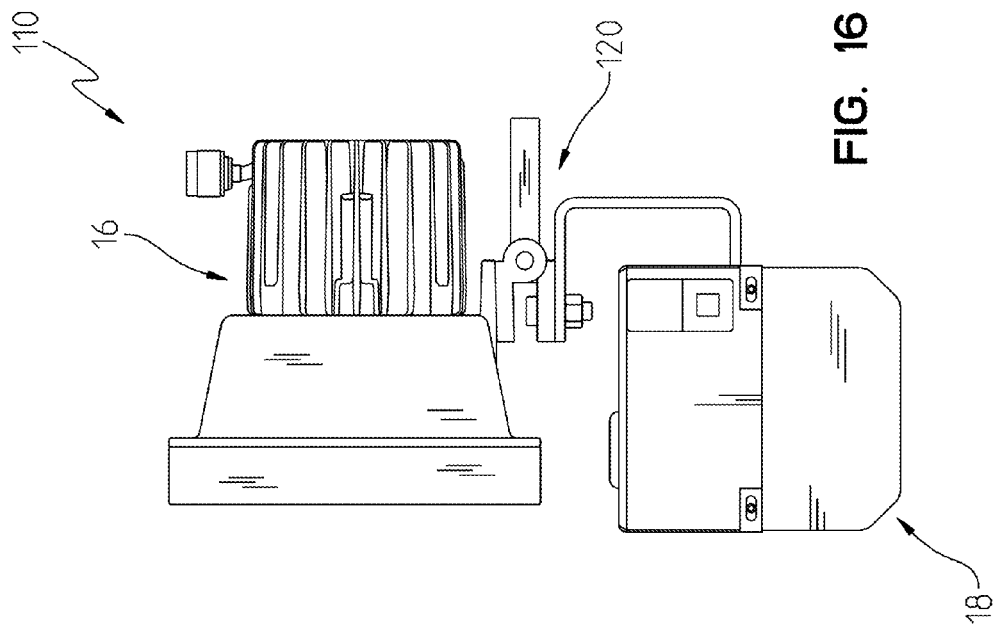
FIG. 16 illustrates a left side view of the lighting apparatus of FIG. 11.
Figure 15:
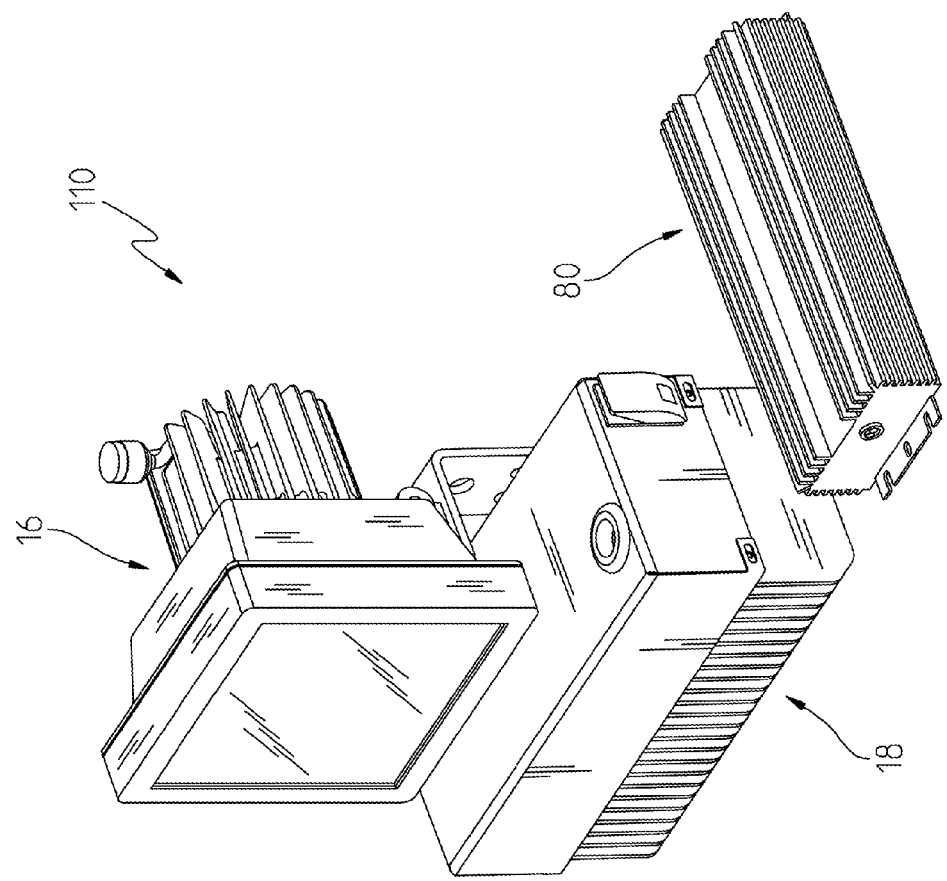
FIG. 15 illustrates a bottom perspective view of the lighting apparatus of FIG. 11.

Emitter 32 is illustratively a model number STA 41-02 light emitting plasma emitter available from Luxim® located in Sunnyvale, Calif. The emitter 32 illustratively includes a bulb 38 located within a dielectric material of the puck 34. The puck 34 is mounted within a body portion of emitter 32. A coaxial cable connector 33 (not shown in FIGS. 1-10) is coupled to the emitter 32. The coaxial connector 33 of the emitter 32 is illustratively coupled to a radio frequency (RF) driver 50 by a coaxial cable (not shown in FIGS. 1-10) also coupled to a coaxial connector 52 of the driver 50. The cable enters the driver housing 54 through opening 55 in top panel 56. The driver 50 generates a radio frequency (RF) signal which is guided through the coaxial cable and the puck 34 into an energy field around the bulb 38. The high concentration of energy in the electric field vaporizes contents of the bulb 38 into a plasma state at the center of bulb 38 to generate an intense source of light. FIGS. 14-16 illustrate the coaxial cable and connector 33 of emitter 32 in another embodiment of the light apparatus. See also, U.S. patent application Ser. No. 12/775,030 which is incorporated by reference herein.

Emitter assembly 16 further includes a reflector 40 located within an interior region 42 of housing 30. The standard reflector is 60×60 degrees. Other reflector options include a 110×110 degree flood, a 30×30 degree deep, and a 110×60 degree rectangular reflector. Custom shaped reflectors may also be used. A window 44 is coupled to an opening of housing 30. Window 44 is made from glass or other suitable material which allows light to pass therethrough.

The driver 50 is located within the driver assembly 18. More particularly, the driver 50 is mounted in a driver housing 54 having a top panel 56, a bottom panel 58, a first end panel 60, a second end panel 62, and a side panel 64. A heat sink block 66 is mounted to a side of driver housing 54 opposite from the side panel 64.

Figure 4A:
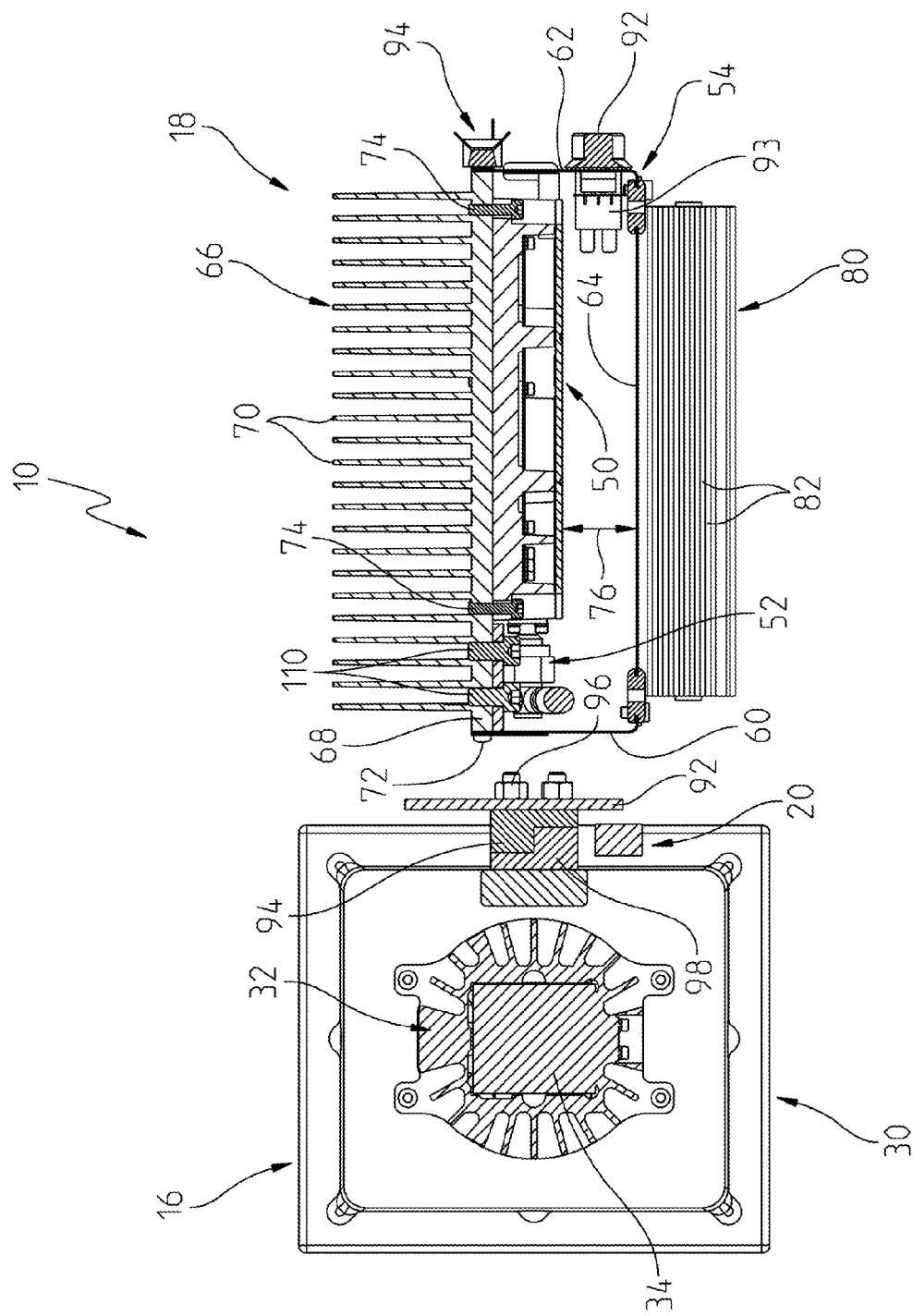
FIG. 4A illustrates a sectional view of the lighting apparatus of FIG. 2 along the lines 4A-4A shown in FIG. 3.
Figure 5:
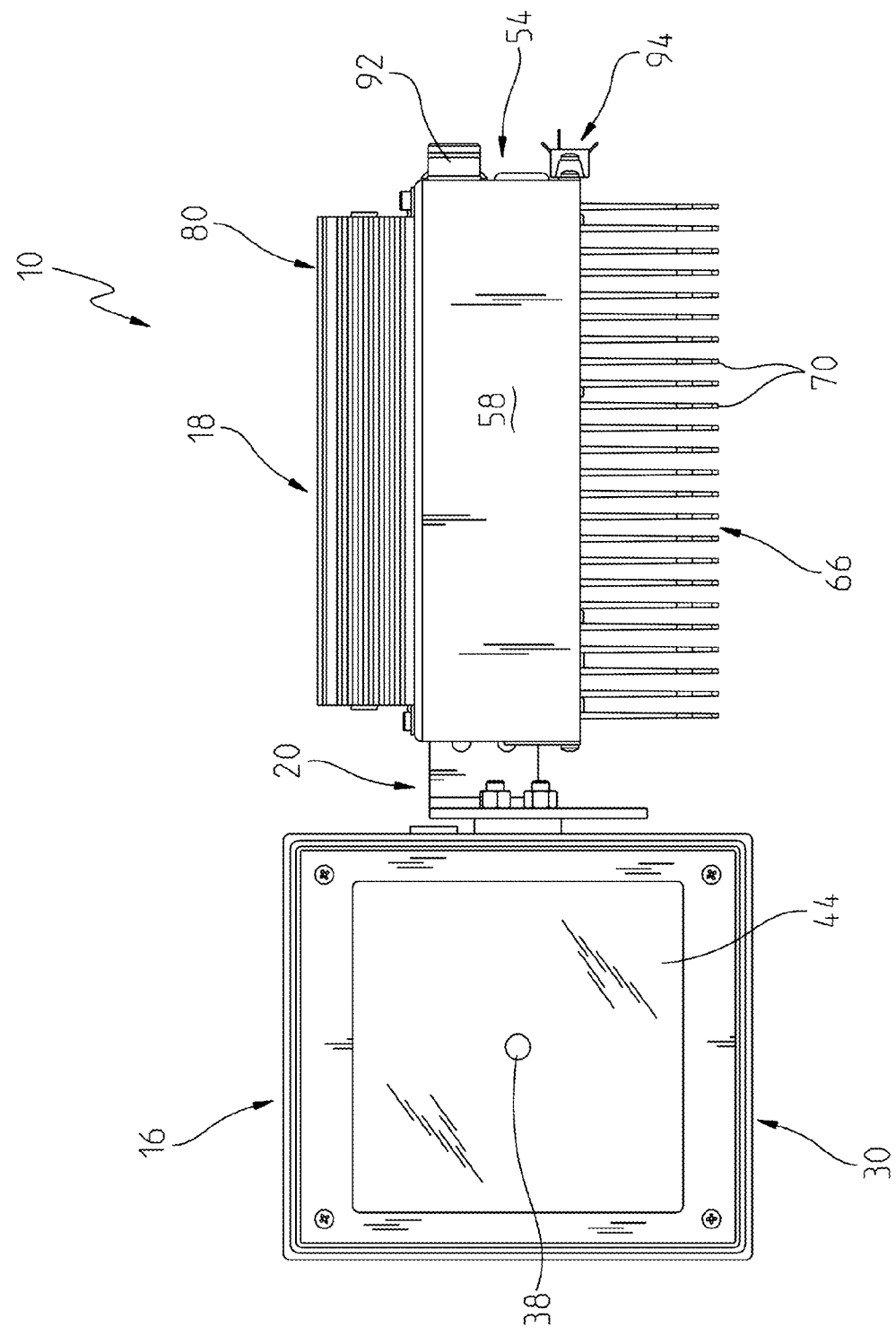
FIG. 5 illustrates a bottom view of the lighting apparatus of FIG. 2.
Figure 6:
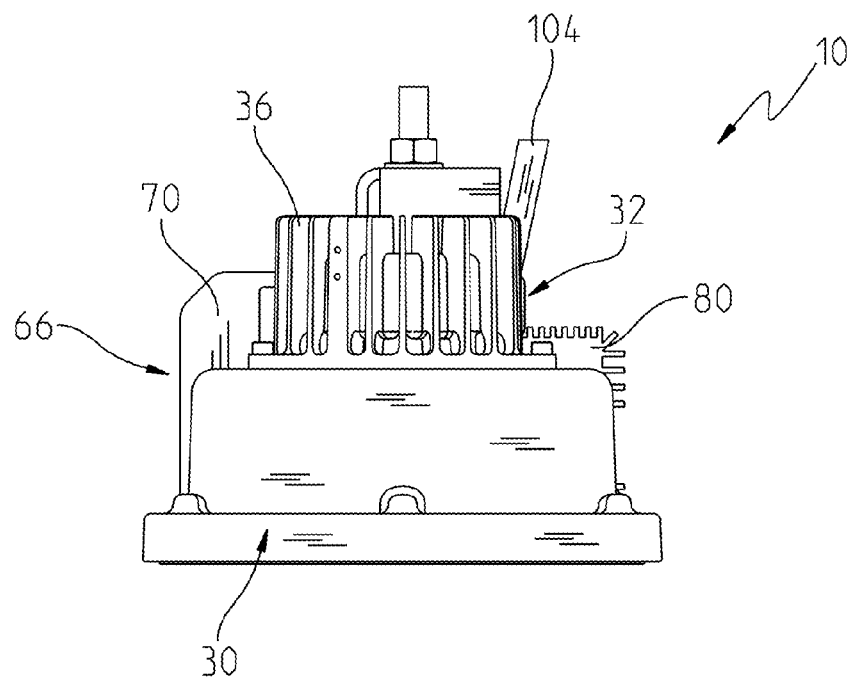
FIG. 6 illustrates a front view of the lighting apparatus of FIG. 2.

The heat sink block 66 includes a body portion 68 and a plurality of heat sink fins 70 extending away from the body portion 68 to dissipate heat as best shown in FIGS. 4 and 4A, for example. The body portion 68 of heat sink block 66 is coupled to the end panels 60 and 62 of driver housing 54 by suitable fasteners 72 which pass through the end panels 60, 62 and into the body portion 68.

Figure 3A:
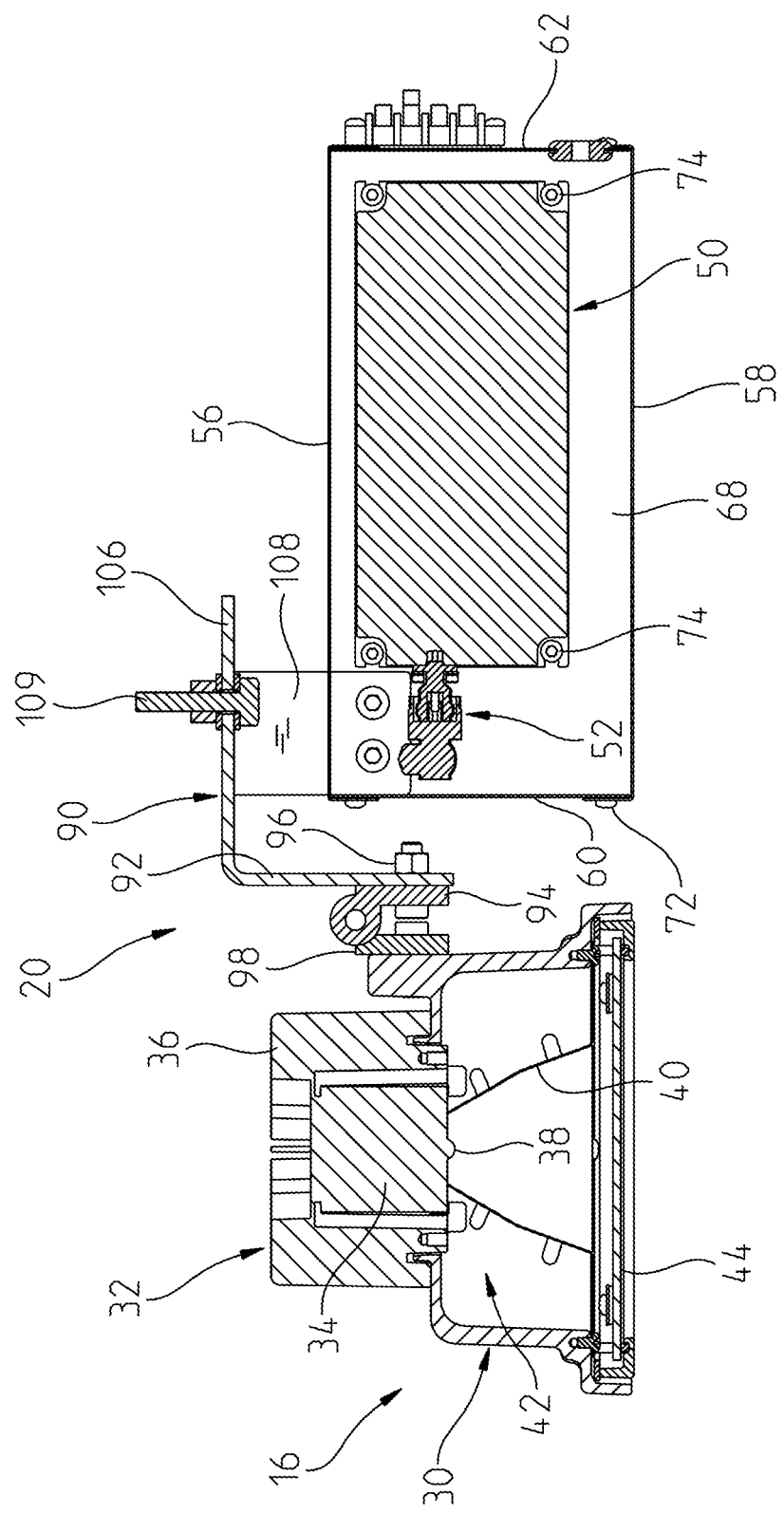
FIG. 3A illustrates a sectional view of the lighting apparatus of FIG. 2 along the lines 3A-3A shown in FIG. 4.
Figure 7:
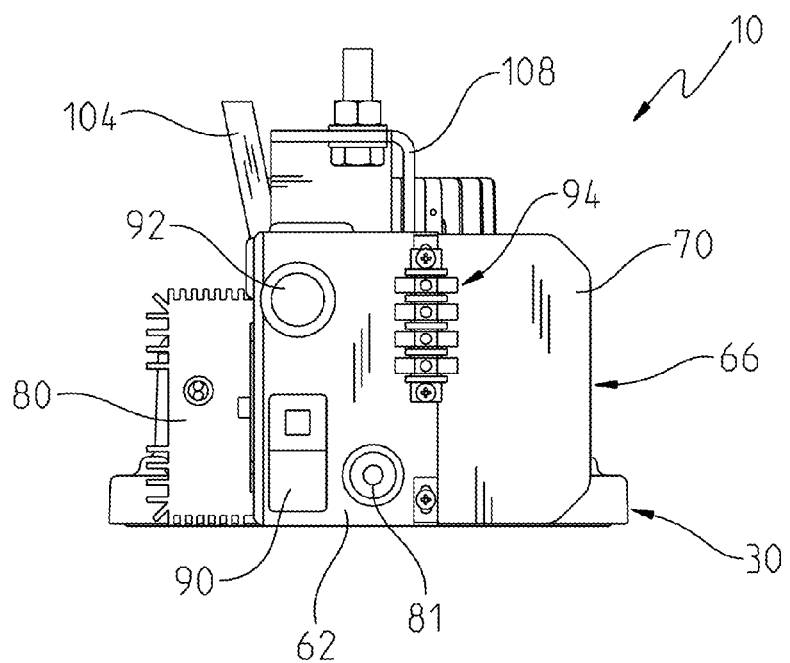
FIG. 7 illustrates a rear view of the lighting apparatus of FIG. 2.
Figure 8:
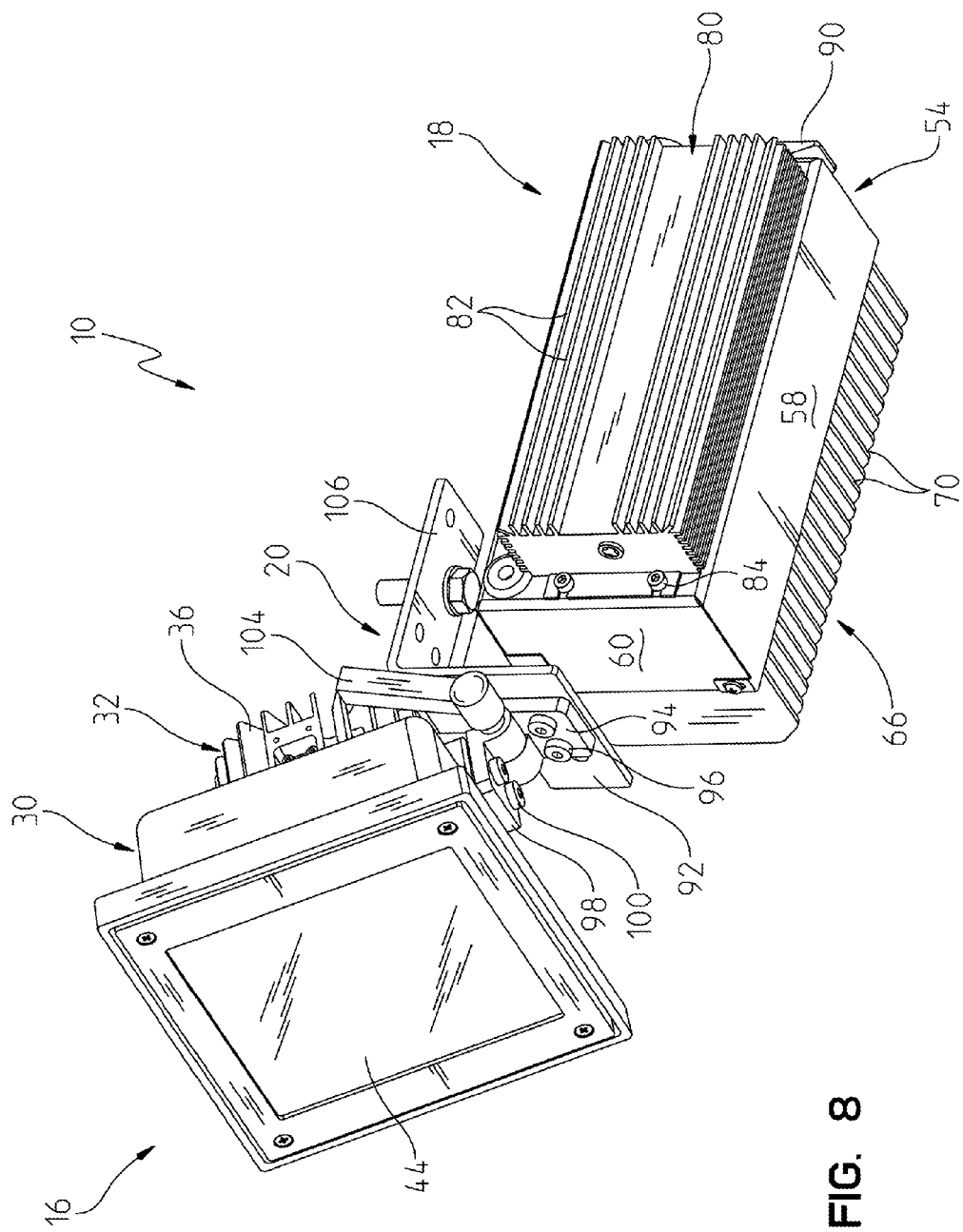
FIGS. 8 and 9 illustrate perspective views of the lighting apparatus of FIG. 2 with the emitter housing in a raised position.

The driver 50 is illustratively coupled to the body portion 68 of heat sink block 66 by fasteners 74 as shown in FIGS. 3A and 4A. The driver 50 is spaced apart from the opposite side panel 64 of driver housing 54 to provide an air gap 76 therebetween. A power supply 80 including a plurality of heat sink fins 82 is mounted to the side panel 64 of driver housing 54 by suitable fasteners 84. Power supply 80 is illustratively an Inventronics Model EUV300S028ST-SLB4. The power supply is illustratively an IP67 (Ingess Protection) rated, 300 W, 28V constant voltage supply, although any suitable power supply may be used. Inventronics is located in Hangzhou, China. A power chord (not shown) extends from the power supply 80 through an aperture 81 formed in end panel 62 as shown in FIG. 7. The dimension of air gap 76 may be adjusted during the manufacturing process depending upon the particularly driver 50 and power supply 80 specifications. The driver 50 has an internal temperature sensor which is monitored by a system controller. The heat sink fins 70 and 82 are sized and configured to maintain a temperature of the driver 50 at less than 75° C. in a 45° C. max ambient temperature.

As best shown in FIGS. 3, 7, 9 and 10, an on/off switch 86 and manual dimmer control knob 87 are coupled to the driver housing 54. Switch 86 turns the light apparatus 10 on and off manually. Knob 87 is rotatable to control a potentiometer 93 to adjust the intensity of light emitted from the emitter 16 from full power (100%) to about 20% of full power.

Certain embodiments of the lighting apparatus 10 may also include an input connector (commonly called the Terminal Block) 88 which receives inputs from wires of the aquarium controller 22 to control operation of the lighting apparatus 10. In an illustrated embodiment, the connector 88 receives inputs from the aquarium controller 22 which provide a 1-10V input to control dimming of the light from 20% to 100% of full power (maximum intensity). As discussed above, lighting apparatus 10 may also be controlled via the wireless controller 24. In one embodiment, the manual dimmer knob 87 is set at 100 percent.

Figure 9:
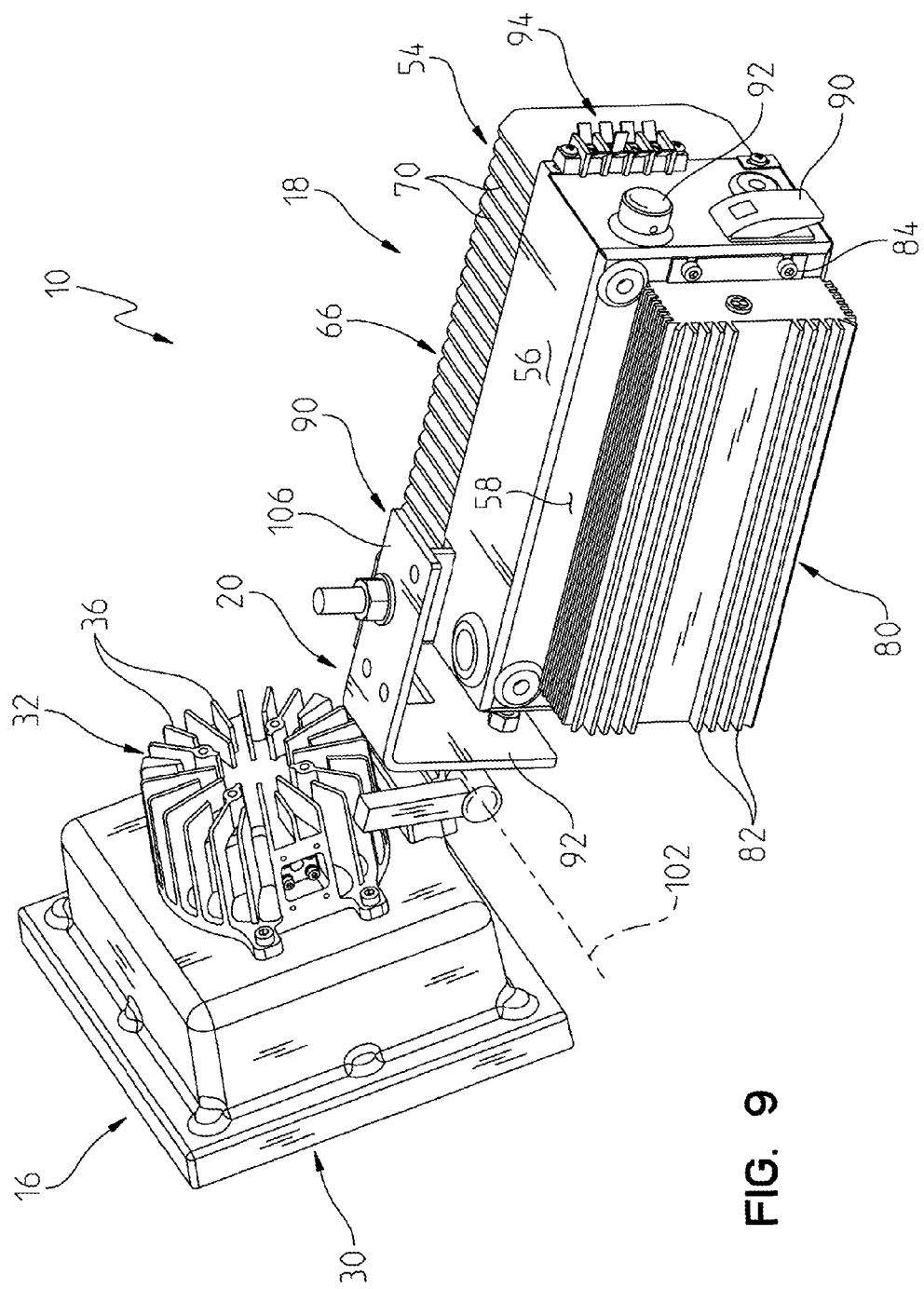
Figure 10:
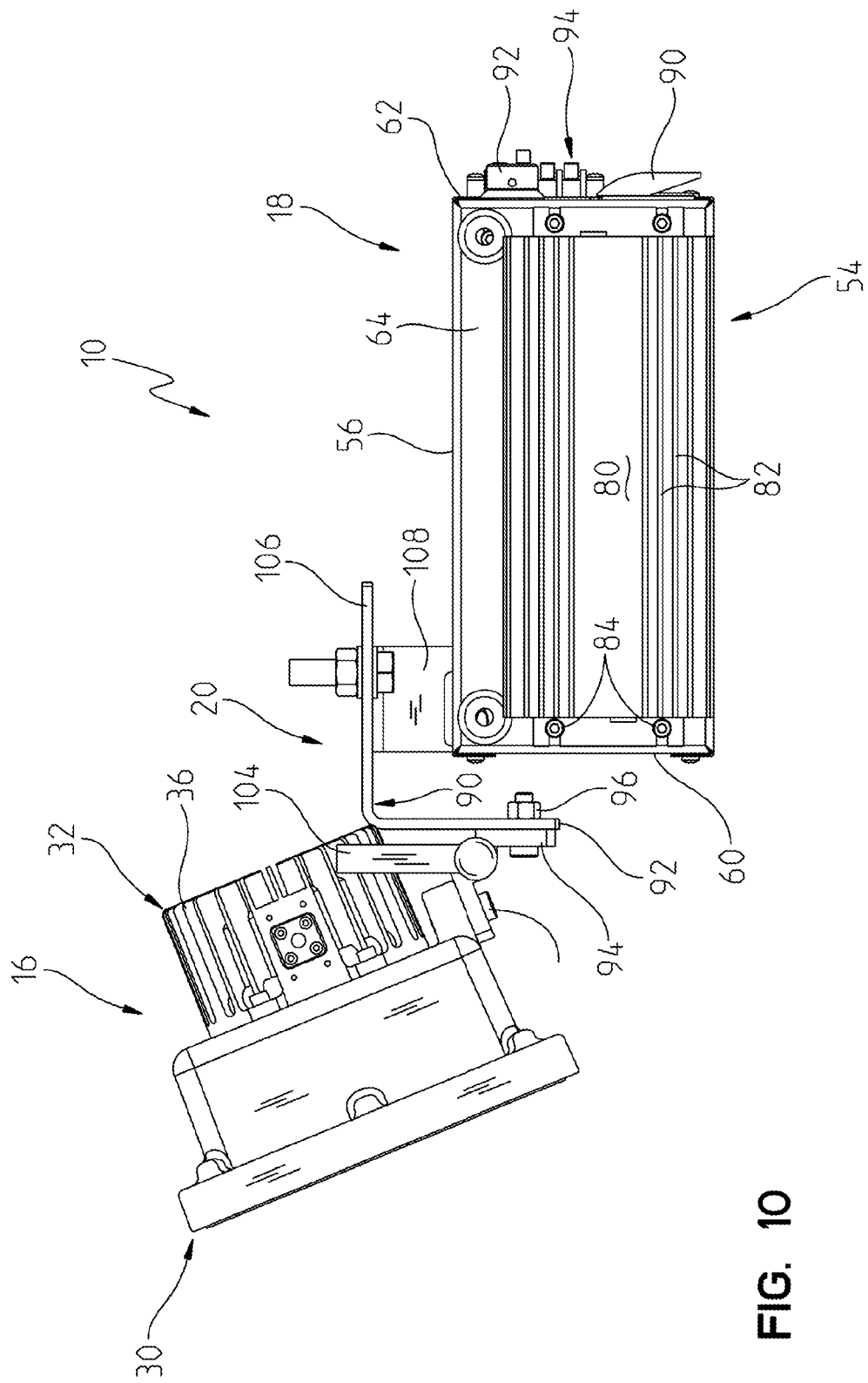
FIG. 10 illustrates a left side view of the raised configuration of FIG. 8.
Figure 11:
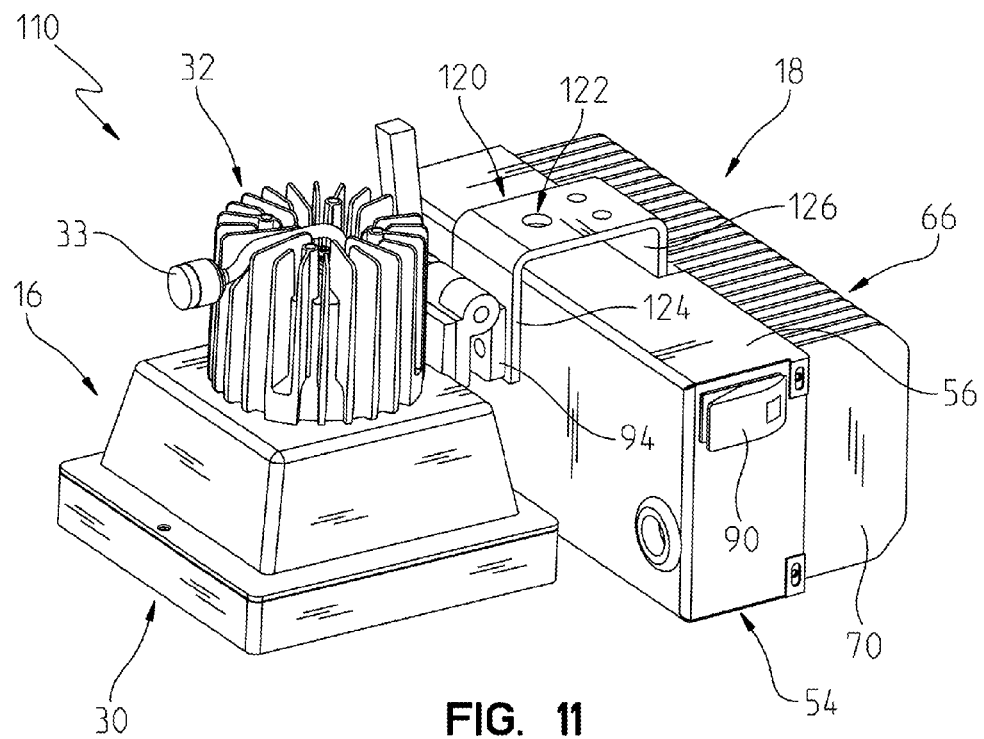
FIG. 11 illustrates a top perspective view of another exemplary lighting apparatus of the present disclosure.
Figure 12:
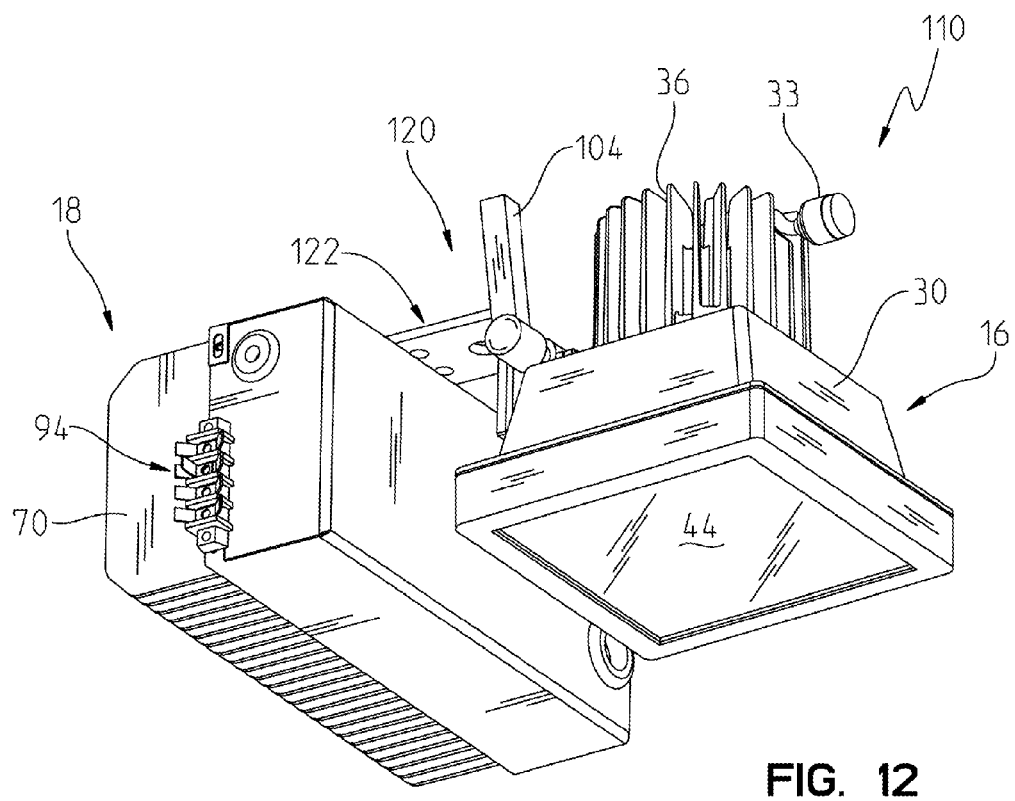
FIG. 12 illustrates a bottom perspective view of the lighting apparatus of FIG. 11.
Figure 13:
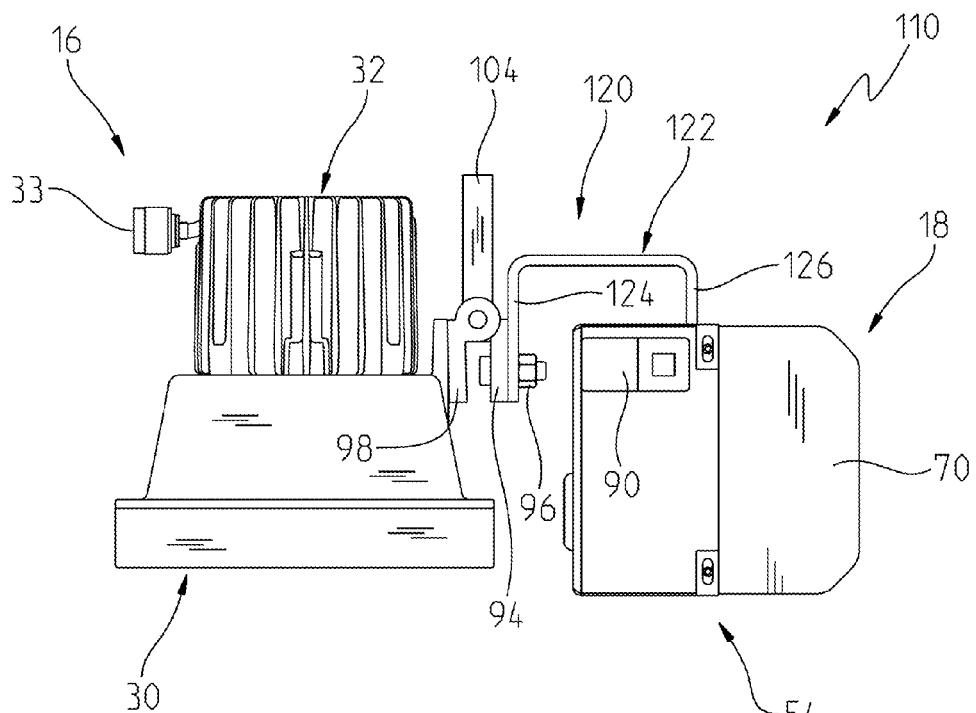
FIG. 13 illustrates a left side view of the lighting apparatus of FIG. 11.

The emitter assembly 16 is coupled to the driver assembly 18 by a hinge assembly 20. Hinge assembly 20 illustratively includes a formed bracket 90 having a first arm 92 connected to a first hinge portion 94 by suitable fasteners 96. A second hinge portion 98 is coupled to emitter housing 30 by suitable fasteners 100. First and second hinge portions 94 and 98 are connected to pivot about an axis 102. A handle 104 is illustratively movable from a first position to permit pivotal movement of the first and second hinge portions 94 and 98 about axis 102 to a second locked position in which the first and second hinge portions 94 and 98 are held in a fixed position relative to each other. Therefore, an operator can move the handle 104 to the first position and then pivot the emitter housing 30 to a desired location such as shown in FIGS. 9 and 10, for example. Once the emitter housing 30 is located in the desired position, the handle 104 can be moved to its second locked position to hold the emitter housing 30 in the desired position relative to the driver housing 54. The handle can also be pulled to disengage the handle from the tightening mechanism so once the hinge is tight you can position the hinge handle where you want it without loosening the hinge.

A second arm 105 of formed bracket 90 is coupled to a downwardly extending mounting bracket 108. A mounting bolt 109 is provided to secure the bracket 90 to the mounting structure 14. Mounting bracket 108 may be integrally formed with the bracket 90, welded to the bracket 90, or otherwise coupled by fasteners to the second arm 105 of bracket 90. Mounting bracket 108 is illustratively secured to the body portion 68 of heat sink block 66 by suitable fasteners 110 as best shown in FIG. 4A. Alternatively, the mounting bracket 108 may be welded or otherwise secured to a more rigid top panel 56 of driver housing 54.

The dimensions of bracket 90 are selected so that the emitter housing 30 is spaced apart from the driver housing 54 by a selected distance illustrated by dimension 112 in FIG. 4, for example. In one embodiment, distance 112 is about 10 mm. In one embodiment, distance 112 is at least about 2-4 inches depending on angle of head. The size and shape of the bracket 90 or other suitable mounting structure may be adjusted during the manufacturing process to maintain efficient cooling of the emitter 32, driver 50, and power supply 80 during operation of the lighting apparatus 10. The hinge assembly 20 of the lighting apparatus 10 structurally and thermally divides the emitter assembly 16 from the driver assembly 18. In other words, the heat sink 36 of the emitter 32 is separated from the heat sink block 66 of the driver 50 and the heat sink fins 82 of the power supply 80 structurally and thermally by the hinge assembly 20.

In one example, lighting apparatus 10 is set to full power and receives AC power from AC power supply 83. Of the received electrical power, about 7 percent of the power is dissipated as heat from the power supply 80, about 23 percent of the power is dissipated as heat from the driver 50, and about 32 percent of the power is dissipated as heat from the emitter 32. Emitter 32 operates at a higher temperature than the driver 50 or the power supply 80. By thermally separating emitter 32 from driver 50, by an air gap, an insulator coupling, or a metal coupling having a high thermal resistance (generally due to limited cross sectional area along heat flow path), the amount of heat transferred from the emitter to the driver is reduced.

The vertical orientation of the driver heat sink block fins 70 is designed to ensure good heat transfer from the heat sink 66 via natural convection of the surrounding air. The thin sheet metal driver cover provides a gap between the side of the driver 50 which is not mounted to the heat sink block 66 and the mounted side of the power supply 80. In addition the thin sheet metal hinders conduction of heat from the driver heat sink block 66 to the power supply 80. The ability to keep good air flow via natural convection over the power supply 80 is maintained by keeping it mounted outside of the sheet metal driver enclosure, although this result may also be achieved with a well perforated cover that allows sufficient airflow.

Another embodiment of the present invention is illustrated in FIGS. 13-16. The lighting apparatus 110 is similar to the lighting apparatus 10 discussed above. Components with the same reference numbers perform the same or similar function. In this illustrated embodiment, a coaxial connector 33 is shown coupled to the emitter as discussed above but not shown in FIGS. 1-10. The hinge assembly 120 in the embodiment of FIGS. 11-16 includes a U-shaped bracket 122 having a first leg 124 coupled to the first hinge portion 94. A second leg 126 of U-shaped mounting bracket 122 is coupled to body portion 68 of heat sink block 66 in a manner similar to the embodiment of FIGS. 1-10 discussed above. Alternatively, the second leg 126 may be welded or otherwise attached to a more rigid top panel 56 of driver housing 54. In the embodiment of FIGS. 11-16, the power supply 80 is separate from the driver housing 54. The power supply is coupled to the driver 50 by a cable as shown, for example, in FIG. 15. The power supply can be mounting to the driver cover via two L brackets. Also in both designs the hinge can be eliminated and the reflector housing attached directly to the brackets for lights that only need to shine in a static direction.

As discussed above, in the illustrated embodiment, the lighting apparatus includes energy efficient lights such as the plasma lighting. Illustrative features of one embodiment of the plasma lighting apparatus include:

| | |
|---|---|
| Weight | 17 lbs |
| Source Lumens | 23,000 |
| Fixture Lumens | 15,000+ with a ~17,000 typical |
| Energy Efficiency | 58 lumens/watt |
| Rated Average Life | 25,000 hours |
| Typical Turn-on Time | 40 seconds |
| Dimming Range | 20-100% |
| Voltage | 100-277 V |
| Power Consumption | 290 W |
| correlated color temperature (CCT) | 5,300 K |
| color rendering index (CRI) | 95 |

Figure 17:
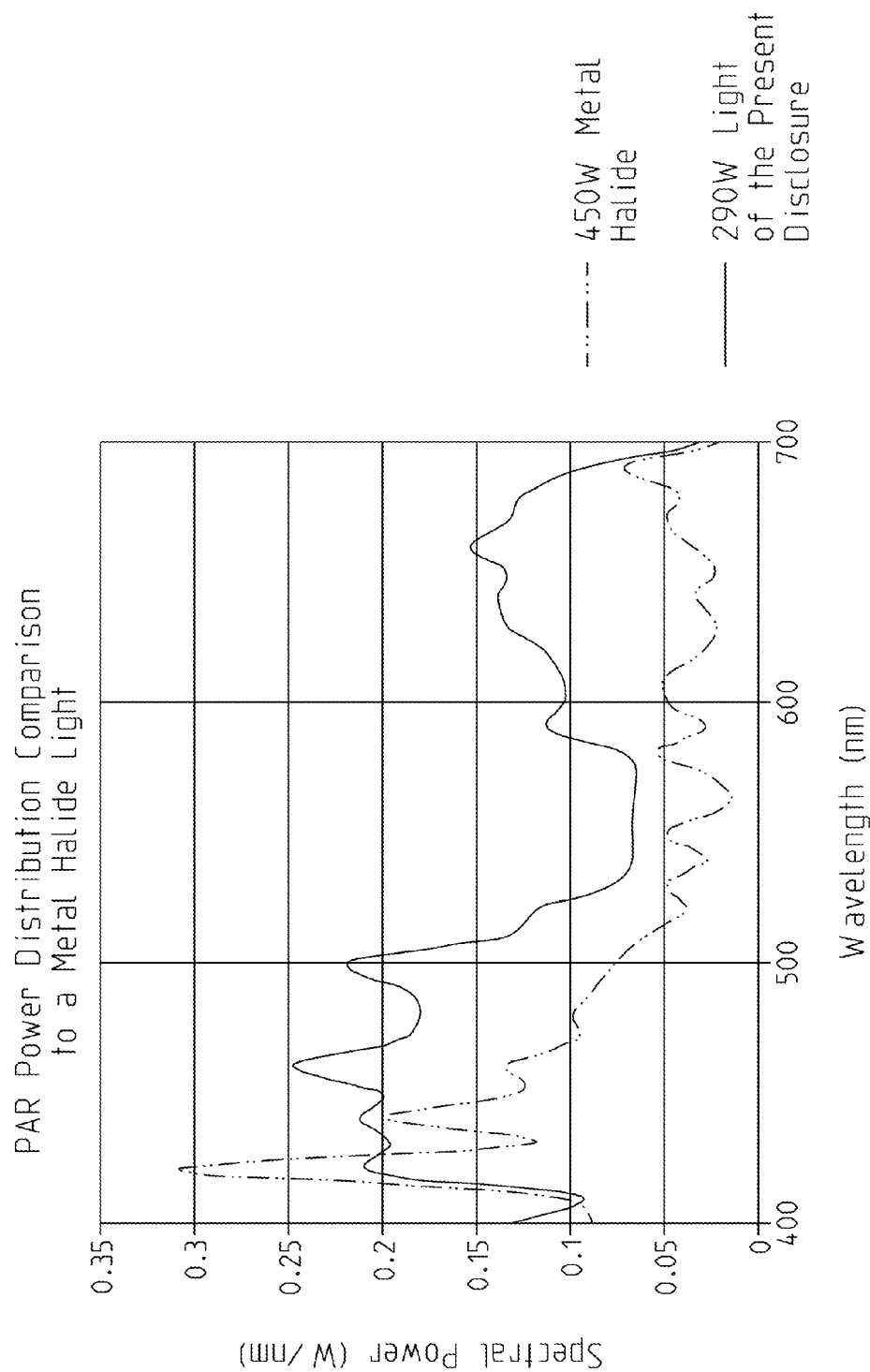
FIG. 17 illustrates a graph illustrating a comparison of photosynthetic active radiation (PAR) power distribution for the lighting apparatus of the present disclosure compared to a 450 W metal halide light.

The lighting apparatus 10 of the present disclosure provides a more efficient lighting option than traditional metal halide lighting systems. In an illustrated embodiment, present lighting apparatus provides 180-percent higher PAR value than that of a 10,000K, 400 W metal halide fixture while using just 290 W light emitter 32. See the graph in FIG. 17. The light also achieves full brightness in about 40 seconds. With a Correlated Color Temperature (CCT) of 5,300K at 100 percent, the present lighting apparatus provides a wide spectrum of lighting possibilities. When dimmed below 50 percent, the present lighting apparatus 10 emits a pleasant blue hue desirable in aquarium lighting with the benefits of simulating natural sunlight at full power. FIG. 18 is a graph of PAR power distribution taken at different depths in a salt water aquarium.

Figure 21:
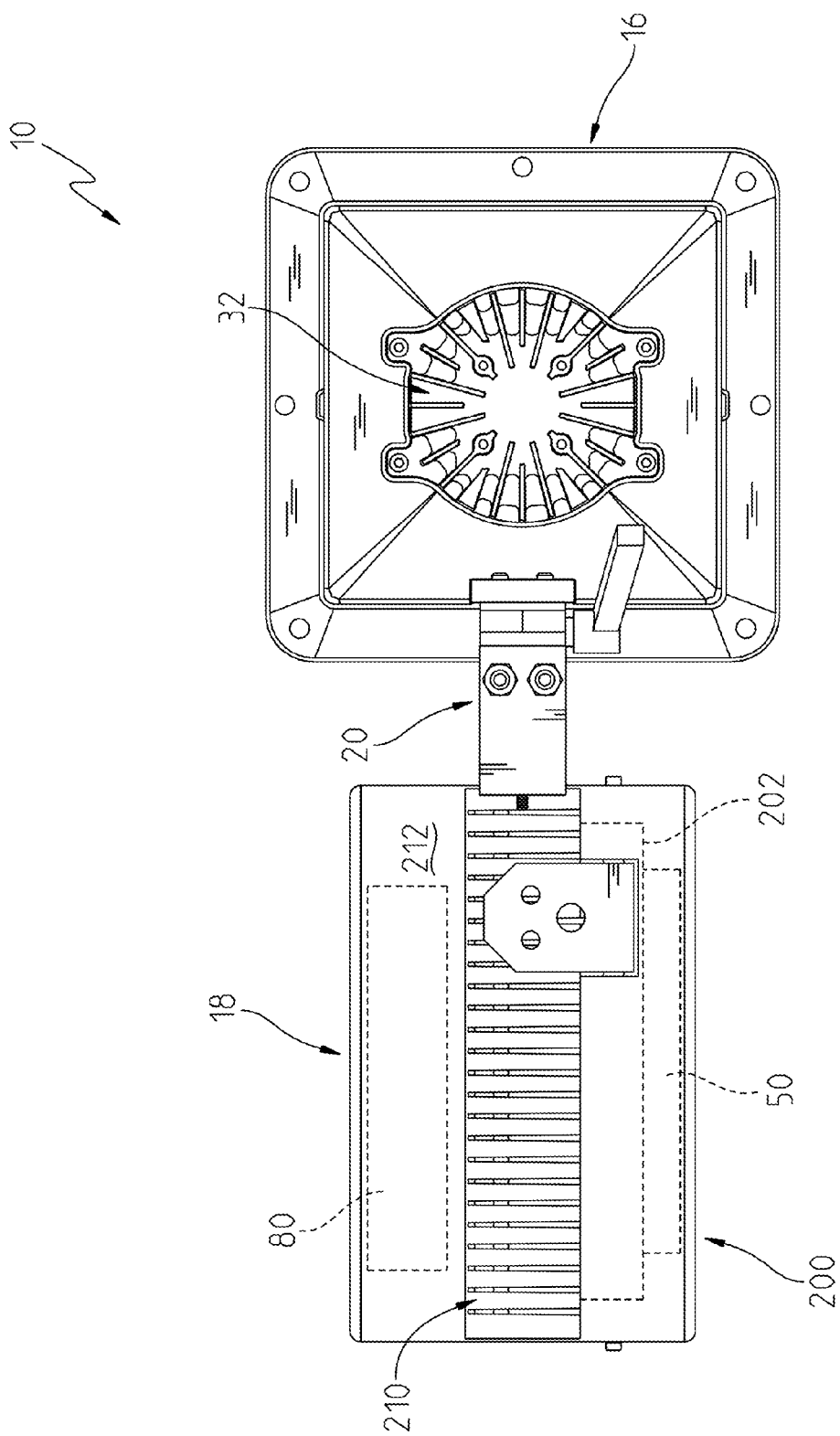
FIG. 21 illustrates a top view of the lighting apparatus of FIG. 20.
Figure 22:
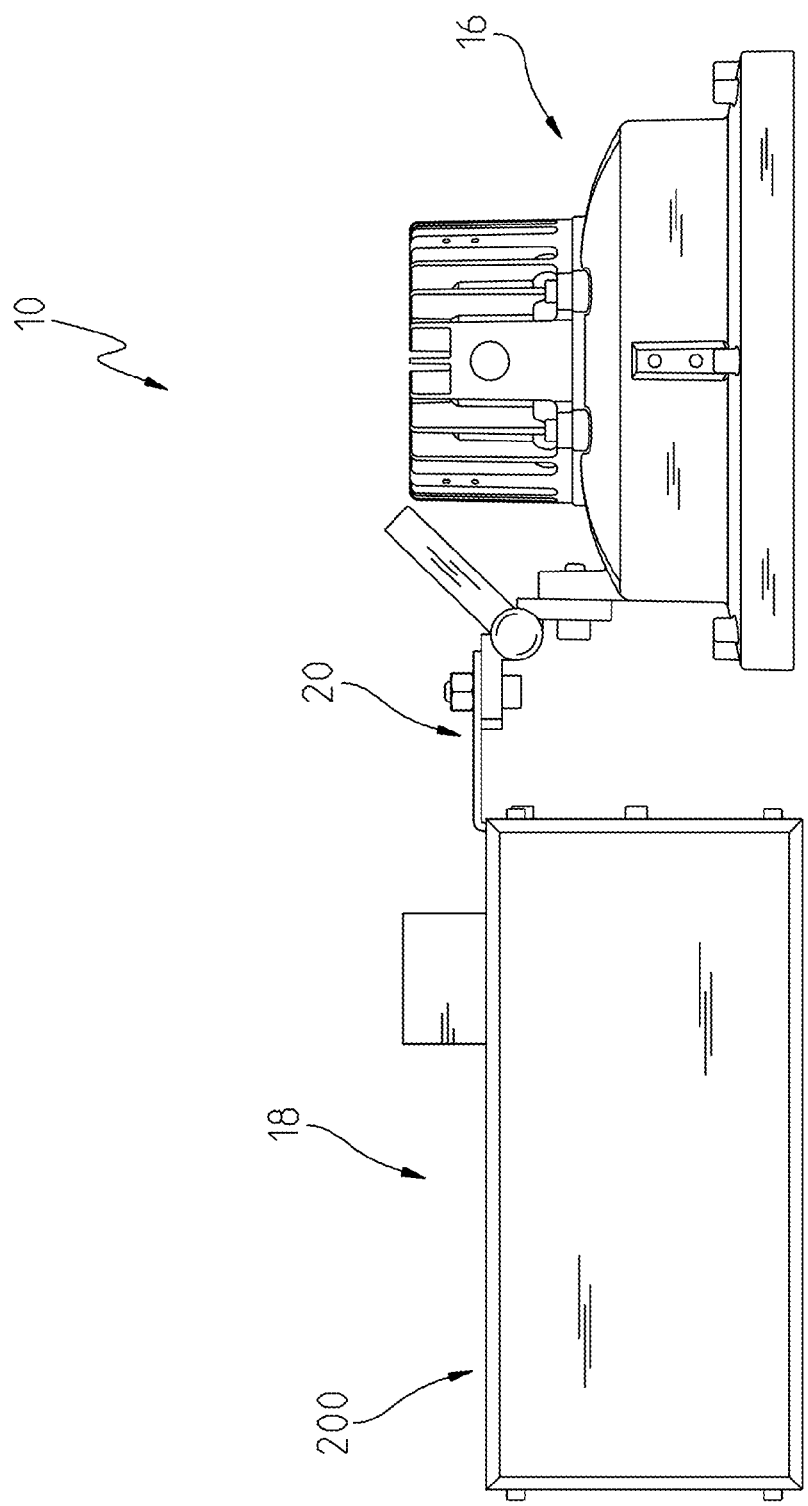
FIG. 22 illustrates a right side view of the lighting apparatus of FIG. 20.
Figure 23:
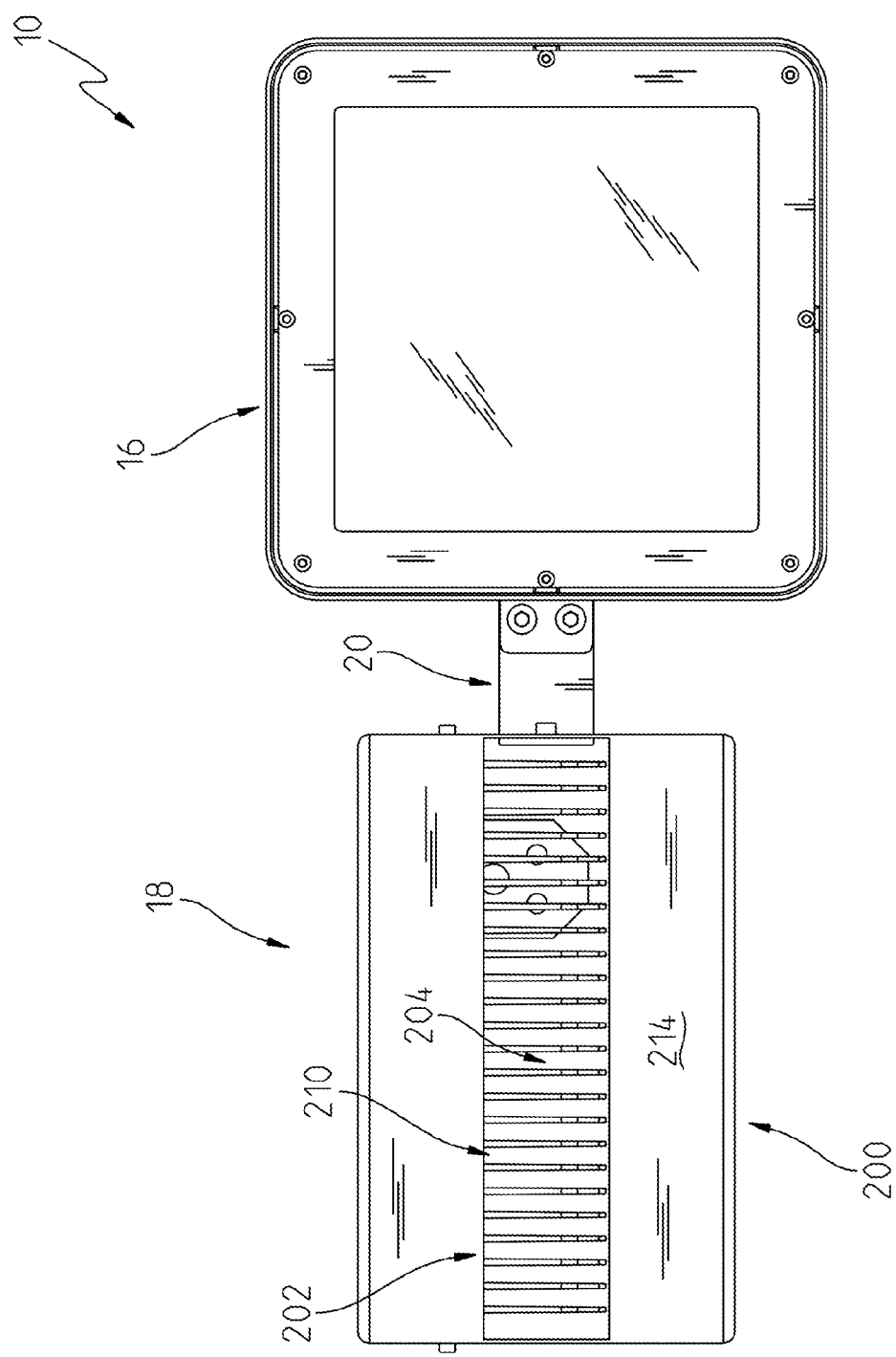
FIG. 23 illustrates a bottom view of the lighting apparatus of FIG. 20.

Referring to FIGS. 20-23, another embodiment of the arrangement of the components of lighting apparatus 10 is illustrated. Referring to FIG. 21, driver 50 and power supply 80 are housed within a housing 200. Driver 50 is coupled to a heat sink 202 having a plurality of fins 204. Housing 200 includes a central passageway 210 through which air may enter through either a top wall 212 (FIG. 21) or a bottom wall 214 (see FIG. 23) of housing 200 and exit the other of top wall 212 (FIG. 21) or a bottom wall 214 (see FIG. 23) of housing 200. The fins 204 of heat sink 202 are positioned in central passageway 210 and interacts with the air passing therethrough. Housing 200 having the central passageway 210 produces a chimney effect and thus may provide enhanced cooling in situations having low external air movement.

Figure 26:
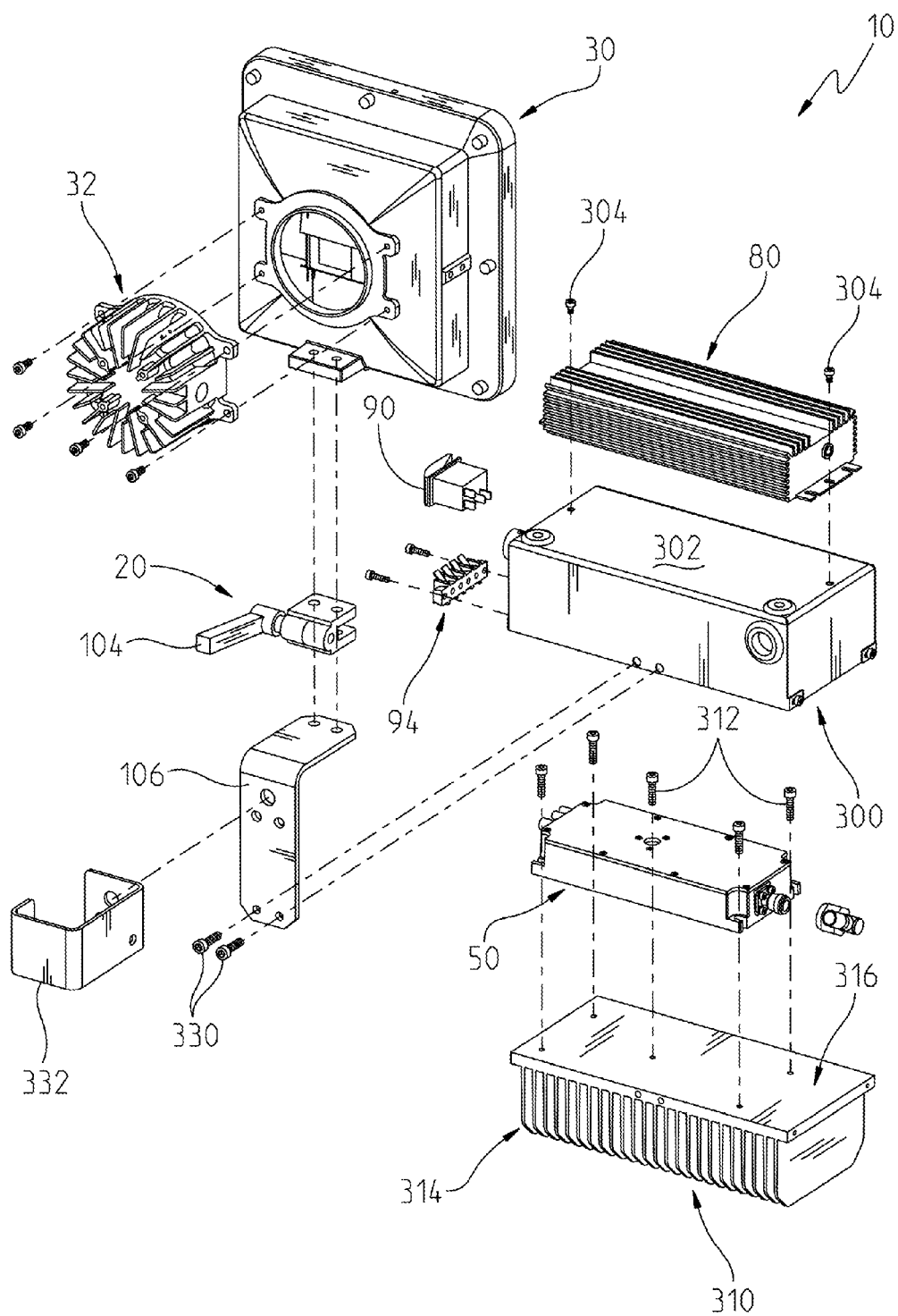
FIGS. 26 and 27 illustrate exploded views of the lighting apparatus of FIG. 24.
Figure 27:
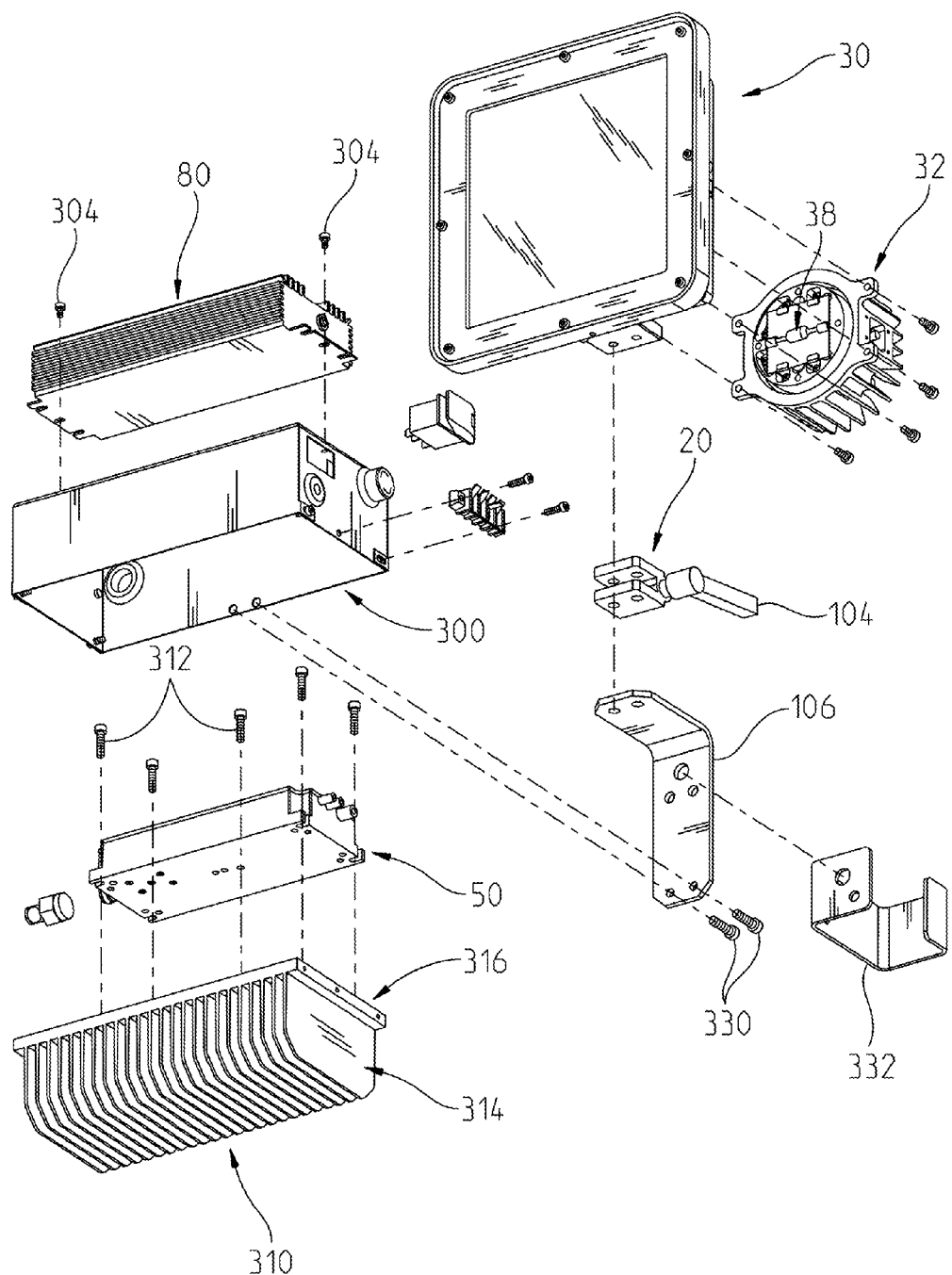

Referring to FIGS. 24-29, another embodiment of the arrangement of the components of lighting apparatus 10 is illustrated. Referring to FIG. 26, a housing 300 is provided. Housing 300 includes a first face 302 onto which power supply 80 is coupled with fasteners 304. Face 302 is oriented towards emitter assembly 16 (see FIG. 24).

Driver 50 is housed within housing 300. Driver 50 is further secured to a heat sink 310 with fasteners 312. Heat sink 310 includes a plurality of fins 314 which extend from a base member 316 to which driver 50 is coupled. Base member 316 is coupled to housing 300 through a plurality of fasteners 318 (see FIGS. 24 and 25).

Figure 28:
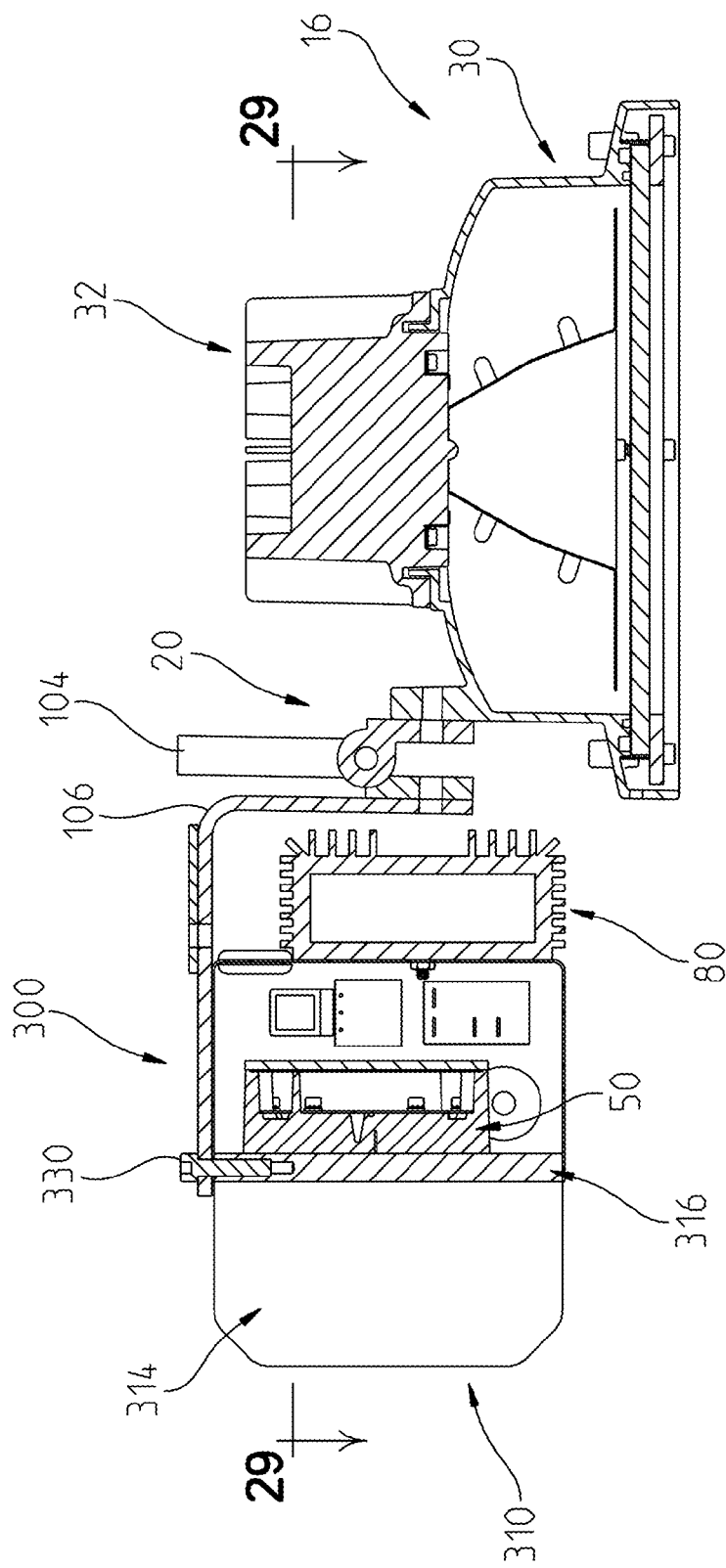
FIG. 28 illustrates a sectional view of the lighting apparatus of FIG. 24 along the lines 28-28 shown in FIG. 24.

Referring to FIG. 28, hinge assembly 20 is coupled to bracket 106 which is coupled to base member 316 of heat sink 310 through fasteners 330. A separate bracket 332 is coupled to bracket 106. Bracket 332 is one example of a mounting structure 14.

Figure 31:
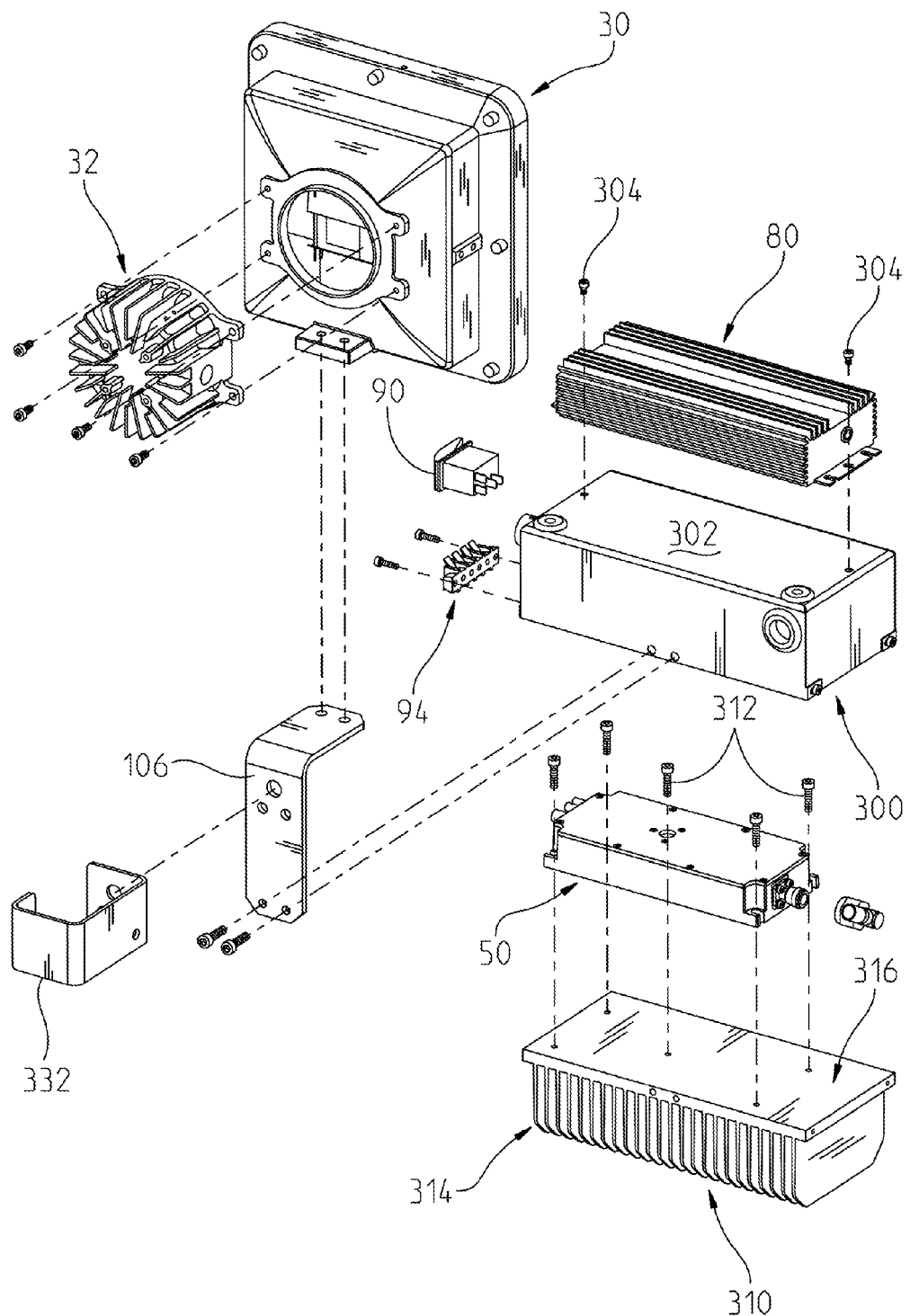
FIG. 31 illustrates exploded views of the lighting apparatus of FIG. 30.
Figure 32:
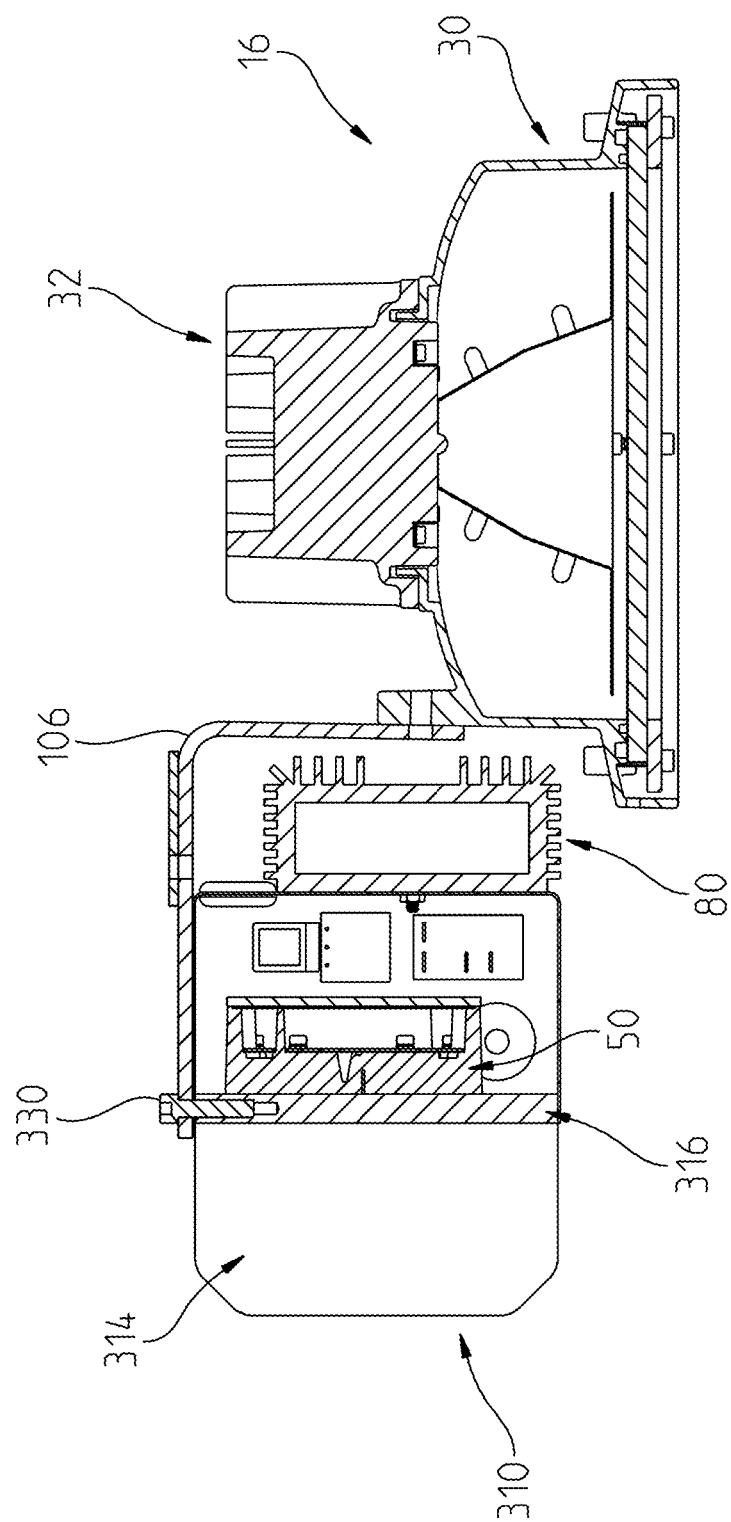
FIG. 32 illustrates a sectional view of the lighting apparatus of FIG. 30 along the lines 32-32 shown in FIG. 30.

Referring to FIGS. 30-32, another embodiment of the arrangement of the components of lighting apparatus 10 is illustrated. The embodiment illustrated in FIGS. 30-32 is the same as the embodiment illustrated in FIGS. 24-29, except that hinge assembly 20 is removed and bracket 106 is directly coupled to emitter assembly 16.

Referring to FIGS. 33-42 an energy efficient street light 514 is shown. Street light 514 includes a pair of lighting apparatus 510. In one embodiment, street light 514 includes a single lighting apparatus 510. Two of lighting apparatus 510 outshine three traditional street lights. The light produced by lighting apparatus 510 is generally equivalent to daylight, providing optimal illumination for drivers and pedestrians.

An illustrated embodiment of the present disclosure, the light is used in a different configuration to light billboards, buildings or other similar areas. The light produced by lighting apparatus 510 is generally equivalent to daylight, making billboards easier to read.

The lighting apparatus illustratively uses a LEP (Light Emitting Plasma) light source. The lights are highly efficient, saving about 35-55% in energy costs over equivalent output metal halide fixtures. With a life span of about 50,000 hours, the LEP lights extend lifetimes and reduce maintenance costs. The lights are dimmable for additional energy savings. Each fixture is available with an optional photocell control or with an advanced city-wide networking control so an operator can monitor and adjust the status and power level of multiple lights throughout a city from any computer, PDA device or other controller using an Internet browser or other communication network.

Figure 33:
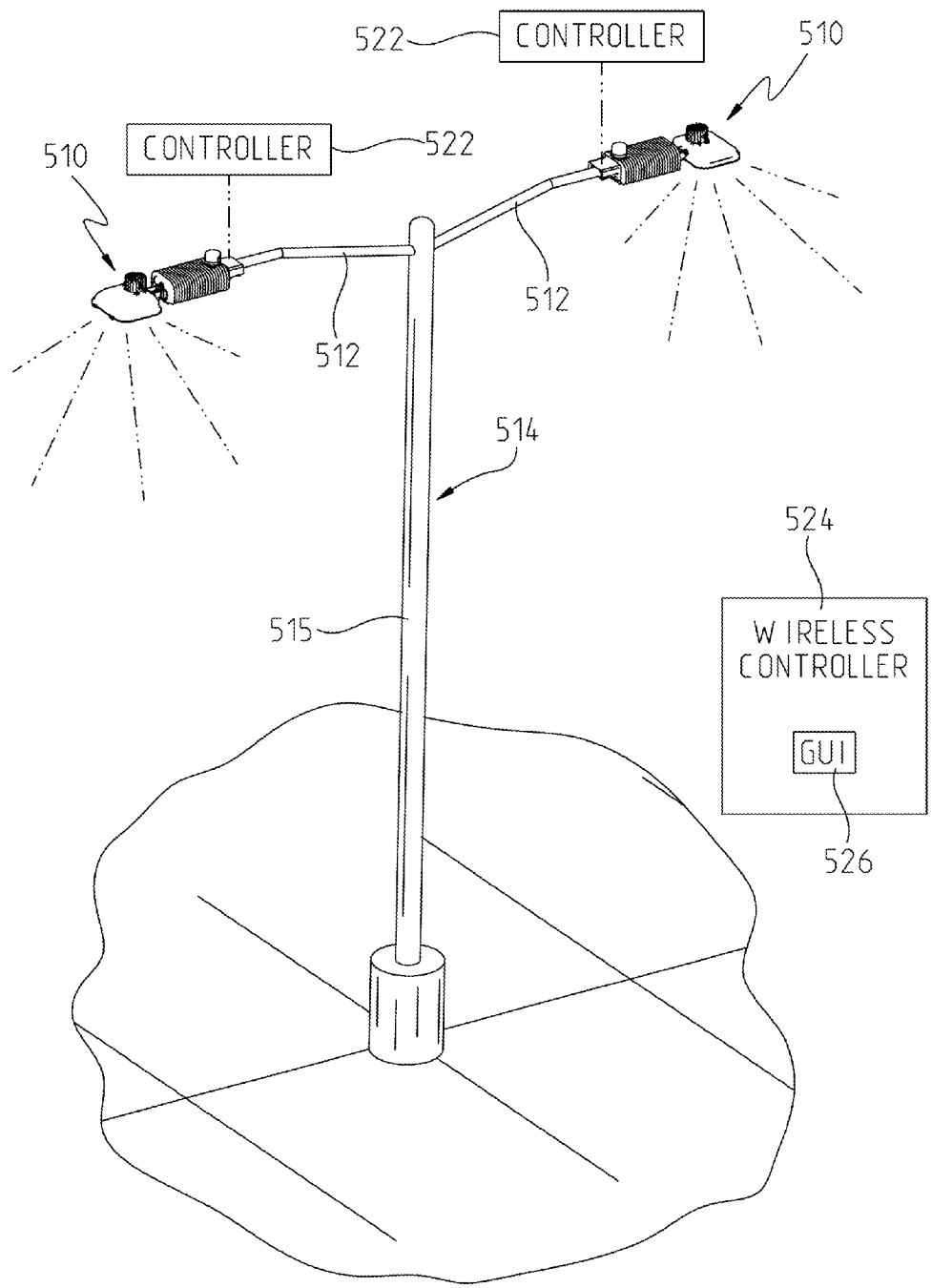
FIG. 33 illustrates an exemplary street light including a plurality of lighting apparatus.
Figure 34:
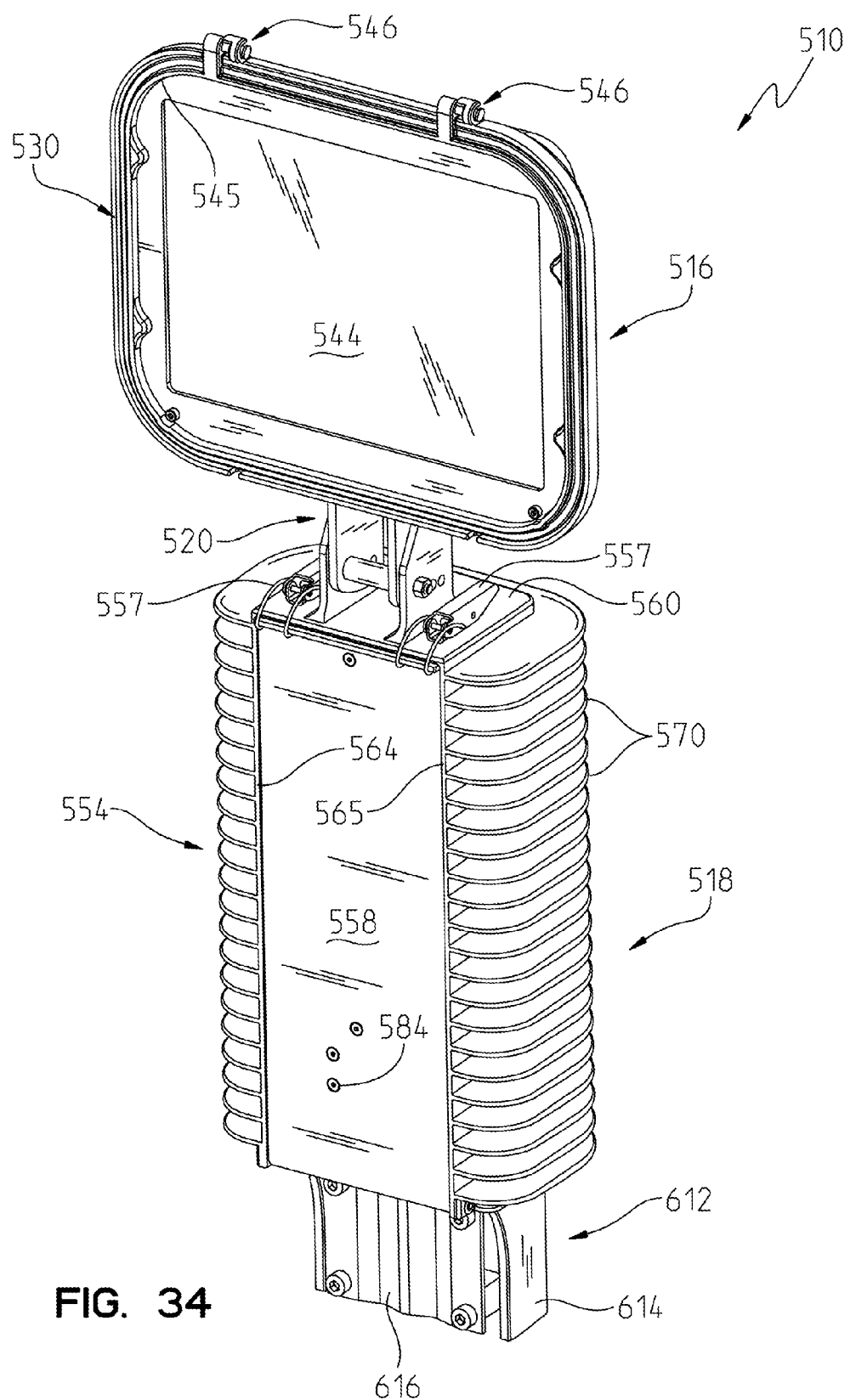
FIG. 34 illustrates a bottom perspective view of a lighting apparatus of FIG. 33.

FIG. 33 illustrates a first embodiment of a lighting apparatus 510 of the present disclosure. In FIG. 33, two lighting apparatuses 510 are coupled to mounting poles 512 of a street light 514. Electrical power is supplied to lighting apparatus 510 through the main vertical pole 515 and mounting poles 512 in a conventional manner. In another embodiment, a single lighting apparatus 510 is coupled to each pole 515.

Each lighting apparatus 510 includes an emitter assembly 516 pivotably coupled to a driver assembly 518 by a hinge assembly 520. As discussed below, the hinge assembly 520 structurally and thermally separates the emitter assembly 516 from the driver assembly 518 to provide an energy efficient lighting apparatus 510 with effective heat management characteristics.

The lighting apparatus 510 is illustratively coupled to a controller 522 which controls turning the lighting apparatus 510 on and off and selectively dimming the light emitted by the lighting apparatus 510. The controller 522 may be located inside or outside of the lighting apparatus. Alternatively, the lighting apparatus 510 includes manual controls for turning the lighting apparatus 510 on and off and dimming the light.

In another embodiment, a wireless controller 524 is used to control the lighting apparatus 510. Illustratively, the wireless controller 524 includes a graphical user interface (GUI) 526 on a remote computing device such as a computer, phone, PDA or other suitable device. In one illustrated embodiment, a smartphone application is used to control turning the lighting apparatus 510 on and off and selectively dim the light.

Additional details of the lighting apparatus 510 are illustrated in FIGS. 34-44. The emitter assembly 516 includes a housing 530 and emitter 532. As best shown, for example, in FIG. 42, the emitter 532 includes a central puck 534 and a plurality of heat sink fins 536 extending away from the housing 530 to dissipate heat.

Emitter 532 is illustratively a model number STA 41-01 light emitting plasma emitter available from Luxim® located in Sunnyvale, Calif. The emitter 532 illustratively includes a bulb 538 located within a dielectric material of the puck 534. The puck 534 is mounted within a body portion of emitter 532. A coaxial cable connector 533 (shown in FIG. 39) is coupled to the emitter 532. The coaxial connector 533 of the emitter 532 is illustratively coupled to a radio frequency (RF) driver 550 (shown in FIG. 42) by a coaxial cable 551 also coupled to a coaxial connector of the driver 550. The cable enters a housing 554 of driver assembly 18 through an opening 555 in an end panel 560. The driver 550 generates a radio frequency (RF) signal which is guided through the coaxial cable and the puck 534 into an energy field around the bulb 538. The high concentration of energy in the electric field vaporizes contents of the bulb 538 into a plasma state at the center of bulb 538 to generate an intense source of light. See also, U.S. patent application Ser. Nos. 12/775,030 and 61/379,969 which are incorporated by reference herein.

Emitter assembly 516 further includes a reflector 540 located within an interior region 542 of housing 530. A window 544 is coupled to an opening of housing 530. Window 544 is made from glass or other suitable material which allows light to pass therethrough. A bottom portion of housing 530 which holds the window 544 is pivotably relative to the rest of the housing 530 about hinges 546.

The driver 550 is located within the driver assembly 518. More particularly, the driver 550 is mounted in an interior region 553 of a driver housing 554 having a top panel 556, a bottom panel 558, a first end panel 560, a second end panel 562, a first side panel 564 and a second side panel 565. Top panel 556 and first and second side panels 564 and 565 provide a heat sink 566 of driver housing 554. Bottom panel 558 is coupled to the housing 554 by a hinge 559 shown in FIG. 42. Bottom panel 558 is held in position by latches 557. Therefore, bottom panel 558 can be pivoted about hinge 559 to provide access to the interior region 553 of driver housing 554.

Figure 41:
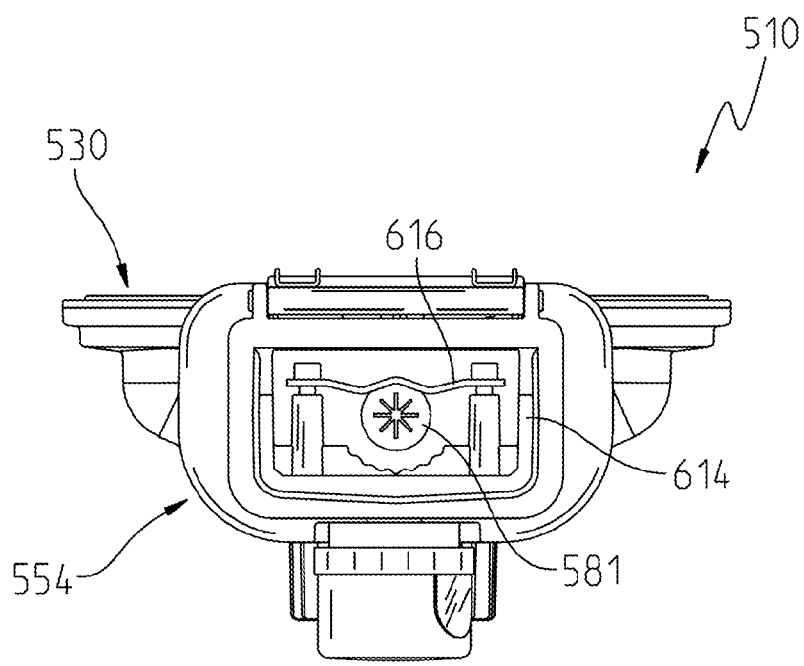
FIG. 41 illustrates a rear view of the lighting apparatus of FIG. 34.
Figure 42:
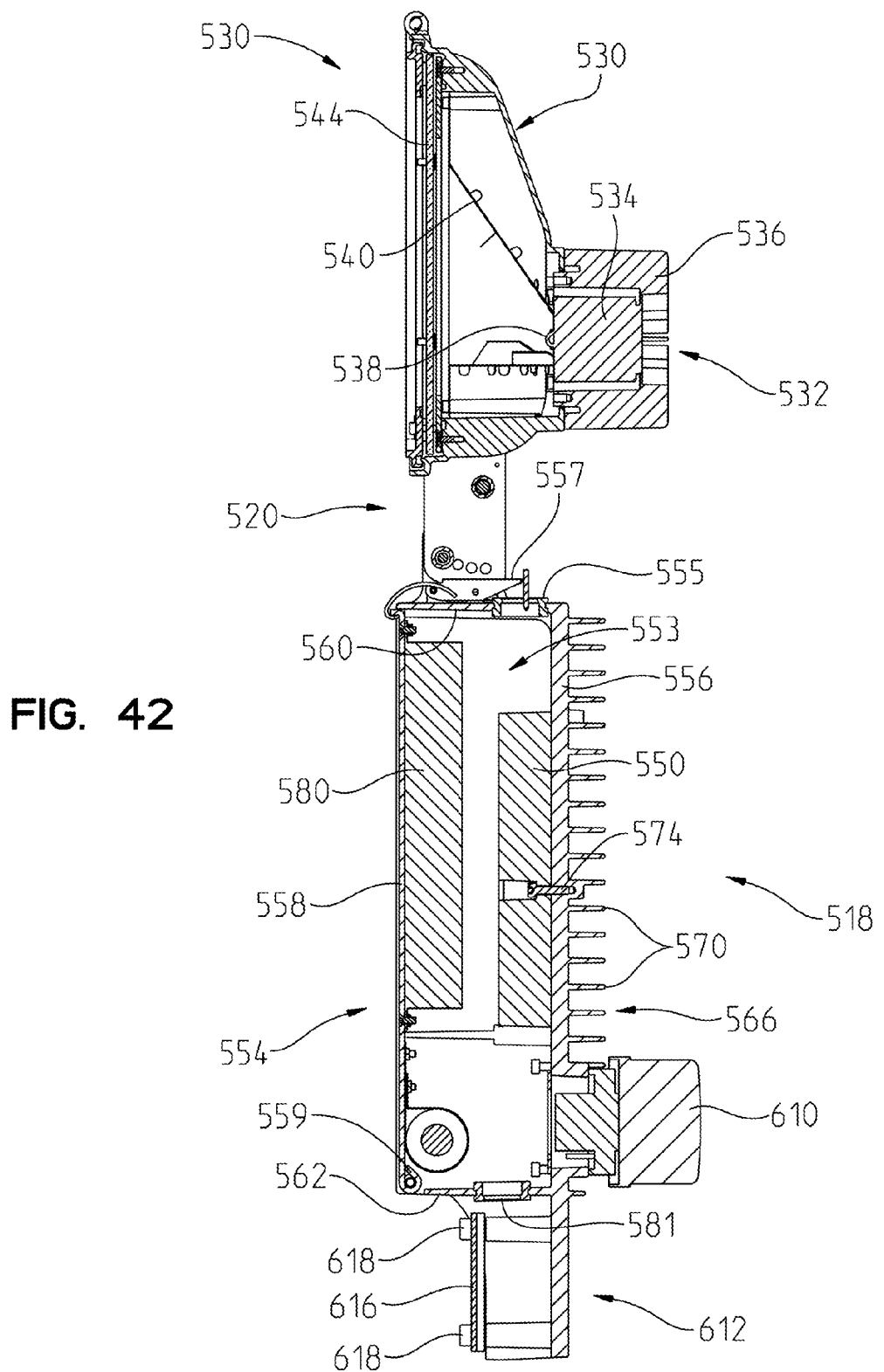
FIG. 42 illustrates a sectional view taken through the lighting apparatus of FIG. 37 along lines 42-42.

The heat sink 566 includes a plurality of heat sink fins 570 to dissipate heat. The driver 550 is illustratively coupled to the top panel 556 of heat sink block 566 by fasteners 574 as shown in FIG. 42. The driver 550 is spaced apart from the bottom panel 558 of driver housing 554 to provide an air gap therebetween. A power supply 580 is mounted to the bottom panel 558 of driver housing 554 by suitable fasteners 584. Power supply 580 is illustratively an Inventronics Model EUV300S028ST-SLB4. The power supply is illustratively an IP67 (Ingess Protection) rated, 300 W, 28V constant voltage supply, although any suitable power supply may be used. Inventronics is located in Hangzhou, China. A power chord (not shown) extends from the power supply 580 through an aperture 581 formed in end panel 562 as shown in FIGS. 41 and 42 and is coupled to the electrical power supply (not shown) of the street light 514. The dimension of air gap may be adjusted during the manufacturing process depending upon the particularly driver 550 and power supply 580 specifications. The driver 550 has an internal temperature sensor which is monitored by a system controller. The heat sink fins 570 are sized and configured to maintain a temperature of the driver 550 at less than 75° C. in a 45° C. max ambient temperature.

In an illustrated embodiment, the controller 522 provides a 1-10V input to control dimming of the light from 20% to 100% of full power (maximum intensity). As discussed above, lighting apparatus 510 may also be controlled via the wireless controller 524. The controller 522 or 524 may be used by an operator to monitor and control a plurality of lights throughout an area such as a city. The controller can monitor the status of each lighting apparatus 510 including power settings, remaining life, or other operational features of the lighting apparatus 510.

Figure 38:
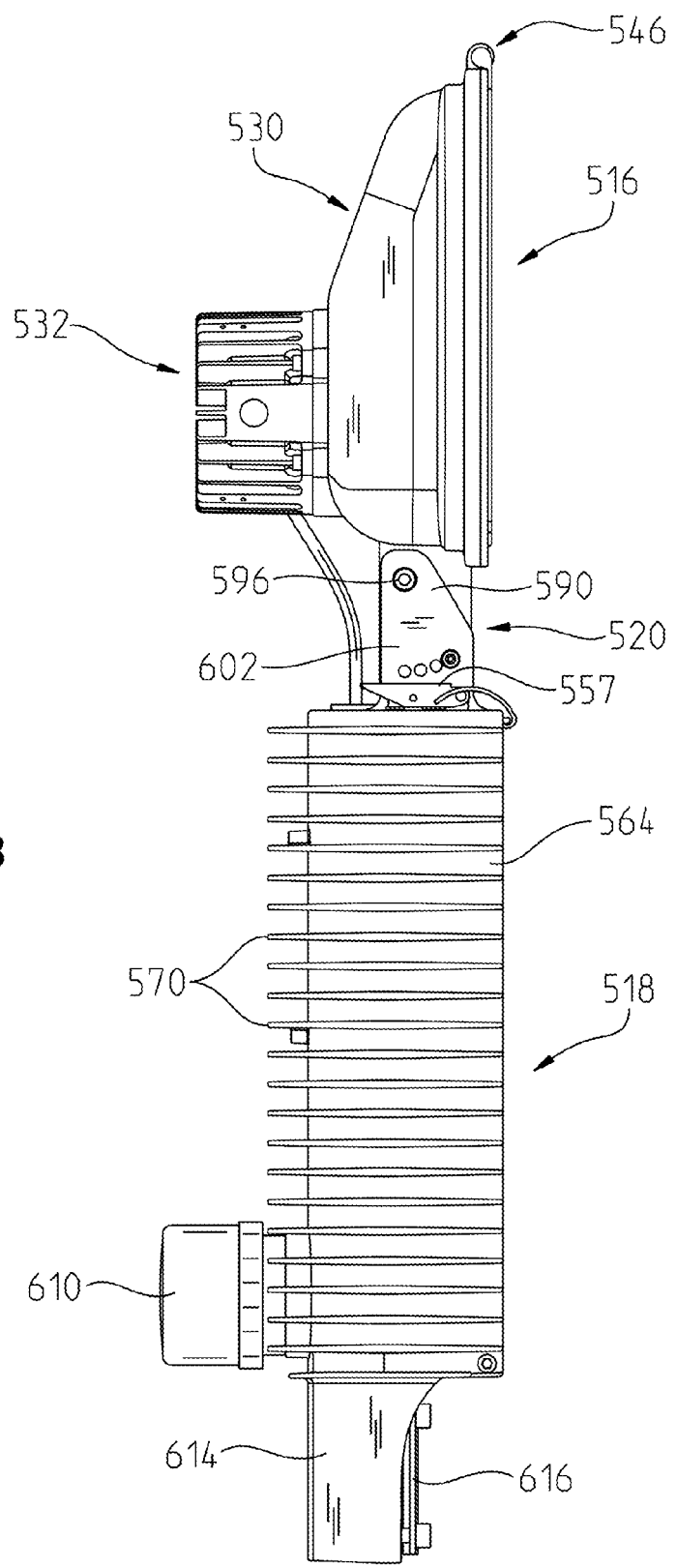
FIG. 38 illustrates a left side view of the lighting apparatus of FIG. 34.
Figure 39:
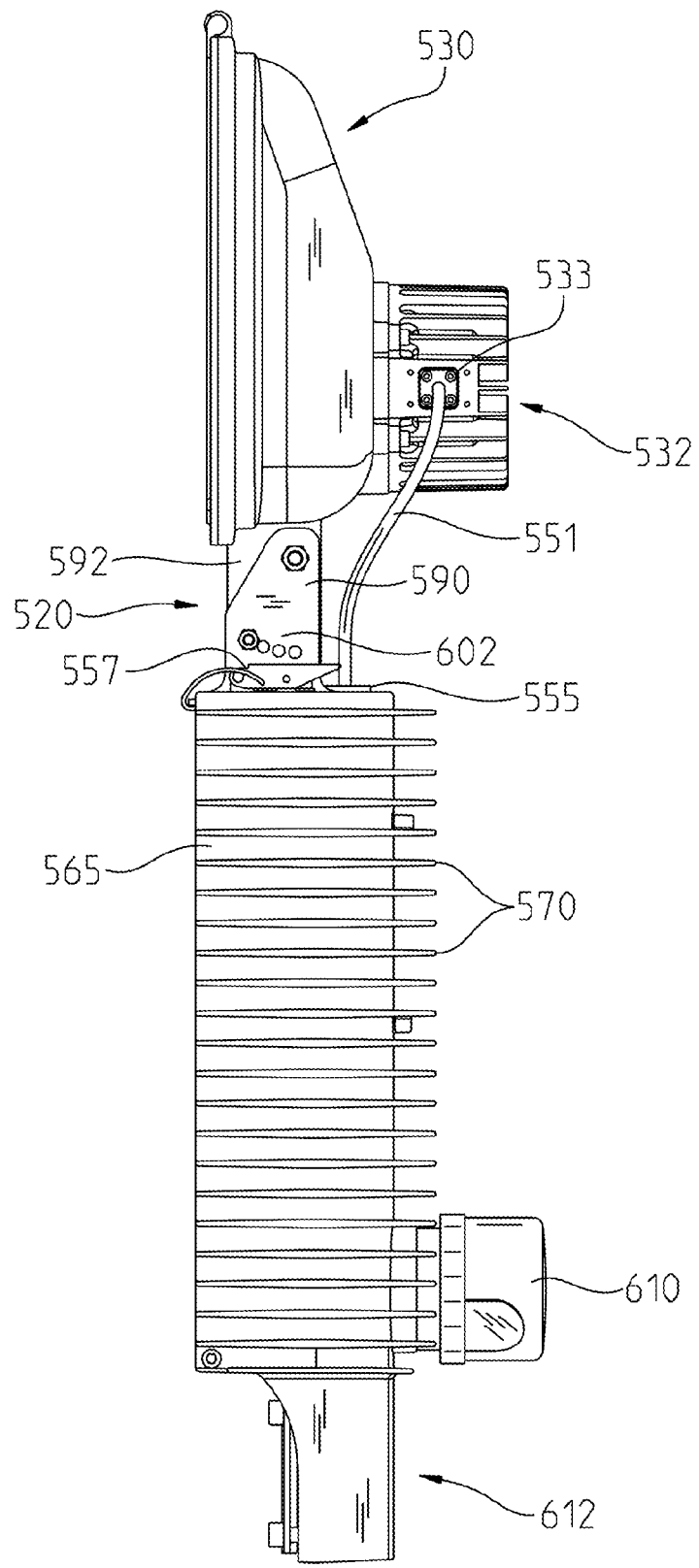
FIG. 39 illustrates a right side view of the lighting apparatus of FIG. 34.
Figure 40:
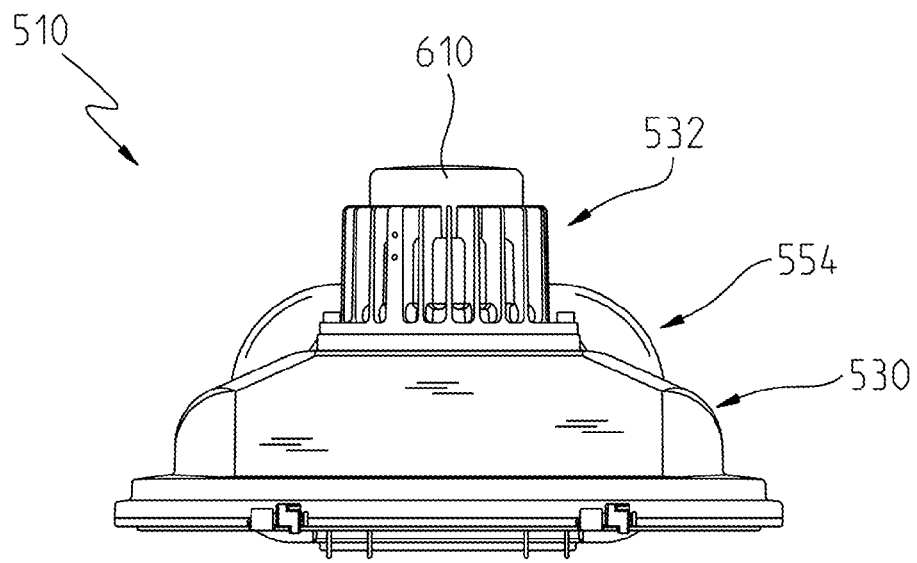
FIG. 40 illustrates a front view of the lighting apparatus of FIG. 34.

The emitter assembly 516 is coupled to the driver assembly 518 by hinge assembly 520. Hinge assembly 520 comprises of a first pair of arms 590 coupled to end panel 560 of driver housing 554. A second pair of arms 592 is coupled to emitter housing 530. Arms 592 nest within arms 590 to provide the hinge assembly 520. As best shown in FIG. 38, the hinge pivots about axis 594 to move the emitter housing 530 relative to the driver housing 554. A fastener 596 and spacer 598 are coupled to arms 590 and 592 to provide the pivot connection about pivot axis 594. A locking fastener 600 is selectively coupled to one of a plurality of apertures 602 and 603 formed in arms 590 and 592, respectively, as best shown in FIGS. 38, 39, 42 and 44 so that the angle of the emitter housing 530 may be adjusted relative to the angle of driver housing 554 depending upon the particular application.

The dimensions of hinge assembly 520 are selected so that the emitter housing 530 is spaced apart from the driver housing 554 by a selected distance. In one embodiment, the emitter housing 530 is about 4 inches from the driver housing 554. The size and shape of the hinge assembly 520 or other suitable mounting structure may be adjusted during the manufacturing process to maintain efficient cooling of the emitter 532, driver 550, and power supply 580 during operation of the lighting apparatus 510. The hinge assembly 520 of the lighting apparatus 510 structurally and thermally divides the emitter assembly 516 from the driver assembly 518. In other words, the heat sink 536 of the emitter 532 is separated from the heat sink block 566 of the driver housing 554 structurally and thermally by the hinge assembly 520.

The orientation of the of the driver heat sink fins 570 is designed to ensure good heat transfer from the heat sink 566 via natural convection of the surrounding air. The thin sheet metal bottom panel 558 provides a gap between the side of the driver 550 which is not mounted to the heat sink block 566 and the power supply 580.

As discussed above, in the illustrated embodiment, the lighting apparatus includes energy efficient lights such as the plasma lighting. Illustrative features of one embodiment of the plasma lighting apparatus include:

| | |
|---|---|
| Weight | 30 lbs |
| Source Lumens | 23,000 |
| Fixture Lumens | 19,300 |
| Energy Efficiency | 58 lumens/watt |
| Rated Average Life | 50,000 hours |
| Typical Turn-on Time | 45 seconds |
| Dimming Range | 20-100% |
| Nominal AC Power at 220 v | 290 watts |
| Voltage | 200-277 V |
| Power Consumption | 290 W |
| CCT | 5,500 K |
| CRI | 75 |

The lighting apparatus 510 of the present disclosure provides a more efficient lighting option than traditional metal halide lighting systems. Additional details of the lighting apparatus are in the attached two Appendices which are incorporated herein by reference.

In the illustrative embodiment, a photocell 610 is coupled to the driver housing 554. The photocell 610 automatically turns the lighting apparatus 510 on and off based upon detected ambient light levels. The photocell 610 is optional. In other embodiments, the lighting apparatus 510 is controlled by a conventional timer or controlled by controllers 522 or 524 as discussed above.

Lighting apparatus 510 illustratively includes a pole mounting portion 612 having a generally U-shaped top clamping portion 614 and a bottom clamping plate 616 coupled to the top clamping portion 614 by suitable fasteners 618. The position of bottom clamping plate 616 is adjustable relative to the top clamping portion 614 to accommodate and secure mounting poles having various diameters.

Figure 43:
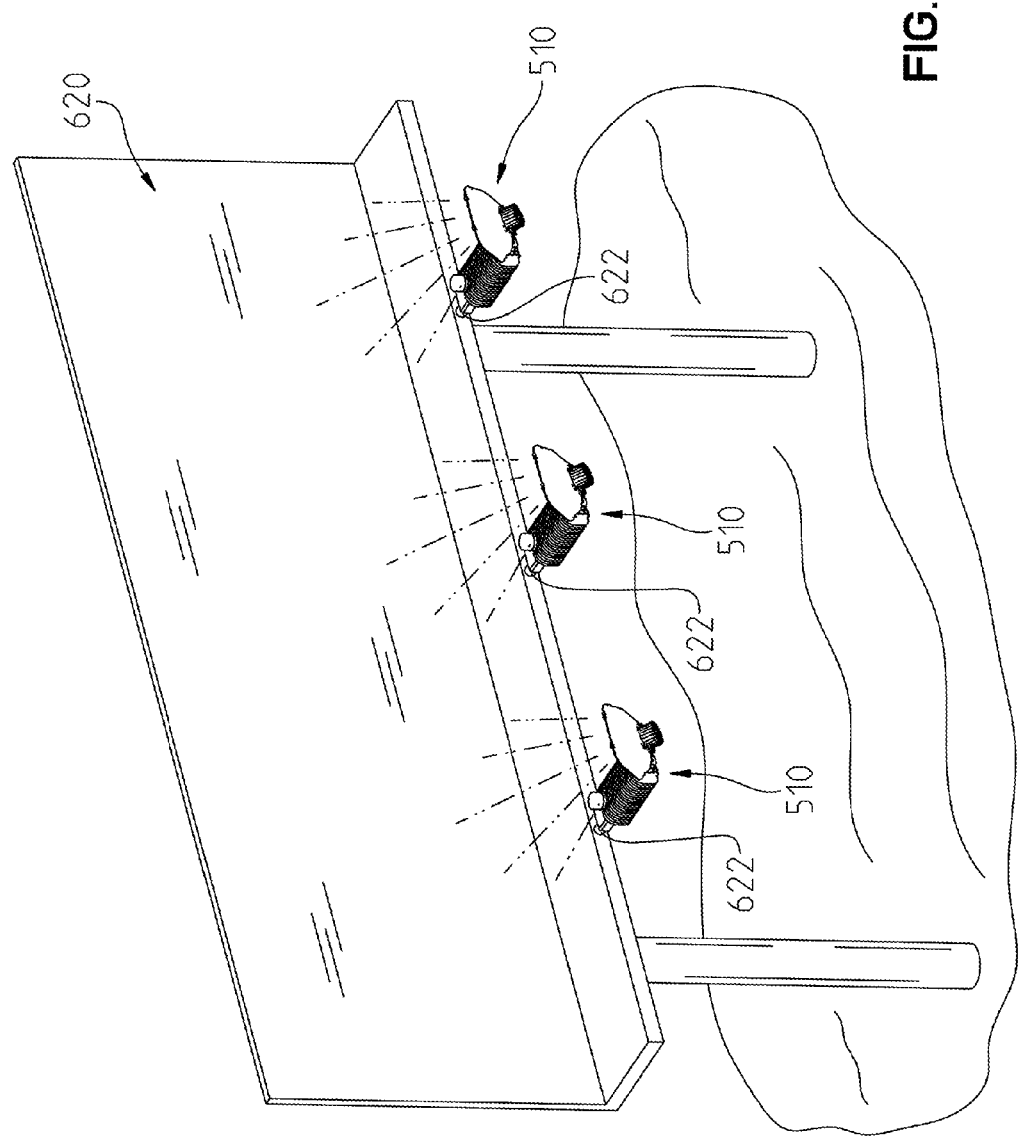
FIG. 43 illustrates an exemplary billboard including a plurality of the lighting apparatus of FIGS. 34-42 reconfigured to light a face of the billboard.
Figure 44:
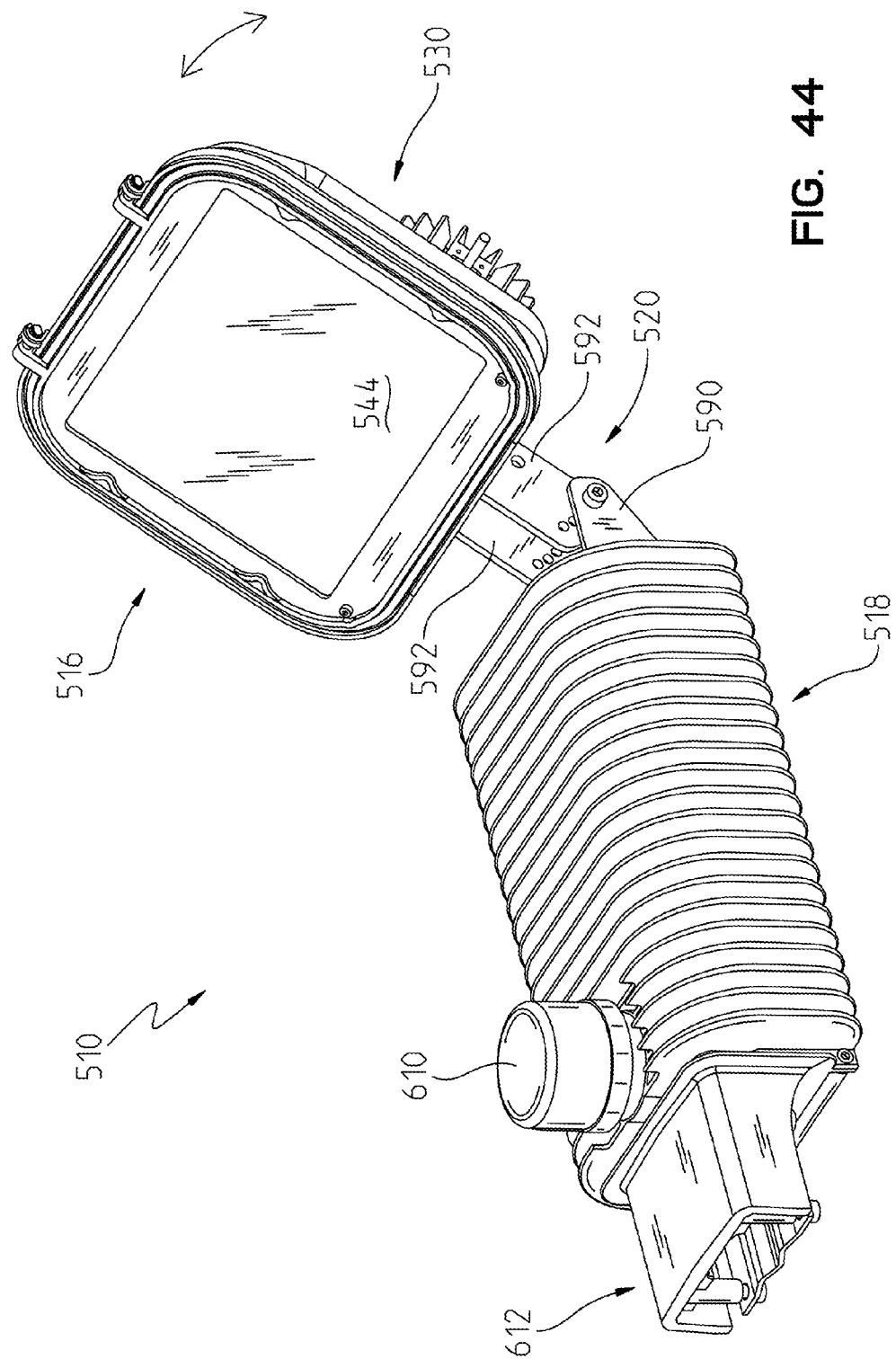
FIG. 44 illustrates a top perspective view of one lighting apparatus of FIG. 43 further illustrating the billboard lighting configuration of the lighting apparatus.

A lighting apparatus 510 of the present disclosure may be used in an alternative configuration shown in FIGS. 43 and 44 to light other items such as a billboard 620. In the FIG. 43 embodiment, three separate lighting apparatuses 510 are mounted to separate mounting poles 622 to illuminate the billboard 620. The lighting apparatus 510 may be used in the orientation of FIGS. 43 and 44 to light other desired items such as buildings, artwork, landscape, or the like. As best shown in FIG. 44, in the billboard configuration, the emitter housing 530 is rotated 180° relative to the driver housing 554. Again, the tilt orientation of the emitter housing 530 is adjustable relative to the driver housing 554 to align the light emitter housing 530 in the desired position for aiming the light source. The lighting apparatus 510 therefore provides improved, energy efficient lighting for streets, parking lots, billboards, buildings, artwork or other high illuminance applications.

Figure 45:
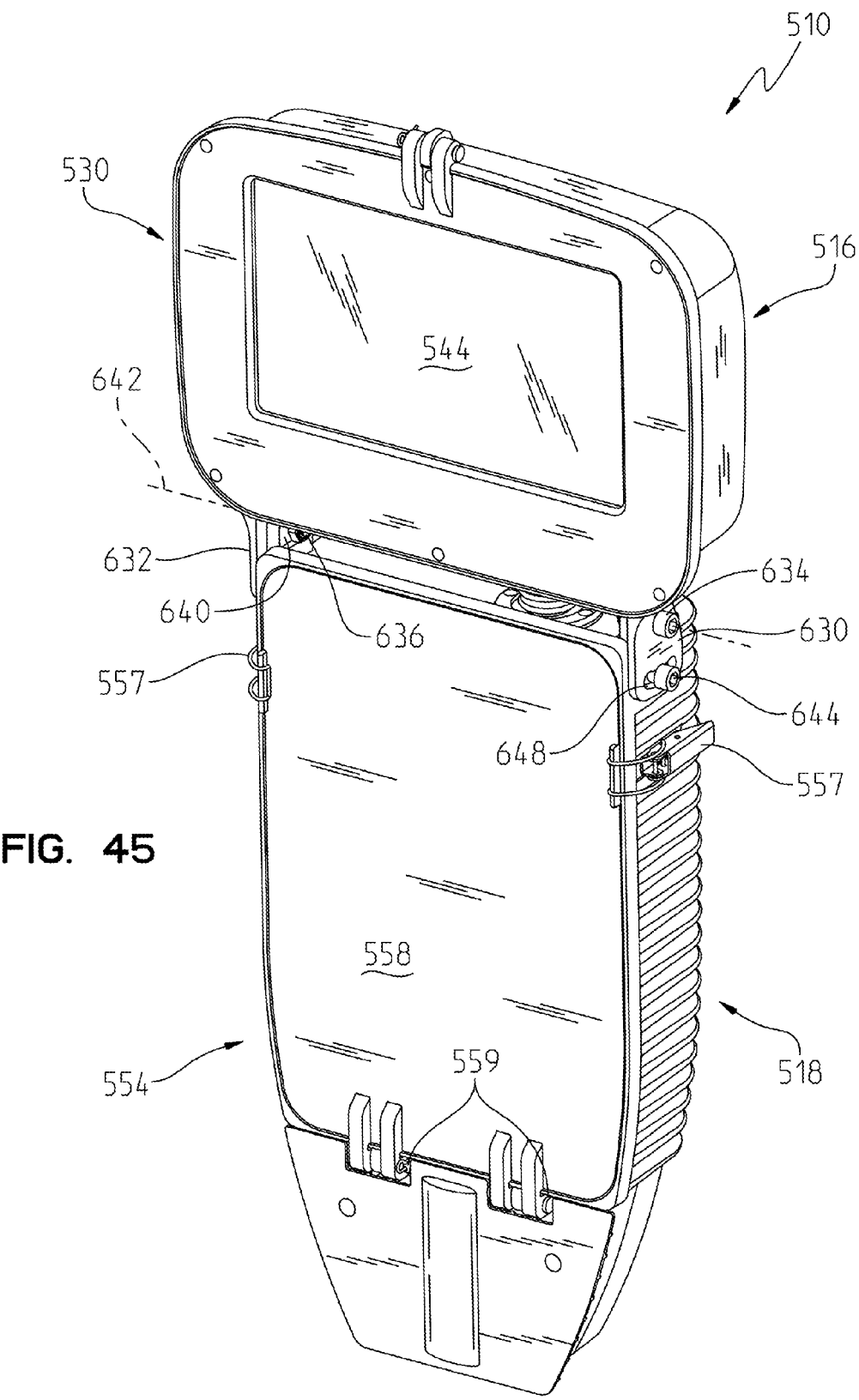
FIG. 45 illustrates a bottom perspective view of a lighting apparatus of another embodiment of the present disclosure.
Figure 46:
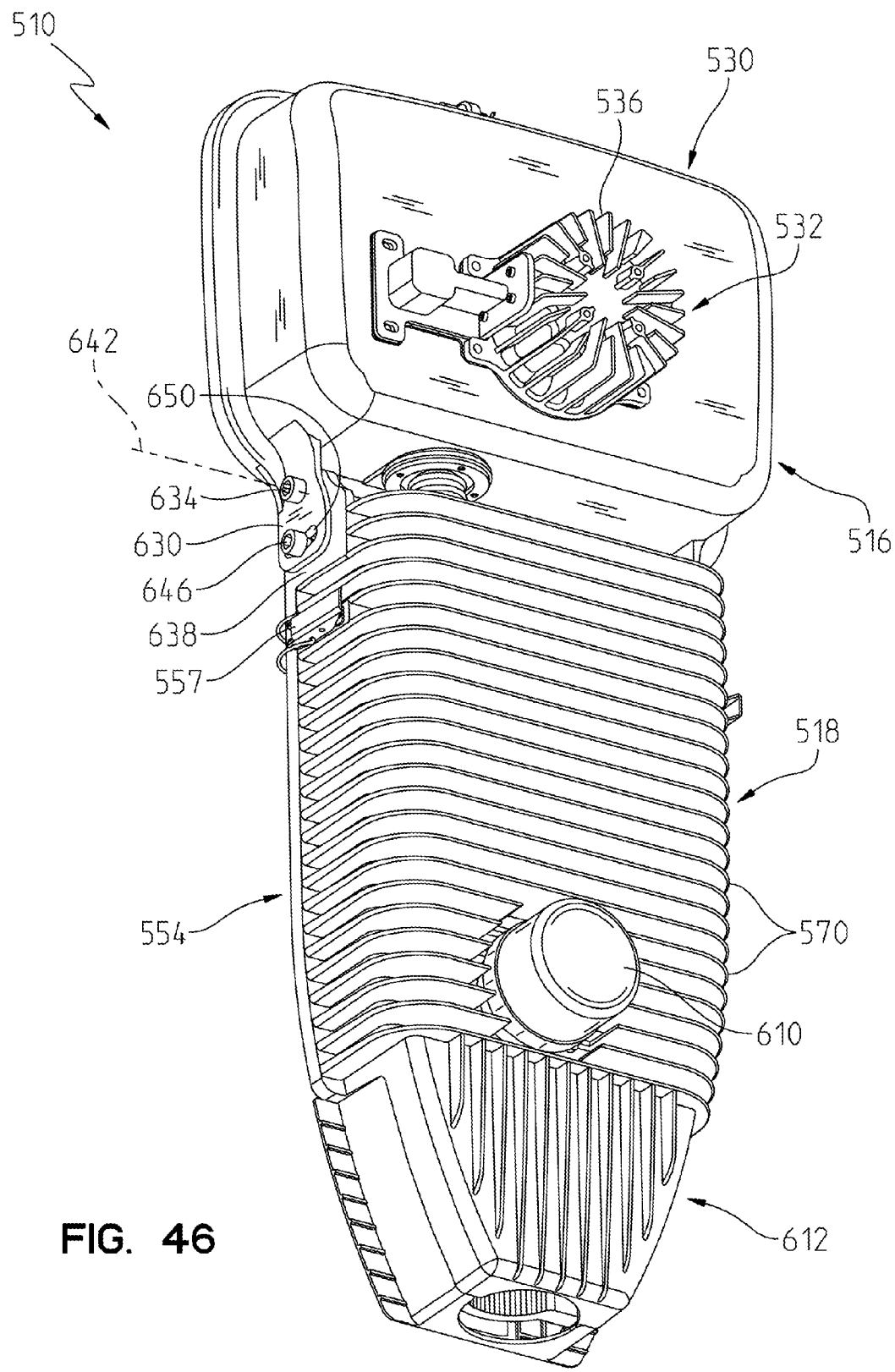
FIG. 46 illustrates a top perspective view of a lighting apparatus of FIG. 45.
Figure 47:
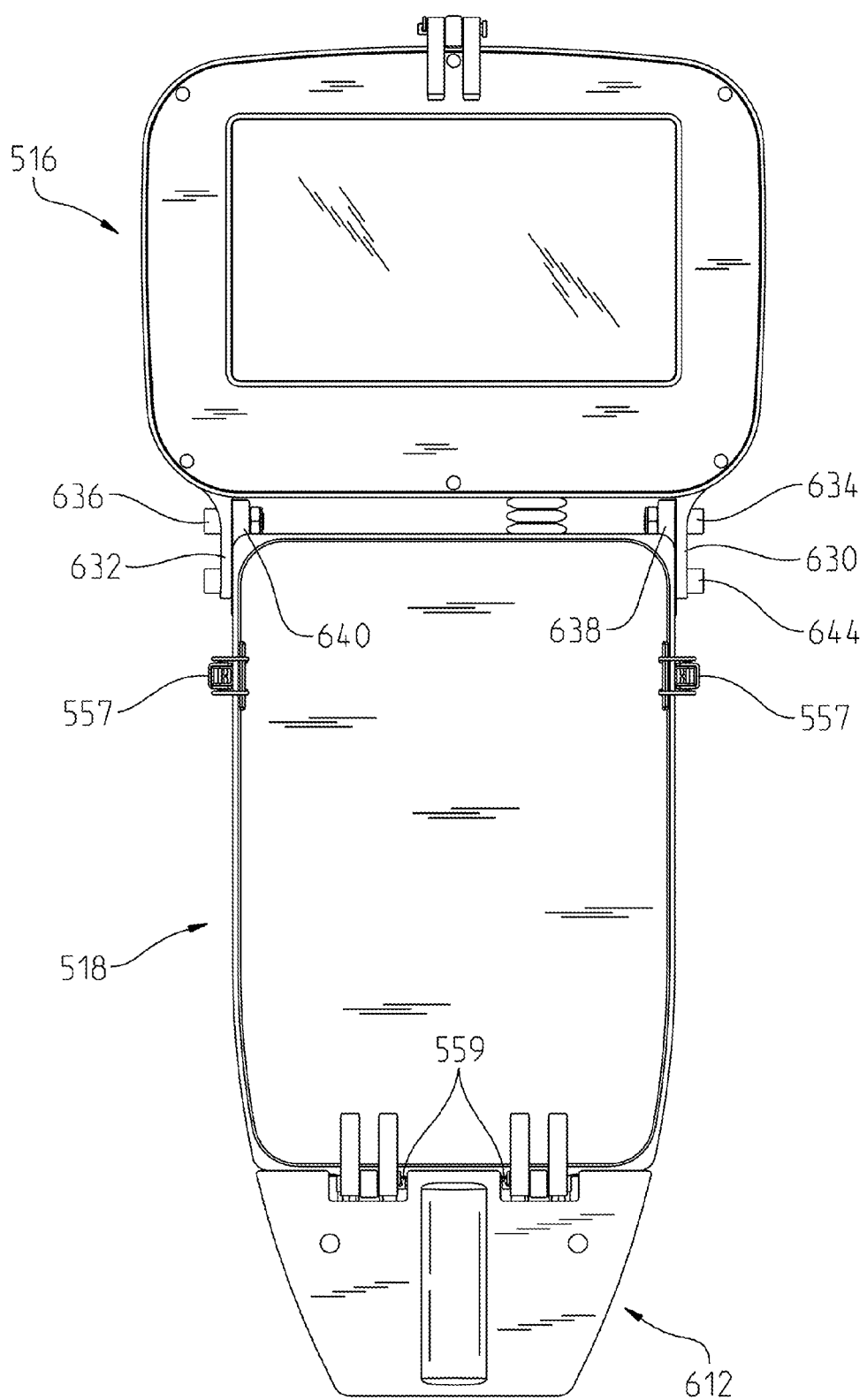
FIG. 47 illustrates a bottom view of the lighting apparatus of FIG. 45.
Figure 48:
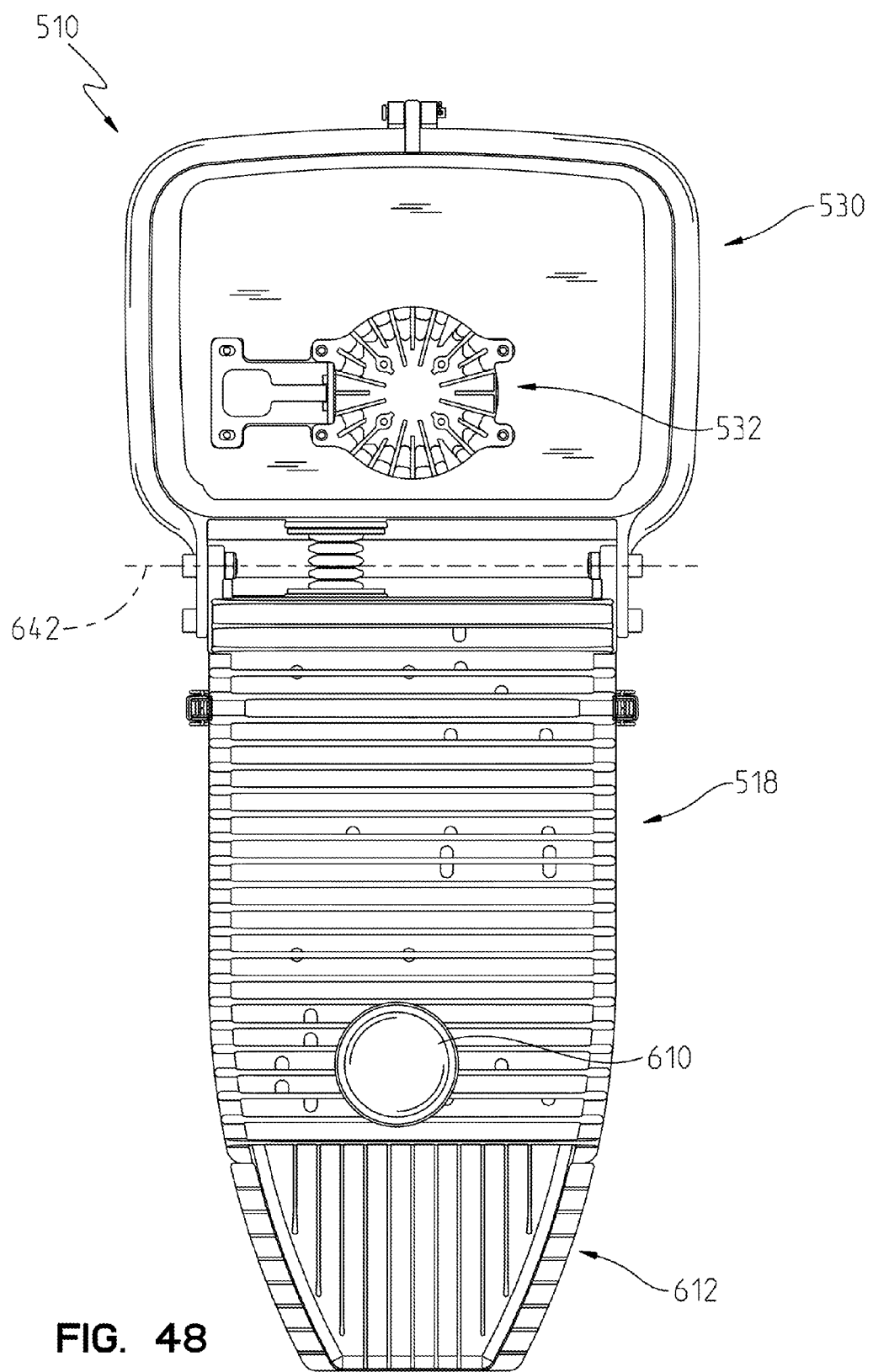
FIG. 48 illustrates a top view of the lighting apparatus of FIG. 45.
Figure 49:
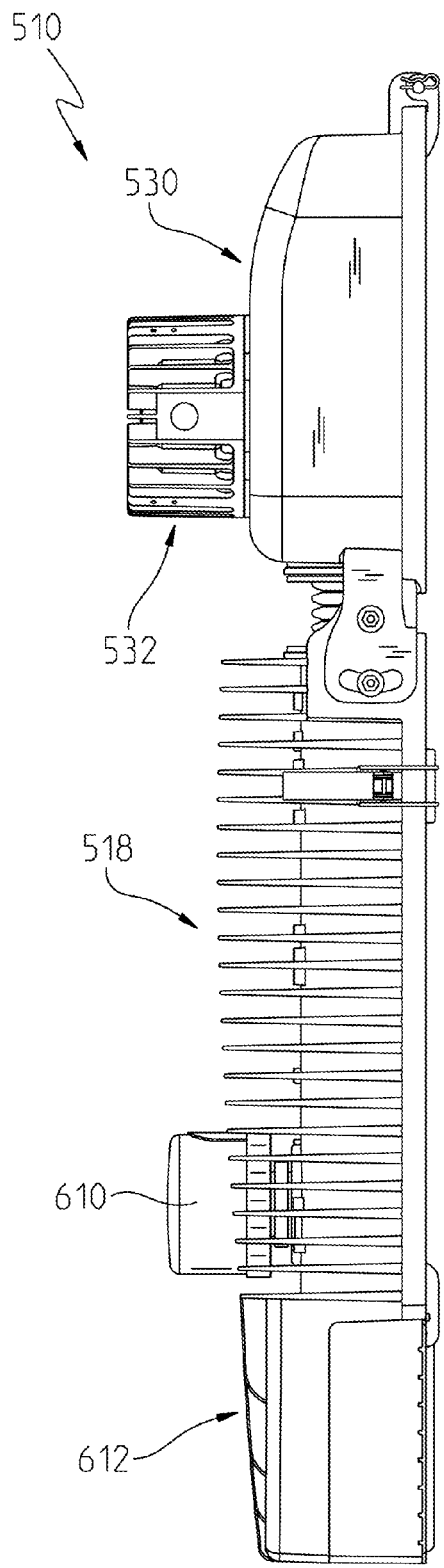
FIG. 49 illustrates a left side view of the lighting apparatus of FIG. 45.
Figure 50:
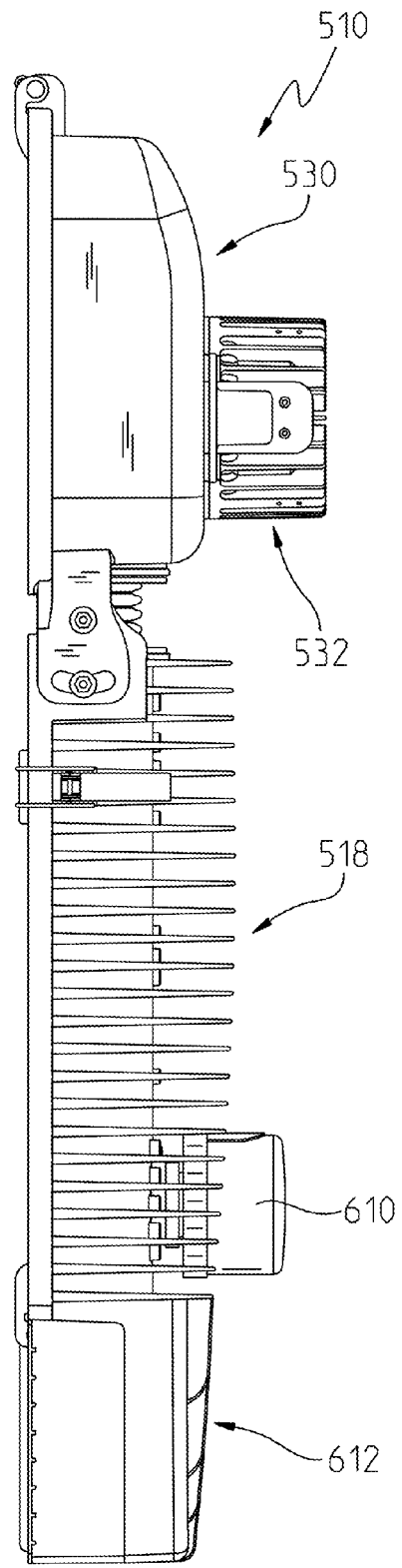
FIG. 50 illustrates a right side view of the lighting apparatus of FIG. 45.
Figure 51:
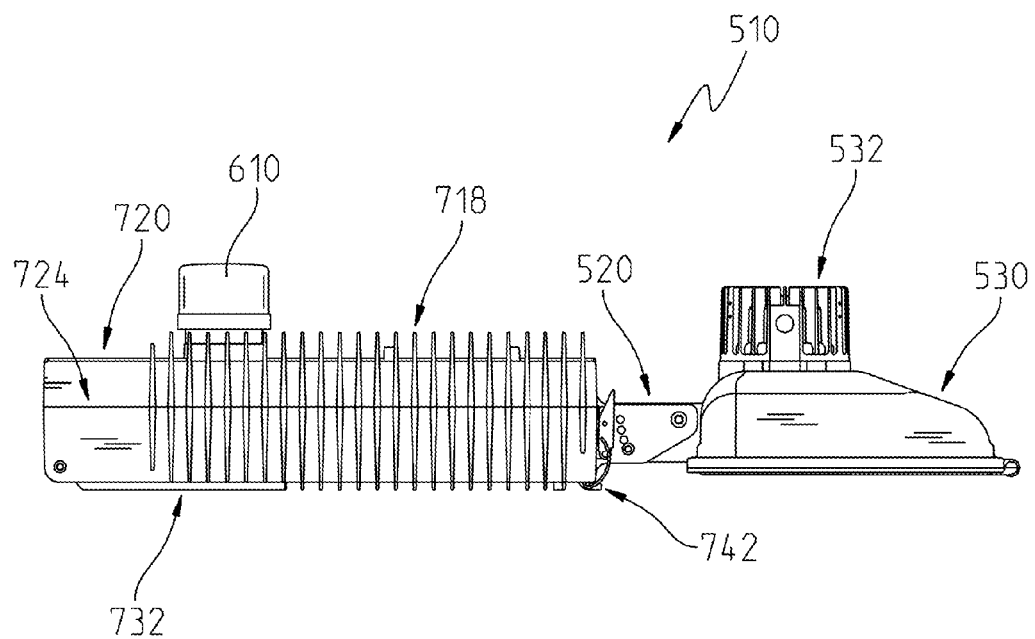
FIG. 51 illustrates a side view of a lighting apparatus of another embodiment of the present disclosure.
Figure 52:
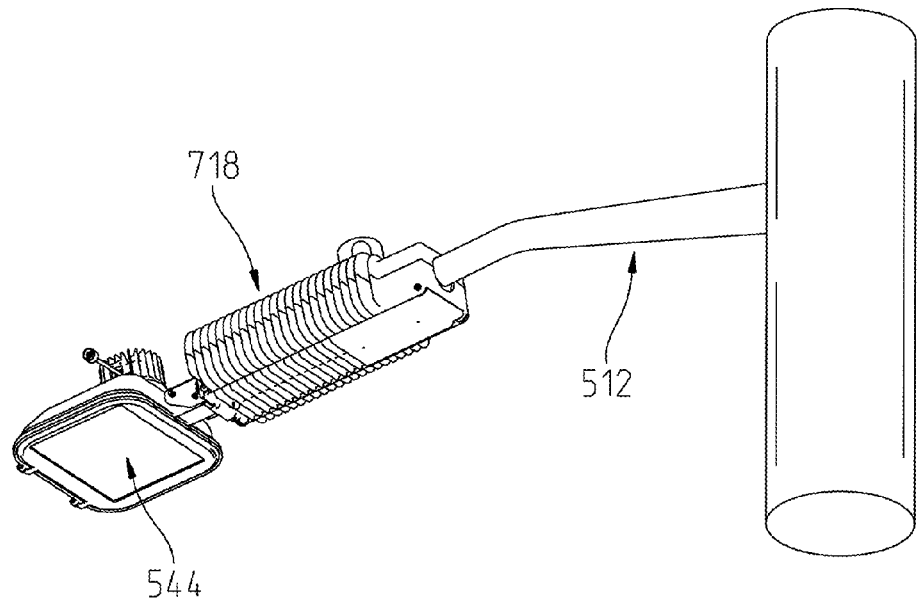
FIG. 52 illustrates the lighting apparatus of FIG. 51 coupled to a mounting pole of a street lamp pole.
Figure 53:
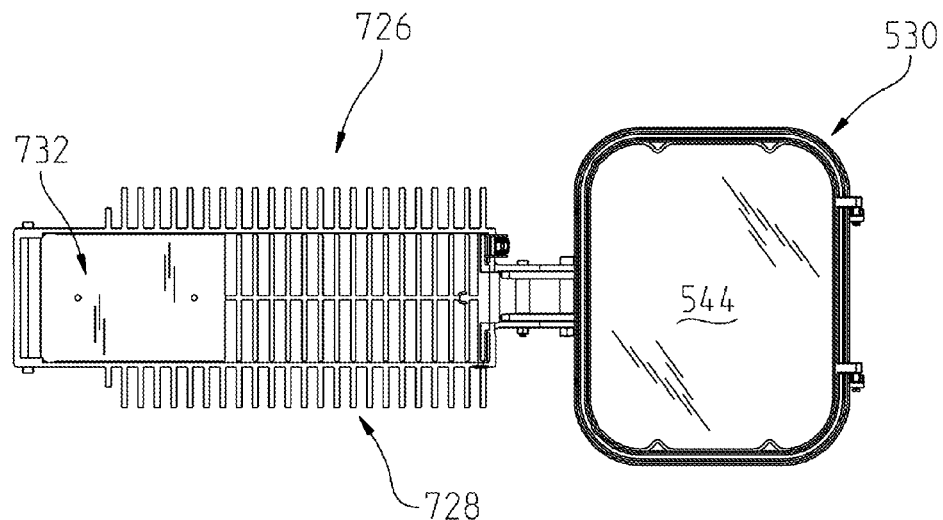
FIG. 53 illustrates a bottom view of the lighting apparatus of FIG. 51.
Figure 54:
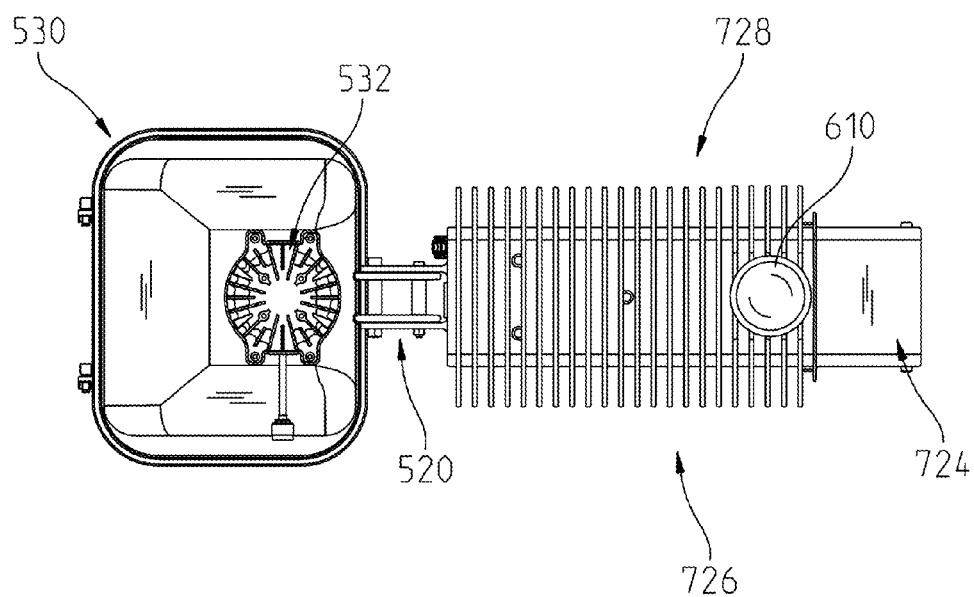
FIG. 54 illustrates a top view of the lighting apparatus of FIG. 51.
Figure 55:
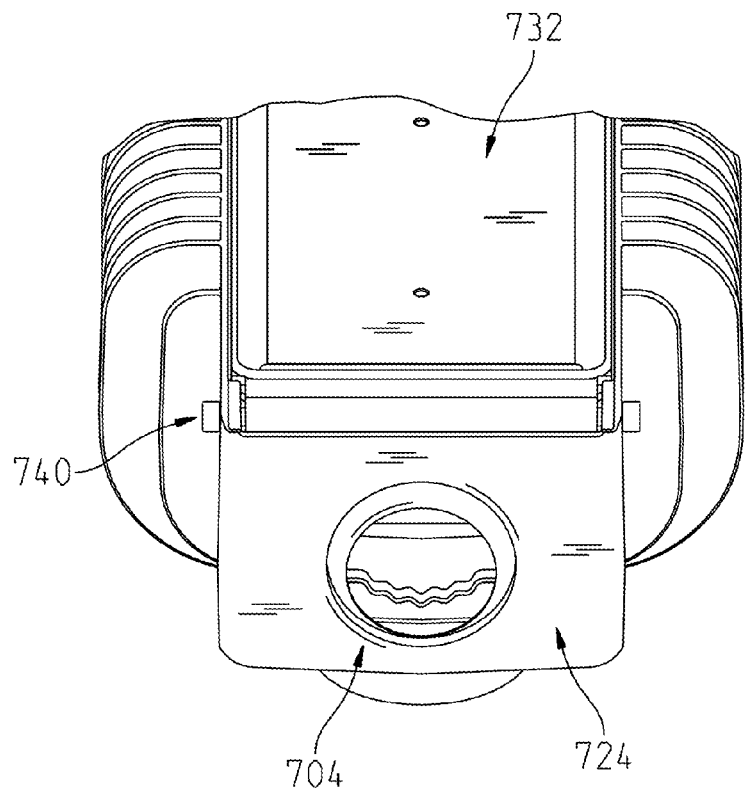
FIG. 55 illustrates an end view of the lighting apparatus of FIG. 51.

Another embodiment of the present invention is illustrated in FIGS. 45-50. Elements numbered the same as FIGS. 33-44 perform the same or similar functions as described above. In the embodiment of FIGS. 45 and 46, the hinge assembly includes arms 630 and 632 on opposite sides of the emitter housing 530. Fasteners 634 and 636 extend through arms 630 and 632, respectively, and into receiving portions 638 and 640 of driver housing 554. Fasteners 634 and 636 define a pivot axis 642 for the emitter housing 530 relative to driver housing 554. Fasteners 644 and 646 extend through elongated slots 648 and 650, respectively, and into mounting portions 638 and 640. Fasteners 644 and 646 may be loosened to permit the emitter housing 530 to be tilted relative to the driver housing 554 to a desired orientation. The fasteners 644 and 646 are then secured to hold the emitter housing 530 in the desired position.

Referring to FIGS. 51-58, another embodiment of lighting apparatus 510 is shown. Lighting apparatus 510 includes a different driver assembly 718. Driver assembly 718 is hinged like driver assembly 518, except that mounting pole 512 is coupled to driver assembly 718 on an interior of driver assembly 718. This also provides a larger aperture 704 (see FIG. 55) in driver assembly for wiring to be routed. The cast housing also includes bosses to which zip ties or other fasteners may be coupled to assist with wire management.

Figure 56:
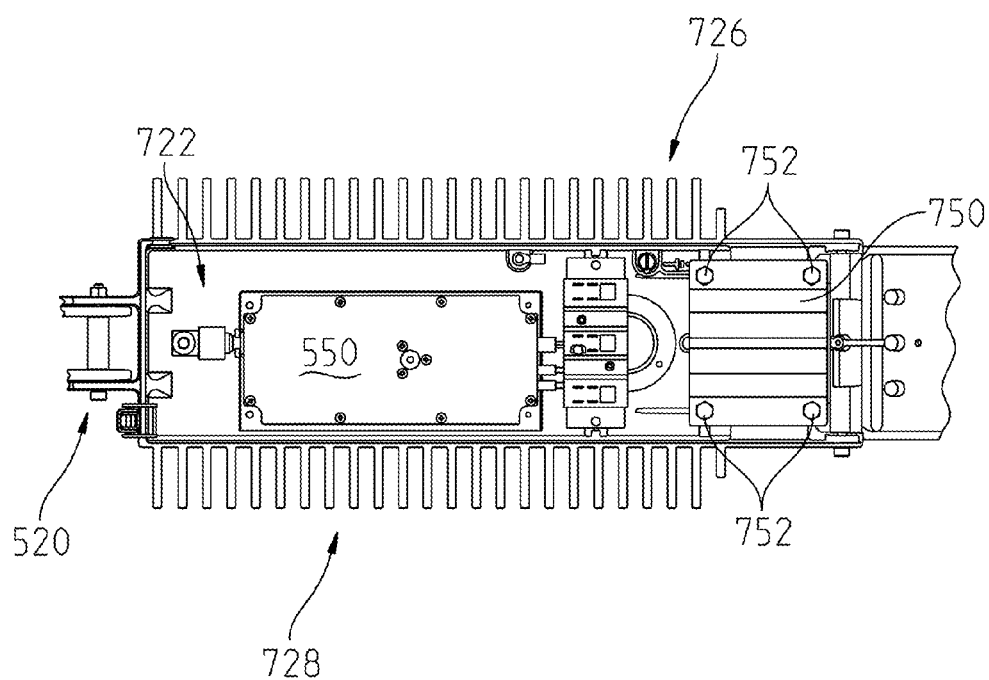
FIG. 56 illustrates an interior of a driver assembly of the lighting apparatus of FIG. 51.
Figure 57:
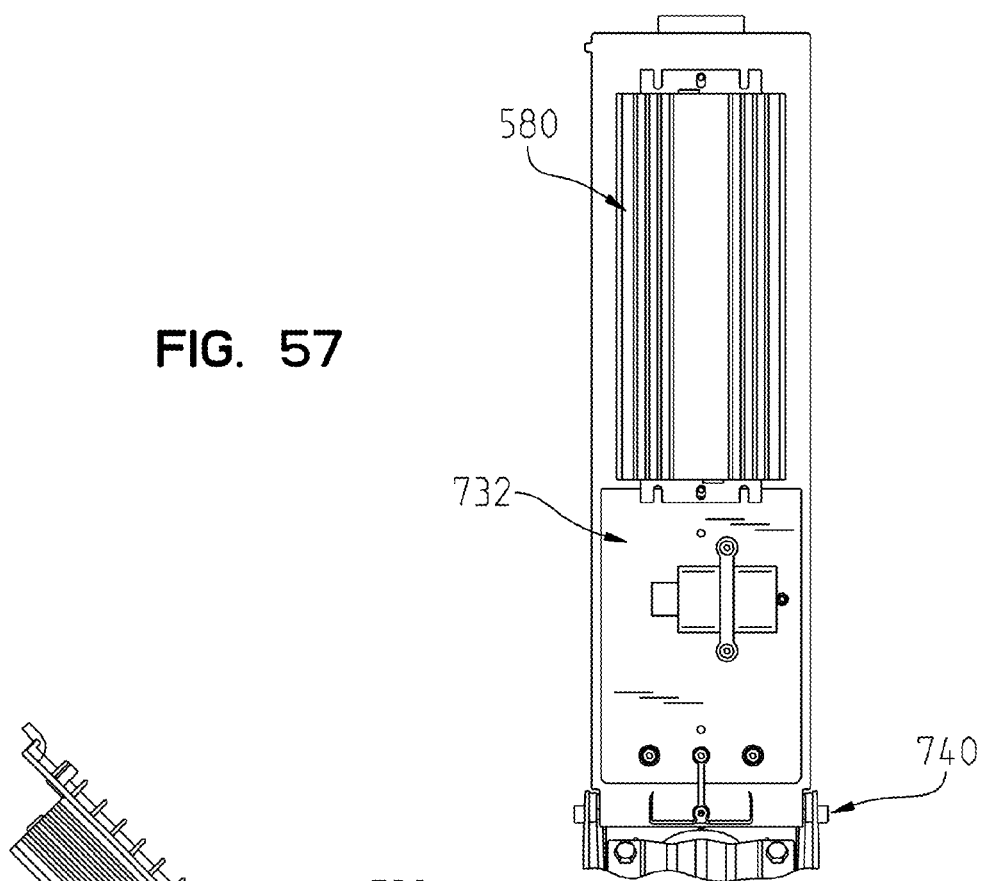
FIG. 57 illustrates a cover of the housing of the lighting apparatus of FIG. 51.
Figure 58:
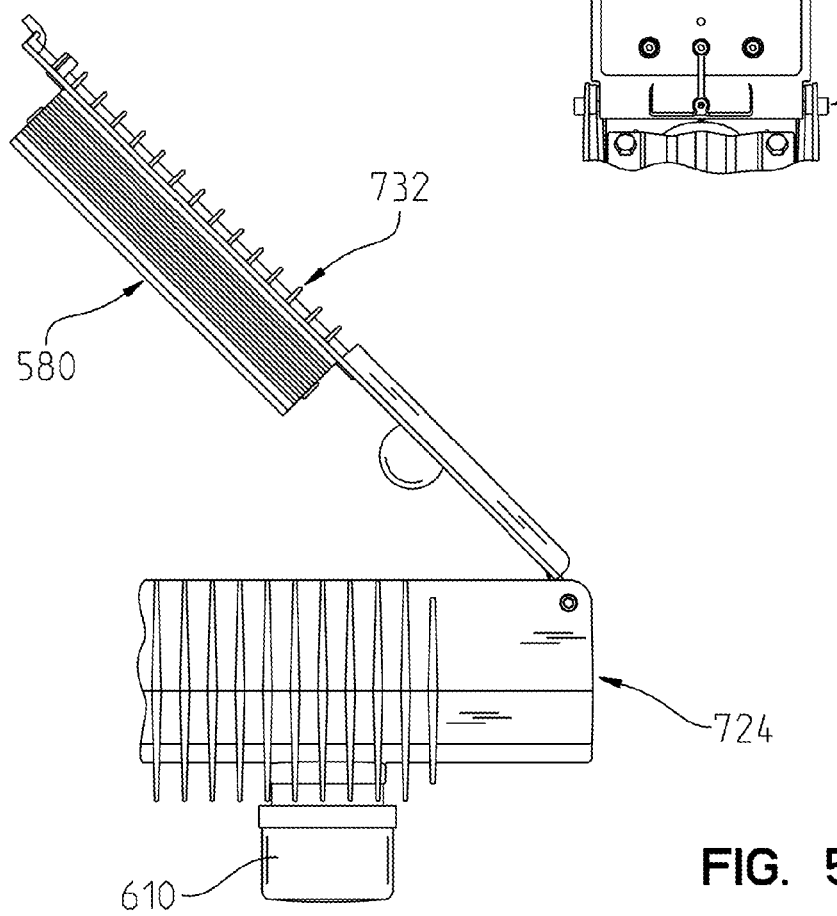
FIG. 58 illustrates a main housing of the lighting apparatus of FIG. 51 and the cover of FIG. 57 with the cover in an open position.

Driver assembly 718 includes a two piece housing 720 having an interior 722 (see FIG. 56). In one embodiment, a main housing 724 is a cast piece having a first heat sink 726 and a second heat sink 728. Each of heat sinks 726 and 728 include a plurality of fins.

Housing 720 further includes a cover 732 which is rotatably coupled to main housing 724. Cover 732 is rotatable between a closed position (see FIG. 55) and an open position (see FIG. 58). Cover 732 is coupled to the housing 724 by a hinge 740 shown in FIG. 55. Cover 732 is held in position by latches 742.

Power supply 580 is coupled to the inside of cover 732. Cover 732 includes a plurality of fins to assist in cooling power supply 580. Driver 550 is coupled to the inside of housing 724. The heat sinks 726 and 728 of housing 724 assist in cooling driver 550.

Referring to FIG. 56, a mounting clamp 750 is provided within the interior 722 of driver assembly 718. The mounting pole 512 is inserted through aperture 704 in housing 724 and is positioned below mounting clamp 750. Mounting pole 512 is captured by mounting claim 750 by tightening bolts 752 which are received in corresponding bosses of housing 724. Since bolts 752 are in the interior 722 of driver assembly 718 they are not exposed to the weather.

While this disclosure has been described as having exemplary designs and embodiments, the present system may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

We claim:

1. A lighting apparatus comprising:
an emitter unit including:
a first housing having an interior region and a top surface formed to include an opening therein, and
an emitter including a body portion, a plasma bulb and an emitter heat sink on the body portion, the body portion of the emitter being coupled to the top surface of the first housing with the plasma bulb positioned adjacent the opening in communication with the interior region of the first housing and the emitter heat sink located outside of the interior region of the first housing;
a driver unit including:
a second housing having an interior region,
a driver located in the interior region of the second housing, the driver generating a radio frequency (RF) signal, and
a driver heat sink located on the second housing outside of the interior region of the second housing;
a coupler connecting the first housing to the second housing, the coupler securing the emitter unit in a fixed position spaced apart from the driver unit; and
a cable coupled between the driver and the emitter so that the emitter generates light energy with the plasma bulb from the received RF signal from the driver.

2. The lighting apparatus of claim 1, wherein the first housing has a rectangular shape.

3. The lighting apparatus of claim 1, wherein the first housing provides a reflector for the plasma bulb of the emitter.

4. The lighting apparatus of claim 3, wherein the reflector has a rectangular shape.

5. The lighting apparatus of claim 1, further comprising a window coupled to the first housing and positioned below the plasma bulb, wherein light produced by the plasma bulb passes through the window.

6. The lighting apparatus of claim 1, further comprising a power supply coupled to the second housing, the power supply providing DC power to the driver.

7. The lighting apparatus of claim 6, wherein the power supply is coupled to an external surface of the second housing outside of the interior region of the second housing.

8. The lighting apparatus of claim 6, further comprising a power supply heat sink coupled to the power supply, the power supply heat sink being located outside of the interior region of the second housing.

9. The lighting apparatus of claim 1, further comprising a mounting structure coupled to the driver unit so that the driver unit and the emitter unit are suspended from the mounting structure.

10. The lighting apparatus of claim 9, wherein the lighting apparatus is suspended over water in an aquarium.

11. The lighting apparatus of claim 9, wherein the lighting apparatus is suspended over at least one plant.

12. The lighting apparatus of claim 11, wherein the plasma bulb of the emitter produces light having a coloring rendering index value of about 95.

13. The lighting apparatus of claim 11, wherein the plasma bulb of the emitter produces light having a micromoles/lumen value of greater than about 2.0.

14. The lighting apparatus of claim 1, wherein the first housing is pivotably coupled to the second housing by the coupler.

15. The lighting apparatus of claim 14, wherein the coupler includes a hinged portion to permit pivotable movement of the first and second housings and a locking portion to secure the first housing in a fixed position spaced apart from the second housing.

16. The lighting apparatus of claim 1, wherein the driver unit further comprises a pole mounting portion.

17. The lighting apparatus of claim 16, wherein the pole mounting portion is coupled to a first end of the second housing, the emitter unit being coupled to a second end of the second housing opposite the first end, the pole mounting portion adapted to receive a street pole which is to be coupled to the pole mounting portion.

18. The lighting apparatus of claim 1, further comprising a photocell coupled to the second housing, the photocell automatically turning the lighting apparatus on and off based upon a detected ambient light level.

19. The lighting apparatus of claim 1, wherein the second housing is a cast housing formed to include the driver heat sink.

20. The lighting apparatus of claim 1, wherein the plasma bulb of the emitter produces light having a Correlated Color Temperature (CCT) of at least 5,300K.

21. The lighting apparatus of claim 1, further comprising a controller which controls the driver to turn the lighting apparatus on and off and selectively dim the light emitted by the plasma bulb of the emitter.

22. The lighting apparatus of claim 21, wherein the driver has an internal temperature sensor which is monitored by the controller.

23. The lighting apparatus of claim 21, wherein the controller provides a 1-10V input to control dimming of the plasma bulb of the emitter.

24. The lighting apparatus of claim 21, wherein the controller provides a variable input to control dimming of the plasma bulb of the emitter from 20% to 100% of full power of the plasma bulb.

25. The lighting apparatus of claim 21, wherein the controller is a wireless controller having a graphical user interface.

26. The lighting apparatus of claim 1, wherein the emitter further includes a body portion, a puck formed of a dielectric material located within the body portion, and a cable connector coupled to the body portion, the plasma bulb being located within a dielectric material of the puck and the cable connector being coupled to one end of the cable.

27. The lighting apparatus of claim 1, wherein the plasma bulb of the emitter produces light spectrum between about 400 nm and about 700 nm.

28. The lighting apparatus of claim 1, further comprising a potentiometer coupled to the driver to adjust an intensity of light emitted from the emitter unit.

* * * * *